US012608084B2

(12) United States Patent
Zhu et al.

(10) Patent No.: US 12,608,084 B2
(45) Date of Patent: Apr. 21, 2026

(54) SYSTEMS AND METHODS OF GENERATING LOW-FREQUENCY AND PERSISTENT HAPTICS USING LOW-VOLTAGE AND HIGH-PRESSURE FLEXIBLE ELECTROOSMOTIC ACTUATORS

(71) Applicant: Meta Platforms Technologies, LLC, Menlo Park, CA (US)

(72) Inventors: Mengjia Zhu, Kirkland, WA (US); Amirhossein Amini, Seattle, WA (US); Tianshu Liu, Redmond, WA (US); Amirhossein Hajiagha Memar, Woodinville, WA (US); Yatian Qu, Orinda, CA (US); Thomas John Farrell Wallin, Redmond, WA (US); Adam Fruehling, Dallas, TX (US); Simon Jacobs, Lucas, TX (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/991,273

(22) Filed: Dec. 20, 2024

(65) Prior Publication Data

US 2025/0216944 A1     Jul. 3, 2025

Related U.S. Application Data

(60) Provisional application No. 63/615,236, filed on Dec. 27, 2023.

(51) Int. Cl.
*G06F 3/01*        (2006.01)
*F03G 7/00*        (2006.01)
(52) U.S. Cl.
CPC ............. *G06F 3/016* (2013.01); *F03G 7/015* (2021.08)

(58) Field of Classification Search
CPC .................................. G06F 3/016; F03G 7/015
See application file for complete search history.

(56) References Cited

U.S. PATENT DOCUMENTS

2019/0201785 A1     7/2019   Heubel et al.
2022/0113800 A1*    4/2022   Liu ......................... G06F 3/014

OTHER PUBLICATIONS

Shen Vivian et al: "Fluid Reality: High-Resolution, Untethered Haptic Gloves using Electroosmotic Pump Arrays", Proceedings of the 42nd ACM Sigmod-Sigact-Sigai Symposium on Principles of Database Systems, ACMPUB27, New York, NY, USA, Oct. 29, 2023, pp. 1-20, (Year: 2023).*

(Continued)

*Primary Examiner* — Robert J Michaud
(74) *Attorney, Agent, or Firm* — Morgan, Lewis & Bockius LLP

(57) ABSTRACT

An electroosmotic actuator configured to generate a haptic response is described. The electroosmotic actuator includes a flexible structure with a non-zero thickness less than 2 millimeters (mm) configured to be worn on a portion of a user's body. The flexible structure includes a flexible printed circuit board having a plurality of electrodes, a fluid-filled reservoir, individually-controlled pouches in fluid communication with the fluid-filled reservoir, a respective individually-controlled pouch associated with two electrodes of the plurality of electrodes. Furthermore, fluid from the fluid-filled reservoir moves into the respective individually-controlled pouch of the individually-controlled pouches when a non-zero voltage (V) less than 700 V is provided to the two electrodes by a power source coupled to the flexible printed circuit board, thereby causing haptic feedback to be provided to the portion of the user's body on which the flexible structure is worn.

20 Claims, 29 Drawing Sheets

(56)                    References Cited

OTHER PUBLICATIONS

Menake E. Piyasena, "Electroosmotically Driven Microfluidic Actuators", Sensors and Actuators B: Chemical vol. 141, Issue1, Aug. 2009, 14pgs (Year: 2009).*

International Search Report and Written Opinion for International Application No. PCT/US2024/061919, mailed Mar. 14, 2025, 16 pages.

Shen V., et al., "Fluid Reality: High-resolution, Untethered Haptic Gloves Using Electroosmotic Pump Arrays," Proceedings of the 42nd ACM Sigmod-sigact-sigai Symposium on Principles of Database Systems, Oct. 29, 2023, pp. 1-20.

Craig Shultz et al., "Flat Panel Haptics: Embedded Electroosmotic Pumps for Scalable Shape Displays", Proceedings of the 2023 CHI Conference on Human Factors in Computing Systems, Article No. 745, Apr. 2023, 16 pgs.

Daejoong Kim et al., "High Flow Rate Per Power Electroosmotic Pumping Using Low Ion Density Solvents", Sensors and Actuators A: Physical, vol. 141, Issue 1, Jan. 2008, 12 pgs.

Lingxin Chen et al., "Study of an Electroosmotic Pump for Liquid Delivery and its Application in Capillary col. Liquid Chromatography", Journal of Chromatography A, vol. 1028, Issue 2, Mar. 2004, 8 pgs.

Mario A. Saucedo-Espinosa et al., "Refinement of Current Monitoring Methodology for Electroosmotic Flow Assessment Under Low Ionic Strength Conditions", AIP Publishing, Biomicrofluidics, vol. 10, Issue 3, Retrieved from the Internet: https://pubs.aip.org/aip/bmf/article/10/3/033104/385581, May 2016, 29 pgs.

Menake E. Piyasena et al., "Electroosmotically Driven Microfluidic Actuators", Sensors and Actuators B: Chemical, vol. 141, Issue 1, Aug. 2009, 14 pgs.

Shuhuai Yao et al., "Porous Glass Electroosmotic Pumps: Design and Experiments", Journal of Colloid and Interface Science, vol. 268, Issue 1, Dec. 2003, 11 pgs.

Vito Cacucciolo et al., "Stretchable Pumps for Soft Machines", Nature 572, Aug. 2019, 32 pgs.

Wikipedia.org, "Electro-osmosis", Retrieved from the Internet: https://en.wikipedia.org/wiki/Electro-osmosis#:~text=Electroosmotic%20flow%20, last edited: Oct. 2024, 6 pgs.

* cited by examiner

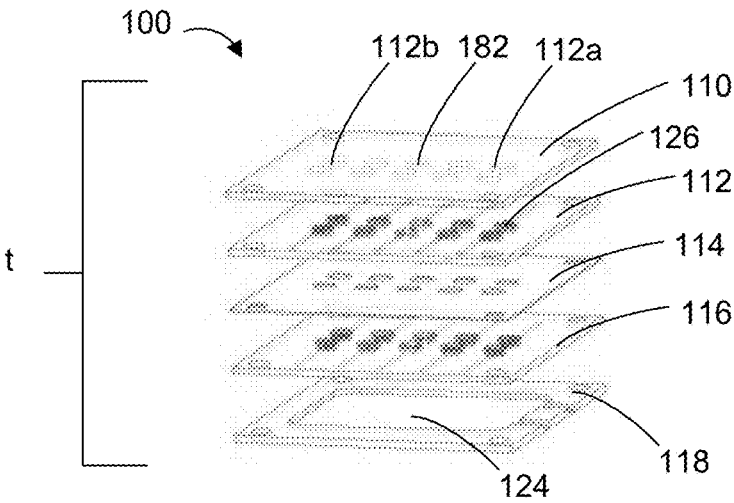
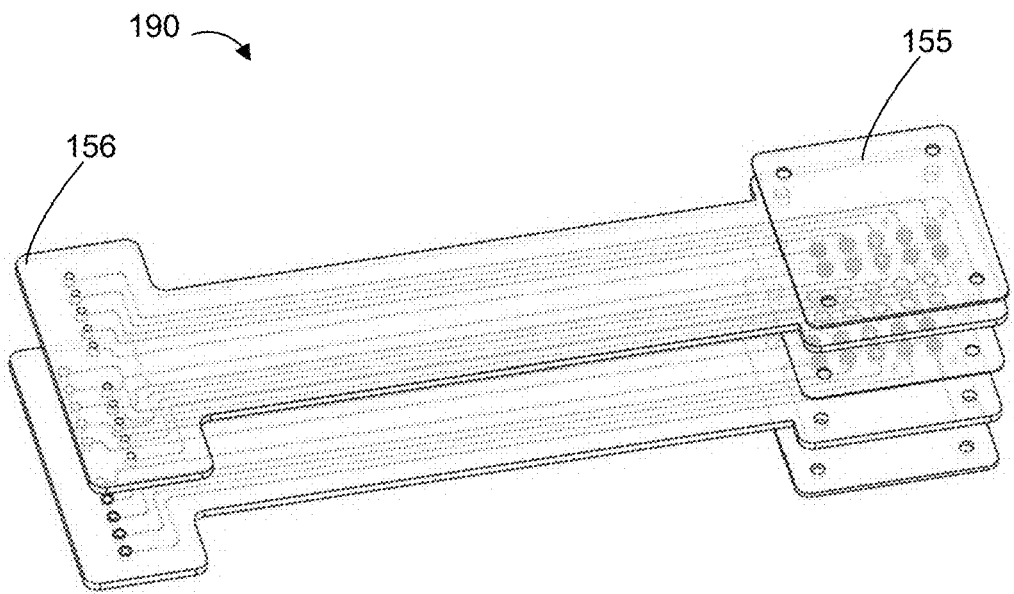
Figure 1A

190

Flow

100

Corner alignment pins

Center alignment pins

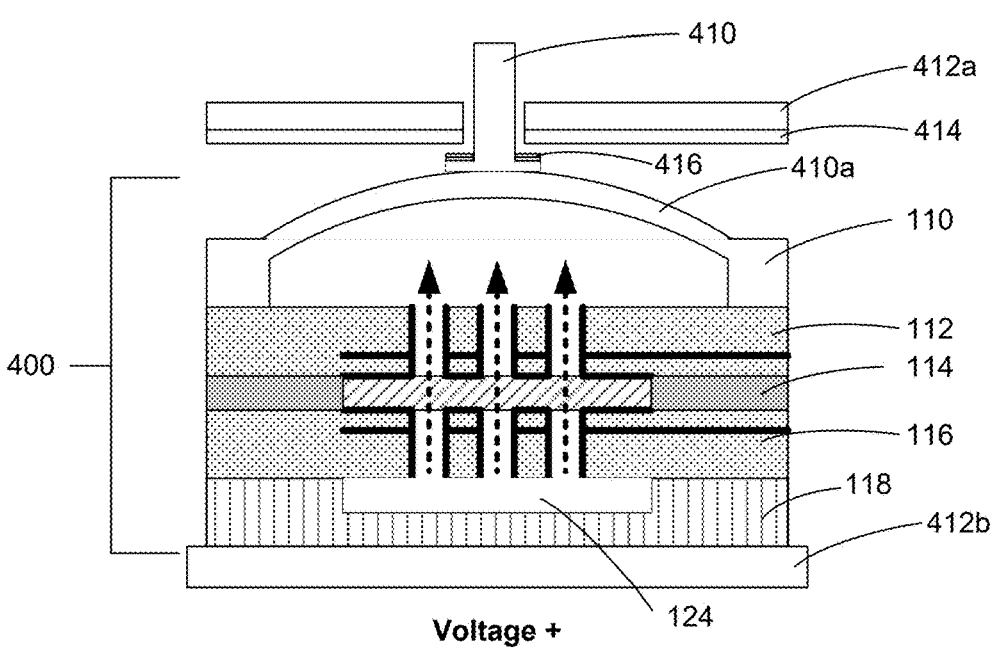
Voltage +
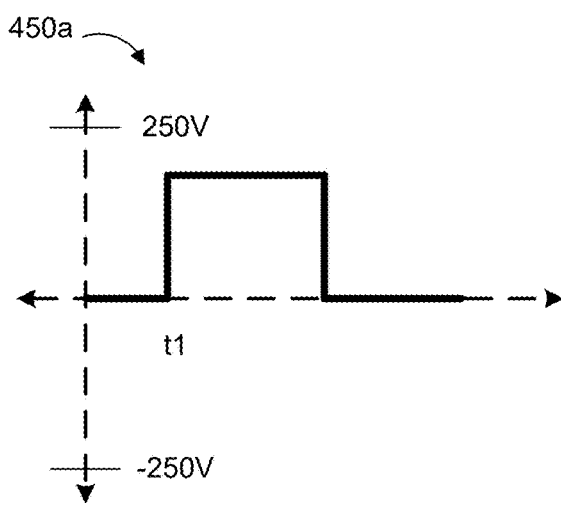
Figure 4A

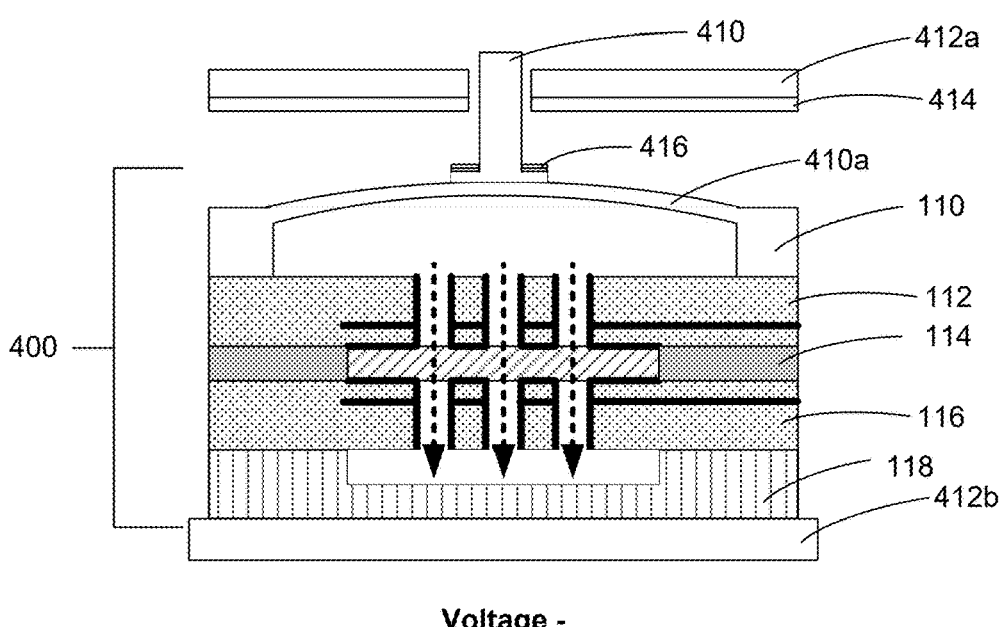
Voltage -
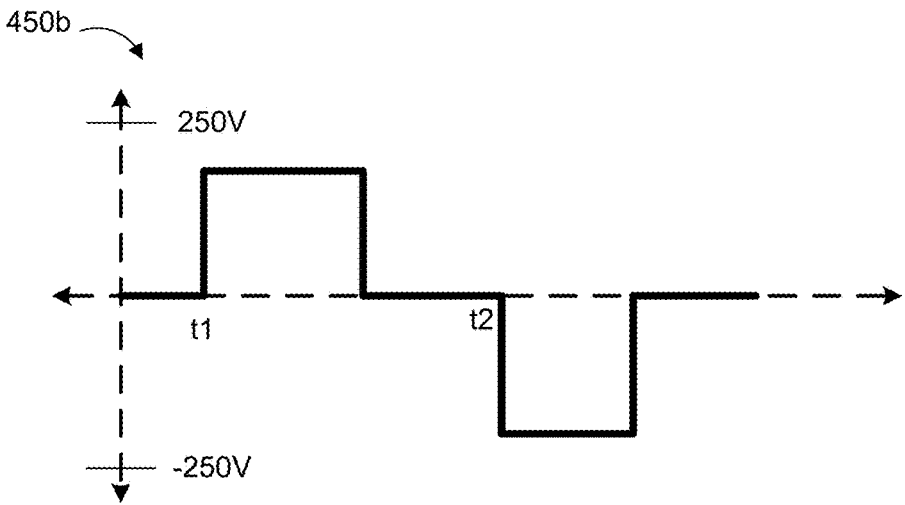
Figure 4B

450

455

470

471

475

471

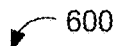

600

602 At a wearable device configured to generate haptic feedback including a flexible structure with a non-zero thickness configured to be worn on a portion of a user's body, where the flexible structure includes a flexible printed circuit board having a plurality of electrodes, a fluid-filled reservoir, and individually-controlled pouches in fluid communication with the fluid-filled reservoir 604 Receiving, at the wearable device, instructions to provide haptic feedback by actuating one or more electroosmotic actuators of the array of electroosmotic actuators 606 Responsive to the instructions for actuating one or more electroosmotic actuators, providing a voltage less than 700 V to two electrodes of the plurality of electrodes such that fluid from the fluid-filled reservoir moves into the respective individually-controlled pouch of the individually-controlled pouches, thereby causing haptic feedback

Figure 6

VR device 910

1005
1014a    1002
1004    1006
1000
1008
1012    1010
1014b
1020
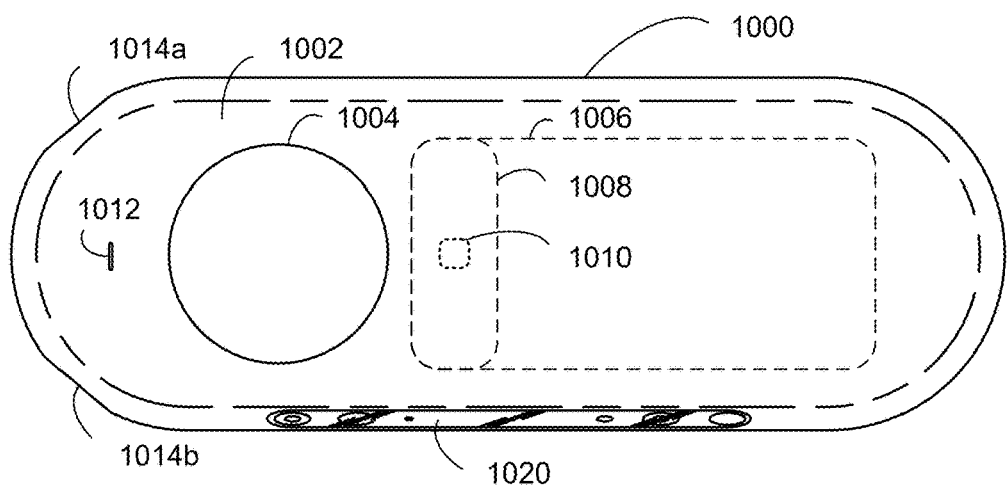
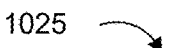
1025
1002
1024    1020    1022B
1014B    1022A    1026    1028    1030
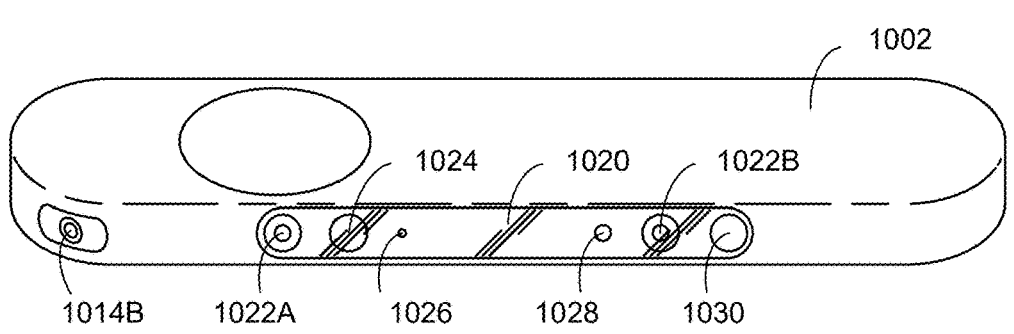
Figure 10A

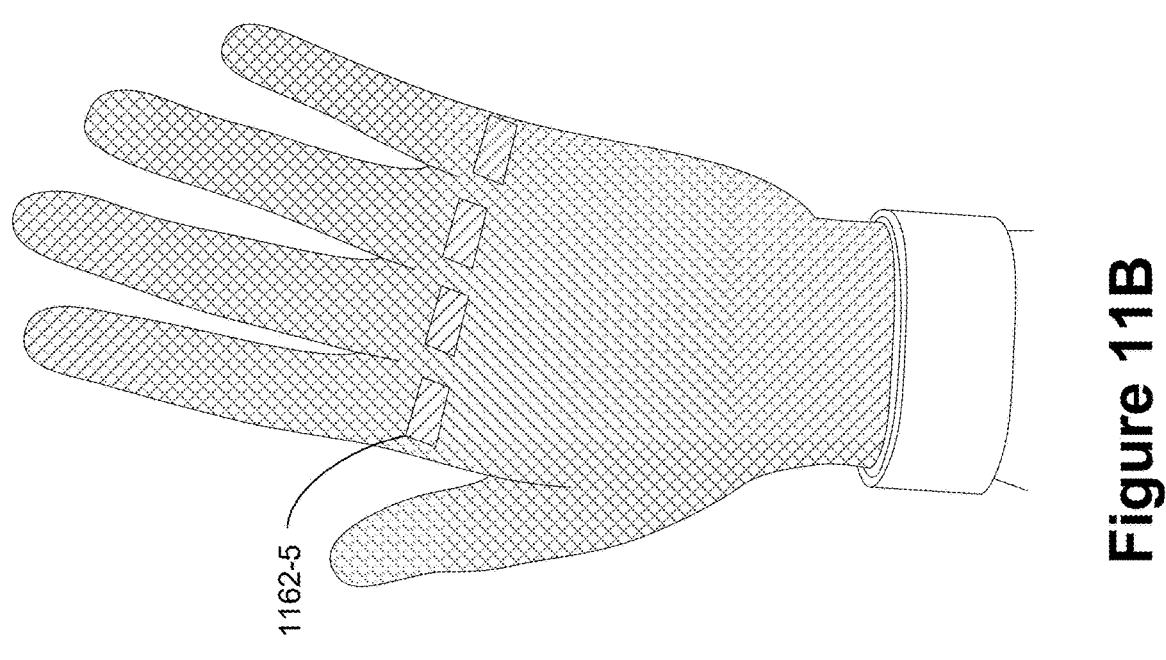
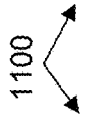
1100
1162-5
Figure 11B
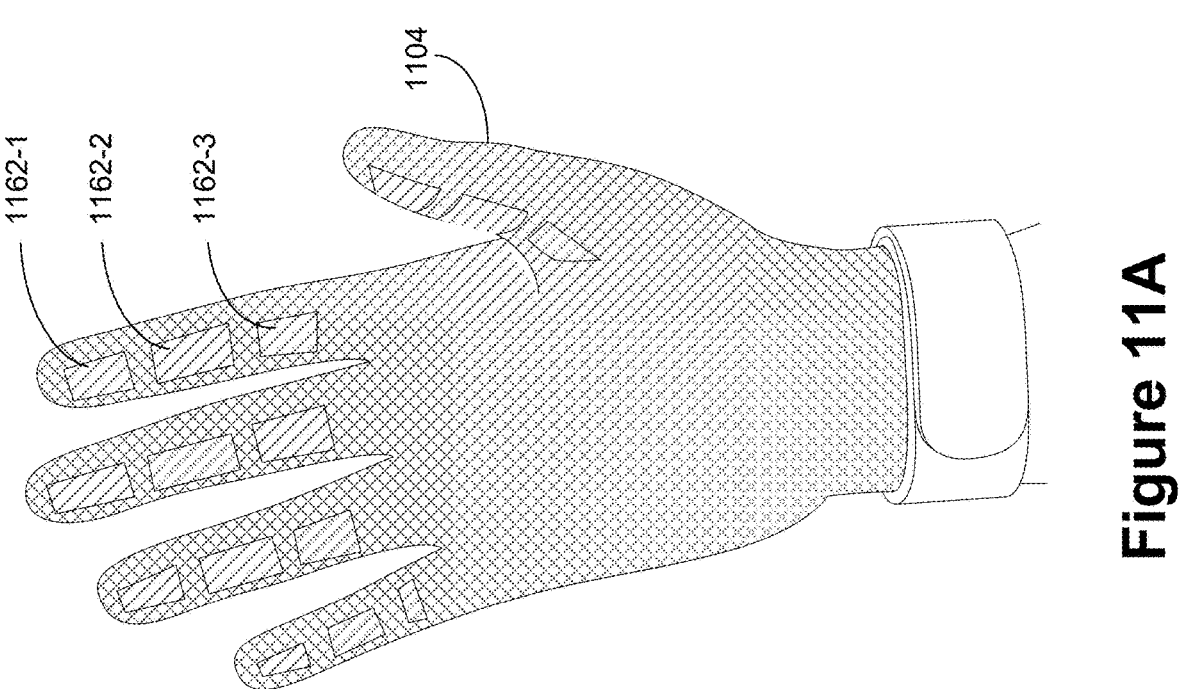
1162-1
1162-2
1162-3
1104
Figure 11A

SYSTEMS AND METHODS OF GENERATING LOW-FREQUENCY AND PERSISTENT HAPTICS USING LOW-VOLTAGE AND HIGH-PRESSURE FLEXIBLE ELECTROOSMOTIC ACTUATORS

RELATED APPLICATION

This application claims priority to U.S. Provisional Patent Application No. 63/615,236, filed Dec. 27, 2023, titled "Systems And Methods Of Generating Low-Frequency And Persistent Haptics Using Low-Voltage And High-Pressure Flexible Electroosmotic Actuators," which is hereby incorporated by reference in its entirety.

TECHNICAL FIELD

This relates generally to electroosmotic actuators, including but not limited to techniques for generating low-frequency and persistent haptic feedback responses as fine tactile pressure actuators and coarse tactile pressure actuators.

BACKGROUND

Pneumatic actuators have been used in wearable devices to generate haptic feedback responses. Pneumatics offer many advantages including large pressure ranges, mature control methods, and availability in high density haptic unit cells. However, they require complex tethered systems (e.g., sources and valves) and thus other solutions for generating haptic feedback responses at wearable devices is needed. Using non-pneumatic actuators such as an electroactive soft actuator often require high voltages and generate relatively low pressure for haptic applications. Accordingly, there is a need for non-pneumatic actuators in wearable devices suitable for providing accurate haptic feedback at low voltages.

As such, there is a need to address one or more of the above-identified challenges. A brief summary of solutions to the issues noted above are described below.

SUMMARY

The methods, systems, and devices described herein include electroosmotic actuators used in wearable devices configured to provide haptic responses, produce high pressure tactile responses, operate at low voltages, and are fabricated with scalable/panel-based manufacturing methods. Described herein include strategies to improve the response time of electroosmotic actuators in addition to energy-saving mechanisms to generate persistent haptics, including passive mechanisms (such as bistable locking mechanism, bistable membranes, and modified wall structures) and active mechanisms (such as active locking mechanisms like electrostatic locking, or active microvalves). Furthermore, electroosmotic actuators that include flexible printed circuit boards allow an array of electroosmotic actuators to easily conform to a portion of a user's body and provide targeted coarse or finite tactile pressure.

One example of an electroosmotic actuator for generating a haptic response is described herein. The example electroosmotic actuator is described herein includes a flexible structure with a non-zero thickness less than 2 millimeters (mm) configured to be worn on a portion of a user's body. The flexible structure includes a flexible printed circuit board having a plurality of electrodes, a fluid-filled reservoir, individually-controlled pouches in fluid communication with the fluid-filled reservoir, and a respective individually-controlled pouch associated with two electrodes of the plurality of electrodes. Furthermore, the fluid from the fluid-filled reservoir moves into the respective individually-controlled pouch of the individually-controlled pouches when a non-zero voltage (V) less than 700 V is provided to the two electrodes by a power source coupled to the flexible printed circuit board, thereby causing haptic feedback to be provided to the portion of the user's body on which the flexible structure is worn.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 1A-1D illustrate examples of an exploded view of an array of flexible electroosmotic actuators and cross-sectional views of a respective electroosmotic actuator of an array of electroosmotic actuators, in some embodiments.

FIG. 4A-4E illustrate examples of configurations of an EO actuator, in some embodiments.

FIG. 6 shows an example of a method flow chart for actuating an electroosmotic actuator, in accordance with some embodiments.

FIGS. 7A, 7B, 7C-1, 7C-2, 7D-1, and 7D-2 illustrate example artificial-reality systems, in accordance with some embodiments.

FIGS. 9A, 9B-1, 9B-2, and 9C illustrate example head-wearable devices, in accordance with some embodiments.

FIGS. 10A-10B illustrate an example handheld intermediary processing device, in accordance with some embodiments.

FIGS. 11A-11C illustrate an example smart textile-based garment, in accordance with some embodiments.

Figure 1B:
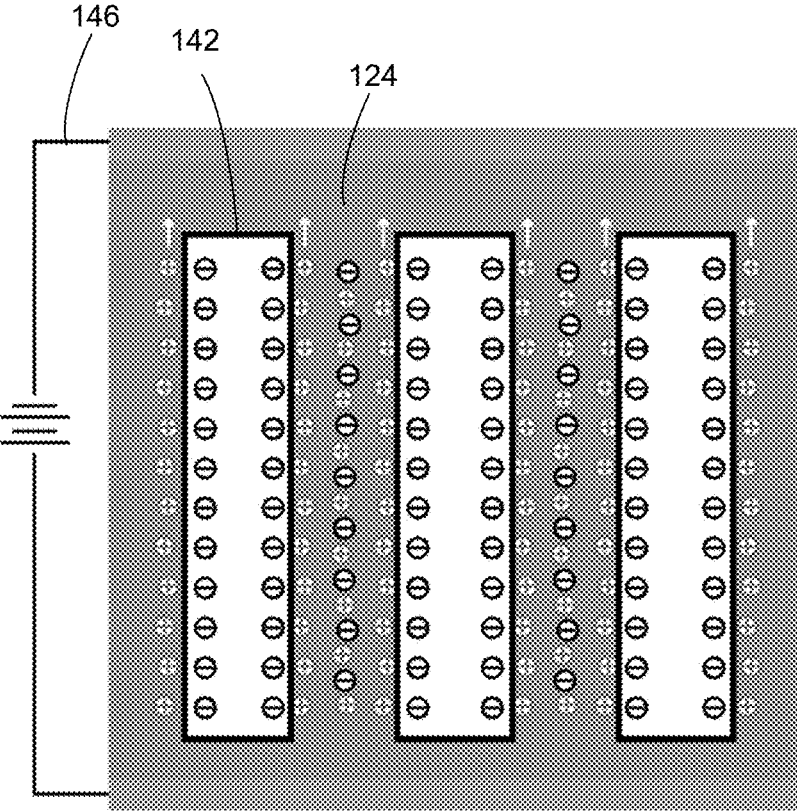

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight (ToF) sensors, sensors of an inertial measurement unit, etc.) detected by a wearable device worn by the user and/or other electronic devices in the user's possession (e.g., smartphones, laptops, imaging devices, intermediary devices, and/or other devices described herein).

Terminology surrounding extended-reality devices can change, and as such this application uses terms that in some instances can be interchangeable with other terms. While not limiting in nature, some alternative definitions are included herein. This application uses the term "Artificial Reality" to be a catchall term covering virtual reality (VR), augmented reality, mixed artificial reality (MAR), however, the term "extended-reality" can be used in place of "artificial reality" as a catchall term. The term augmented reality falls under the extended-reality catchall umbrella. The terms virtual-reality and mixed artificial reality, in some instances, can be replaced by the broader term "mixed-reality" commonly referred to as "MR," and also fall under the extended-reality catchall umbrella. This MR term is meant to cover all extended-reality experiences that do not include a direct viewing of the surrounding environment, which can include virtual reality, virtual-realities that have the surrounding environment presented to the user indirectly from data acquired from sensors of the device (e.g., SLAM cameras, cameras, ToF sensors, etc.). Augmented reality includes directly viewing the surrounding environment, e.g., through a waveguide or a lens.

Figure 8A:
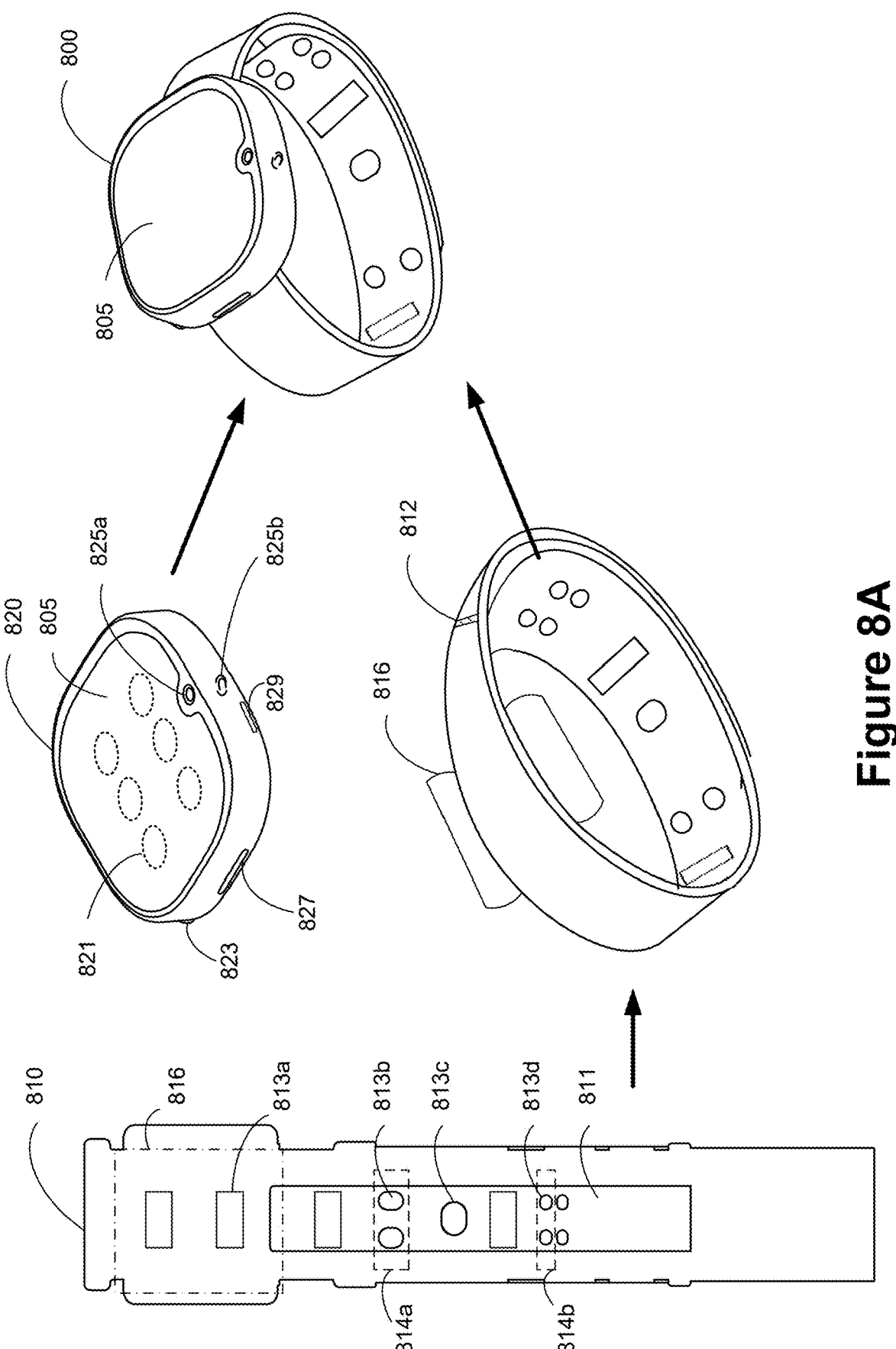
FIGS. 8A-8B illustrate an example wrist-wearable device 800, in accordance with some embodiments.
Figure 8B:
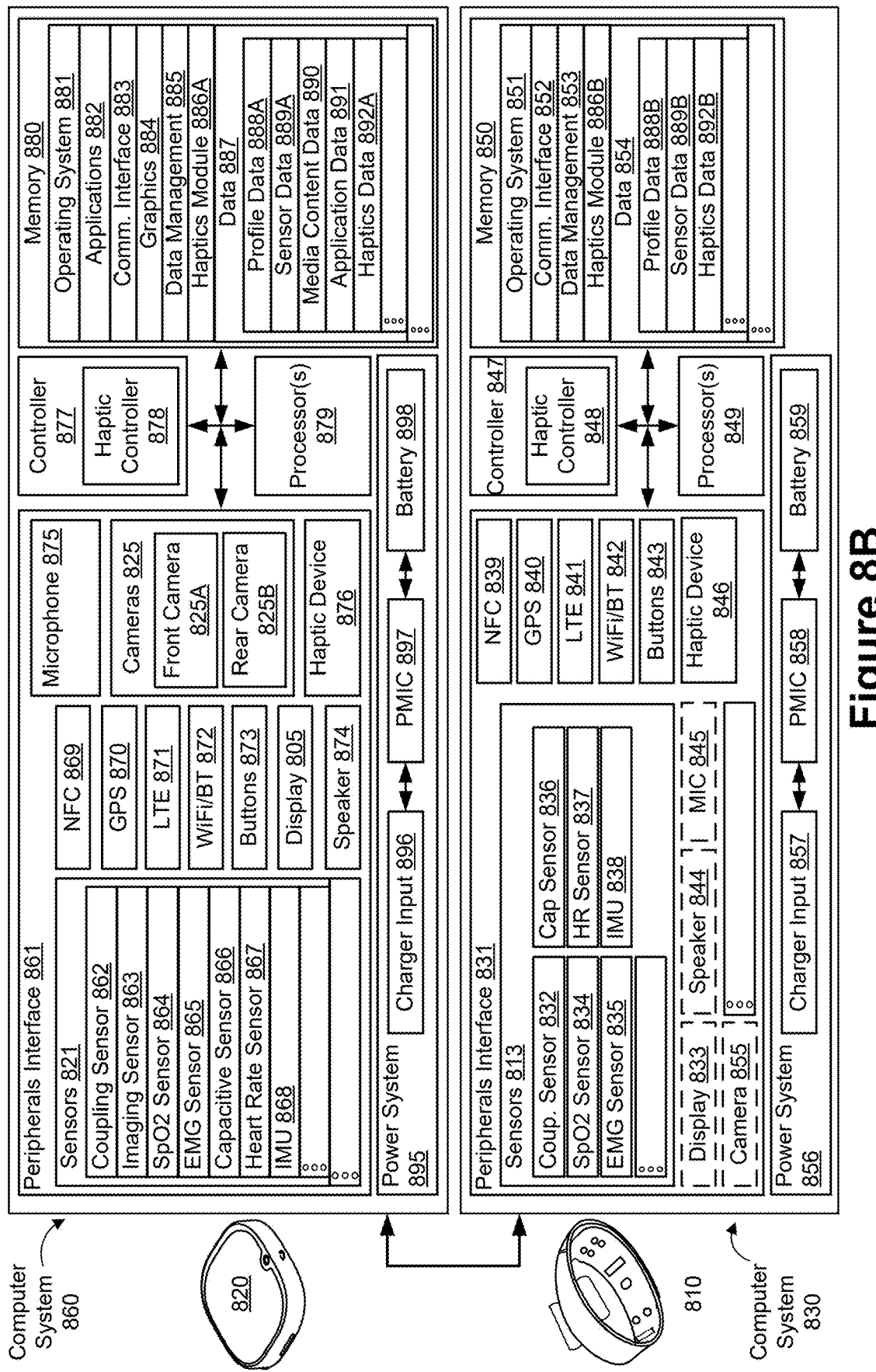
Figure 11C:
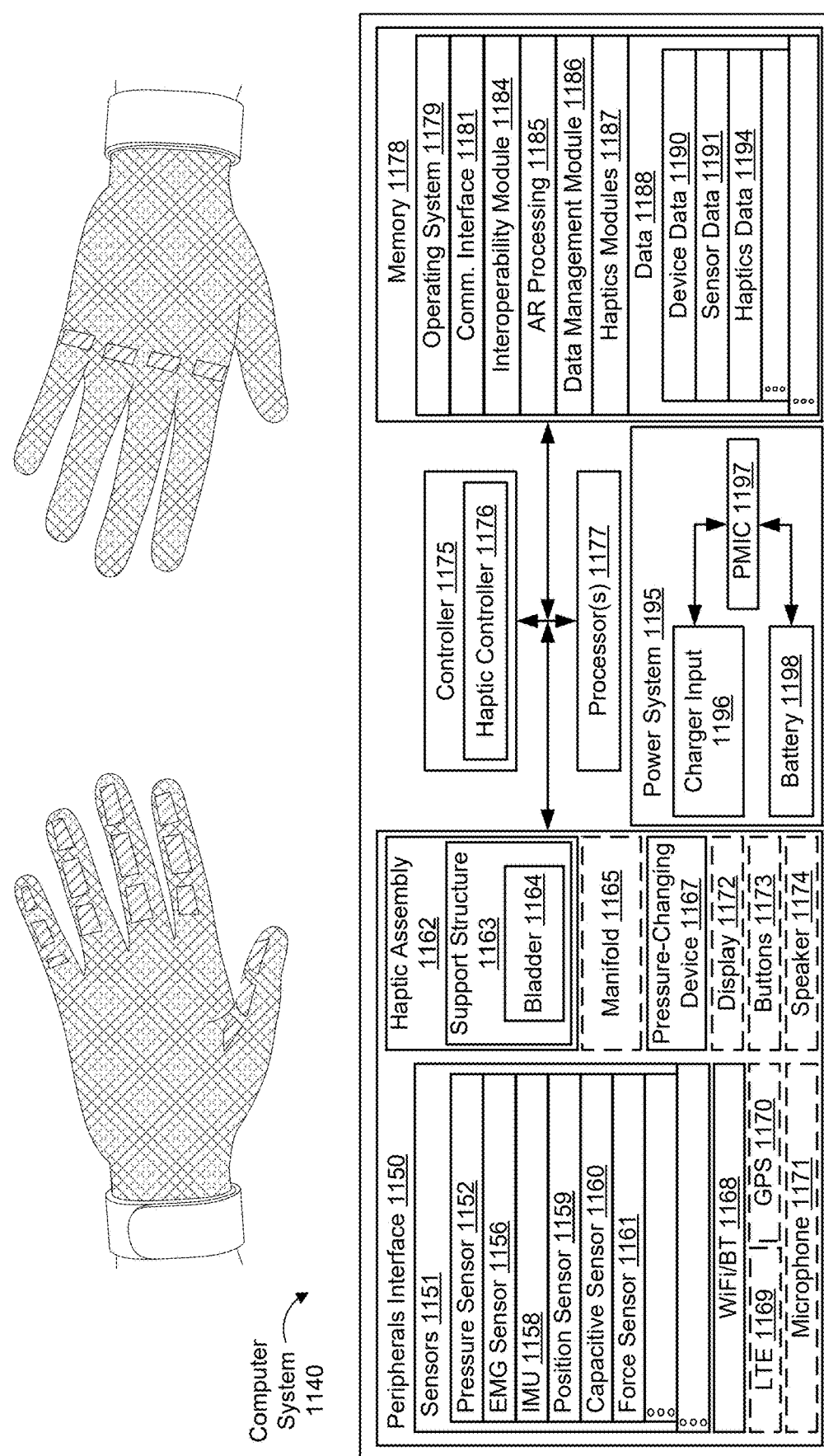

As described herein, thin and flexible haptic actuators are used when coupled to the wrist or fingertip of a user such that they conform to the curved body as well as provide natural sensation when touching/sliding on the tabletop. Existing technology includes rigid and non-conformal actuators. However, the electroosmotic actuators disclosed herein include a thin and flexible form factor such that when coupled with a wearable device (e.g., handheld intermediary processing device (HIPD) 1000, a smart textile-based garment 1100; FIGS. 11A-11C and/or wrist-wearable device 800; FIGS. 8A-8B) worn by a user, the electroosmotic actuators provide accurate, comfortable, and conformal haptic feedback responses. In some embodiments, the smart textile-based garment 1100 is a wearable glove.

Figures 1, 1C:
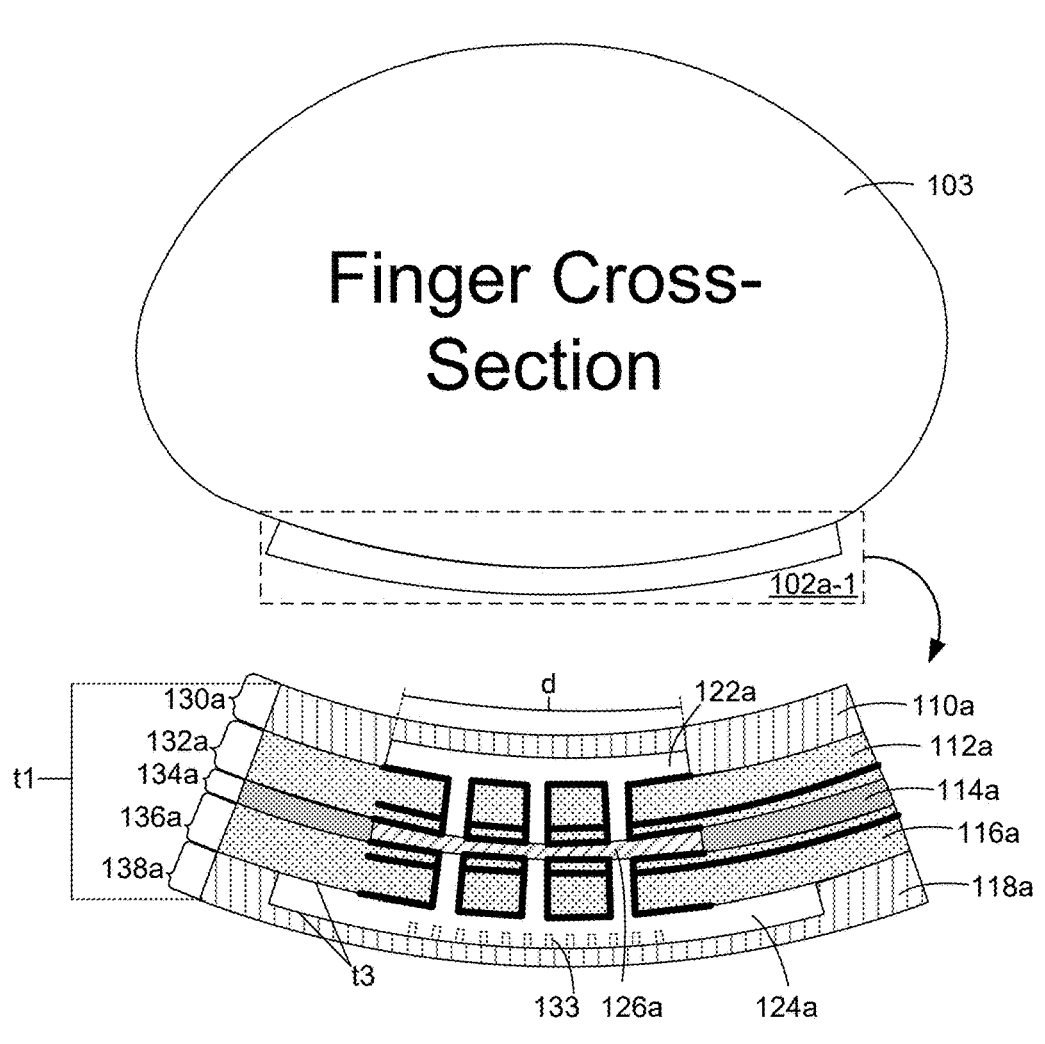
Figures 1, 1C, 2:
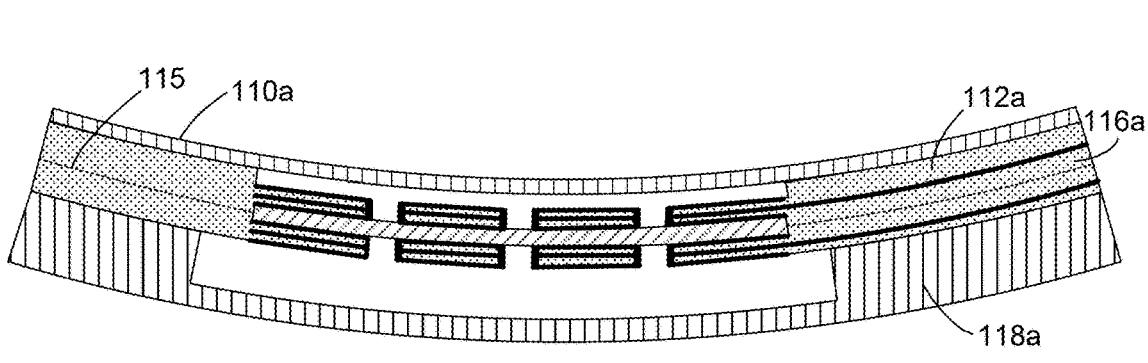
Figure 1D:
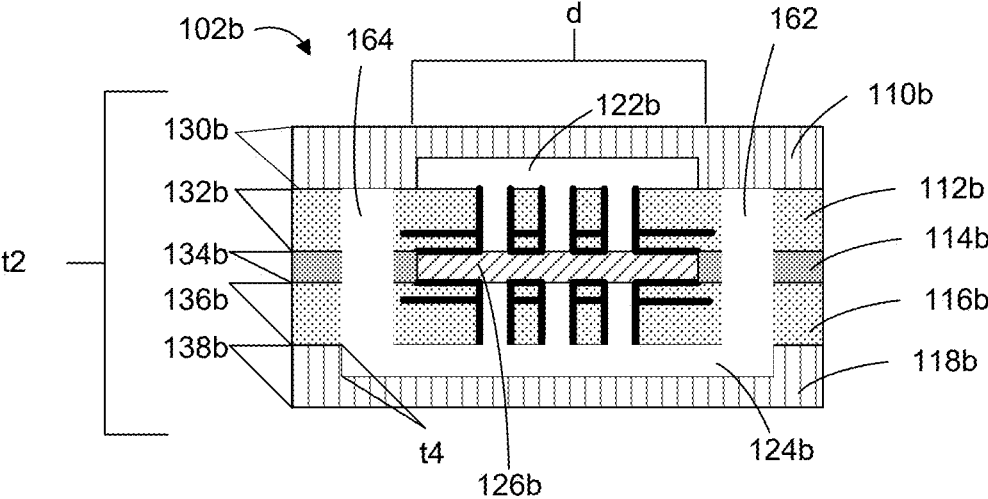
Figure 2:
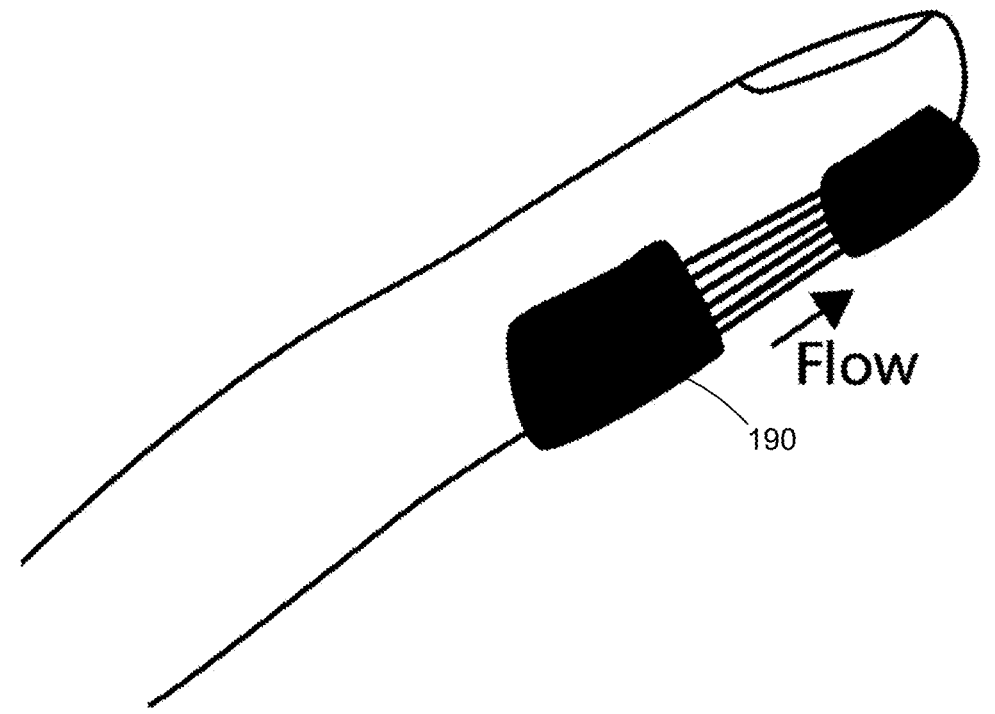
FIG. 2 illustrates the EO actuator assembly 190 coupled to a phalange of a user, in some embodiments.

FIGS. 1A-1D illustrate examples of an exploded view of an array of flexible electroosmotic actuators and cross-sectional views of a respective electroosmotic actuator of an array of electroosmotic actuators, in some embodiments. FIG. 1A shows an exploded view of the array of electroosmotic actuators, FIG. 1B shows electroosmotic flow of the array of electroosmotic actuators 100, and FIGS. 1C and 1D show distinct cross-sectional views of a respective electroosmotic actuator of the array of electroosmotic actuators 100.

As shown in FIG. 1A, the exploded view of the array of flexible electroosmotic (EO) actuators 100 includes one or more respective EO actuators 182 (e.g., first instance 102*a*-1 of an EO actuator 182 and third instance 102*b* of an EO actuator 182 discussed in reference to FIGS. 1C-1, 1C-2, and 1D) that are configured to provide respective haptic responses. In particular, each respective EO actuator 182 is configured to provide both fine tactile pressure (e.g., when coupled to a wearable glove) and coarse tactile pressure (e.g., when coupled with a wrist-wearable device 800). Each respective EO actuator 182 of the array of flexible EO actuators 100 generates haptic responses (e.g., tactile pressure and/or vibrations) responsive to respective voltages applied to one or more components of the array of flexible EO actuators 100 described below in reference to IC-1, 1C-2, and 1D. In some embodiments, the array of flexible EO actuators 100 has a predetermined thickness (t). In some embodiments, the predetermined thickness is a non-zero thickness less than 2 mm. The predetermined thickness can be based on the material and number of layers used in the fabrication of the array of flexible EO actuators 100. Fabrication of the array of flexible EO actuators 100 is discussed below in reference to FIG. 3A-1-3D.

The array of flexible EO actuators 100 is formed of multiple layers including: a bubble layer 110, at least one flexible printed circuit board (FPCB) (e.g., a first FPCB 112 and a second FPCB 116), a spacer 114 (e.g. polyester, polyimide), a porous material 126 (which can be included in the spacer 114), and a reservoir 118 filled with fluid 124. The bubble layer 110 is made of a flexible material (e.g., silicone) and includes at least one bubble which represents a respective EO actuator 182 (e.g., a first instance 102a-1 of an EO actuator 182, a second instance 102a-2 of an EO actuator 182, and a third instance 102b of an EO actuator 182). Each respective bubble has a diameter (d) which is between 0.5 mm and 4 mm. Each respective bubble can be coupled to a haptic tactor (e.g., as illustrated in FIGS. 4A and 4B) configured to provide both coarse and finite haptic feedback to a user. Furthermore, each respective bubble can be coupled, directly or indirectly, to a portion of a user's body to provide haptic feedback (e.g., when a wearable device including the array of flexible EO actuators 100 is worn). For example, the EO actuator 182 shown in FIGS. 1A-1D can include one or more bubbles coupled to the user's skin, and FIGS. 4A-5 illustrate a configuration of the EO actuator 182 such that the bubble 410a is coupled to a haptic tactor 410 that is coupled to the user's skin.

FIG. 1A further illustrates the array of flexible EO actuators 100 coupled to an EO actuator assembly 190. The array of flexible EO actuators 100 is coupled to the first end 155 of the EO actuator assembly 190 which is coupled to a phalange of the user's hand. The second end 156 of the EO actuator assembly 190 can include one or more electrical contacts for communicatively coupling the array of flexible EO actuators 100 with a computing system of a wearable device (e.g., computer system 860 of a wrist-wearable device 800; FIGS. 8A add 8B). Alternatively, or in addition, in some embodiments the second end 156 of the EO actuator assembly 190 includes a reservoir 118 filled with fluid 124 and fluidically coupled with the array of flexible EO actuators 100 such that, when an electrical charge (e.g., a voltage) is provided to the array of flexible EO actuators 100 (e.g., via the first and/or second ends 155 and 156), the fluid 124 is moved to the one or more EO actuators 182 and the one or more EO actuators 182 are actuated.

With reference to FIGS. 1A, in some embodiments, the bubble layer thickness (e.g., first bubble layer thickness 130a and second bubble layer thickness 130b) is a non-zero thickness less than or equal to 0.1 mm. The array of flexible EO actuators 100 includes two FPCBs. The first FPCB 112 includes substrates and electrodes and has a non-zero thickness (e.g., first FPCB thickness 132a and second FPCB thickness 132b) less than or equal to 0.1 mm. The first FPCB's 112 is configured to be thin and flexible such that it conforms to a portion of the user's body without being bulky. The first FPCB 112 further includes one or more holes with a non-zero diameter less than or equal to 0.25 mm. The holes are configured to allow fluid 124 to pass through from the reservoir 118 to the bubble (e.g., first bubble 122a and second bubble 122b).

The spacer 114 includes a porous material 126 that, in some embodiments, is composed of a glass-based porous material (e.g., glass microfibers). In some embodiments, the porous material 126 can be determined through engineering methods (e.g., lithography, DRIE dry etching, etc.). The spacer 114 has a non-zero thickness less than or equal to 0.25 mm (e.g., first spacer thickness 134a and first spacer thickness 134b). The array of flexible EO actuators 100 includes a second FPCB 116 positioned in between the spacer 114 and the reservoir 118. In some embodiments, the second FPCB 116 includes all the components and features of the first FPCB 112 including thickness.

The array of flexible EO actuators 100 further includes a reservoir 118 configured to hold a fluid 124 containing skin-safe electrolytes. In some embodiments, the reservoir 118 is flexible and made from a silicone-based material. In some embodiments, the array of flexible EO actuators 100 share a flexible reservoir that may conform better to the body of a user (e.g., multiple bubbles share the same flexible reservoir). Additionally, benefits of the flexible reservoir further include allowing more natural sensation when touching a real surface when coupled to a wearable glove in addition to allowing for more space for the integration of other components (e.g., sensors at 1151 at the smart textile-based garment 1100) at the fingertip of a wearable glove.

In some embodiments, the reservoir 118 has a thickness that is a non-zero thickness ranging from 0.2 to less than or equal to 2 mm. The reservoir 118 thickness and/volume are correlated to providing a sufficient volume to contain the fluid 124 required to inflate the one or more bubbles of the bubble layer 110 when a voltage is applied to the electrodes coupled to the first and/or second FPCB 112 and 116.

In some embodiments, in response to receiving, at the wearable device (e.g., wrist-wearable device 800; FIGS. 8A-8B), instructions to provide haptic feedback to the user via a respective electroosmotic actuator and/or the array of electroosmotic actuators, a voltage is provided to electrodes at the first and/or second FPCBs 112 and 116, such that an electroosmotic flow is created.

FIG. 1B illustrates the concept of electroosmotic flow, in accordance with some embodiments. When an object 142 is placed into a liquid (e.g., fluid 124), an electrical double layer forms at the surface of the object 142. The positive and negative electrons shown at the in the electrical double layer can be moved by an external electrical potential 146 and can drag the surrounding liquid molecules to move along with them to generate electroosmotic flow (e.g., such that the fluid 124 moves from the reservoir 118 through the porous material 126 and into the bubble of the EO actuator 182). Electroosmotic flow is more formally defined as the fluid flow generated by applying electrical potential 146 across a fluid conduit (e.g., porous material 126). In some embodiments, the fluid conduit can be a porous material 126, capillary tube, microchannel, etc. FIGS. 1A, 1C-1, 1C-2, 1D, and 3A-4C illustrate the use of a porous material (e.g., porous material 126) as the fluid conduit. As described in detail below with reference to FIG. 2, microchannels in designs with enlarged pumping areas are used to improve the response time. The principal of electroosmotic actuation features silent actuation (e.g., no moving parts) and can be actuated with lower voltages (e.g., voltages less than 700 Volts (V)). The process of electroosmosis moves fluid 124 from the reservoir 118 into one or more bubbles in the bubble layer 110 causing haptic feedback to the user.

The first instance 102a-1 of an EO actuator 182 and the third instance 102b of an EO actuator 182, as shown in FIGS. 1C-1 and 1D, illustrate two configurations of an EO actuator 182 that have different thicknesses (t) as a result of at least one of the layers having different thicknesses. Additionally, the first instance 102a-1 of the EO actuator 182 illustrates how any of the EO actuator 182 instances described herein conform to a portion of a body of the user (e.g., finger cross-section 103). For example, as shown in FIG. 1C-1, the first instance 102a-1 of the EO actuator 182 wraps around the portion of the finger with which it is coupled. This allows the EO actuator 182 to provide improved haptic responses to a user.

The first instance 102a-1 of an EO actuator 182 (shown in FIG. 1C-1) is a first example of a respective EO actuator 182 of the array of flexible EO actuators 100. The first instance 102a-1 an EO actuator 182 includes: a first bubble layer 110a (e.g., an instance of the bubble layer 110), first FPCB 112a of the first instance 102a-1 of an EO actuator 182 (e.g., an instance of the first FPCB 112), a first spacer 114a that includes a first porous material 126a (e.g., an instance of the spacer 114 and first porous material 126a), a second FPCB 116a of the first instance 102a-1 of an EO actuator 182 (e.g., an instance of the second FPCB 116), a first reservoir 118a (e.g., an instance of reservoir 118) filled with a first fluid 124a (e.g., an instance of fluid 124). In some embodiments, the first reservoir 118a layer includes microstructures configured to avoid channel blockage during touch-on-surface interactions.

FIG. 1C-2 illustrates a second instance 102a-2 of an EO actuator 182 (similar to the EO actuator 182 shown in FIG. 1C-1) that includes an integrated spacer 115 into the first FPCB 112a and/or the second FPCB 116a which reduces the need for bonding, reduces the risk of leaking, and reduces manufacturing steps. Furthermore, moving bubble patterns on first FPCB 112a and/or the second FPCB 116a reduces alignment needs between the bubble layer 110a and the first FPCB 112a and/or the second FPCB 116a layers.

The third instance 102b of an EO actuator 182 (shown in FIG. 1D) is a third example of a respective EO actuator 182 of the array of flexible EO actuators 100. The third instance 102b EO actuator 182 includes: a second bubble layer 110b (e.g., an instance of the bubble layer 110, which can be the same as or distinct from the first bubble layer 110a), first FPCB 112b of the third instance 102b of an EO actuator 182 (e.g., an instance of the first FPCB 112), a second spacer 114b that includes a second porous material 126b (e.g., an instance of the spacer 114 and porous material 126), a second FPCB 116b of the third instance 102b of an EO actuator 182 (e.g., an instance of the second FPCB 116), a second reservoir 118b (e.g., an instance of reservoir 118) filled with a second fluid 124b (e.g., an instance of fluid 124).

In some embodiments, the thickness of the first instance 102a-1 of an EO actuator 182 is a non-zero thickness (t1) less than or equal to 2 mm and the third instance 102b of an EO actuator 182 is a non-zero thickness (t2) less than or equal to 1.35 mm. In some embodiments, the first bubble layer thickness 130a and second bubble layer thickness 130b is 0.1 mm. In some embodiments, the first FPCB thickness (e.g., 132a and 136a) and second FPCB thickness (e.g., 132b and 136b) are each respectively 0.1 mm (e.g., the thicknesses of the first FPCB 112a of the first instance 102a-1 of an EO actuator 182, the second FPCB 116a of the first instance 102a-1 of an EO actuator 182, the first FPCB 112b of the third instance 102b of an EO actuator 182, and the second FPCB 116b of the third instance 102b of an EO actuator 182). In some embodiments, the first spacer thickness 134a and first spacer thickness 134b are each respectively 0.25 mm. In some embodiments, the first instance 102a-1 of an EO actuator 182 includes a reservoir 118a that is a first reservoir thickness 138a and the third instance 102b of an EO actuator 182 includes a second reservoir 118b that is a second thickness 138b, such that they are distinct. In some embodiments, the first reservoir thickness 138a is 0.8 mm and the second reservoir thickness 138b is 0.4 mm. In some embodiments, the first reservoir 118a and the second reservoir 118b have substantially the same volume available to hold the respective fluid 124a or 124b despite the difference in reservoir layer thickness. In the third instance 102b of an EO actuator 182 this is made possible by including additional channels (e.g., a first channel 162 and a second channel 164), parallel to the channels that connect the bubble to the second reservoir 118b. The first and second channels 162 and 164 are configured to store the second fluid 124b until a voltage is applied to a respective EO actuator 182 and the fluid 124 travels from the second reservoir 118b to the second bubble 122b.

In some embodiments, a difference between the design of first instance 102a-1 of an EO actuator 182 and the third instance 102b of an EO actuator 182 is the reservoir 118 design, which is configured to reduce the total thickness of the respective EO actuator 182. The first and second reservoir thickness 138a and 138b is limited to the reservoir thickness required to provide sufficient liquid volume for the actuation. In the design of first instance 102a-1 of an EO actuator 182 where the area of the reservoir is the same as the first bubble 122a area, the thickness required for a 2 mm diameter bubble 122a to reach a semi-sphere volume (1 mm bubble height displacement) is t3=0.7 mm. A total thickness of <2 mm is achieved by lowering the thickness requirement to leverage the planar area around the actuator as part of the second reservoir 118b as shown in the third instance 102b of an EO actuator 182. This allows for increased capacity for the second reservoir 118b while maintaining the layers width. The second reservoir 118b of the third instance 102b of an EO actuator 182 illustrates the thickness requirement for the second reservoir 118b could be further reduced to t4=0.3 mm for the same haptic bubble size as the first instance 102a-1 of an EO actuator 182.

The one or more respective EO actuators 182 generate haptic responses (e.g., tactile pressure and/or vibrations) responsive to respective voltages applied to the electrodes coupled to the respective EO actuators 182 at the first and/or second FPCBs 112 and 116. In some embodiments, when actuated, a respective EO actuator 182 of the array of flexible EO actuators 100 can produce a pressure of −50 kPa to +100 kPa in accordance with a determination that the bubble (e.g., a first bubble 122a and/or a second bubble 122b) is 2 mm-3 mm in diameter. To provide successful haptic feedback to a user while they are wearing a glove is 41.4 kPa+/−5%. Therefore, a respective EO actuator 182 of the array of flexible EO actuators 100 can successfully meet the pressure requirements needed to produce a successful haptic feedback response to a user. The pressure is further improved by increasing the voltage or improving electrode design to improve Veff, permittivity of fluid, zeta potential, and reducing pore radius of the porous material 126. The voltage range discussed with respect to FIG. 1 provides additional flexibility for the EO actuator assembly 190 to produce a plurality of types haptic sensations whereas a limited voltage range limits the haptic sensations that can be provided. As such, the EO actuator assembly 190 can advantageously provide many types of haptic feedback because of the voltage range discussed. The voltage range allows the EO actuator assembly 190 to provide different and more haptic feedback sensations including a first haptic sensation (e.g., at a first voltage), a second haptic sensation (e.g., at a second voltage, the same or distinct from the first voltage), a third haptic sensation (e.g., at a third voltage, the same or distinct from the first and second voltages), and a fourth haptic sensation (e.g., at a fourth voltage, the same or distinct from the first, second, and third voltages) all varying in voltage applied to the EO actuator assembly 190.

FIG. 2 illustrates the EO actuator assembly 190 coupled to a phalange of a user, in accordance with some embodiments. Furthermore, FIG. 2 further describes additional methods to increase the pumping areas of a respective EO actuator. In some embodiments, improving the pumping areas improves the response time of the respective EO actuator 182. The response time of a respective EO actuator 182 is determined based on the size of the bubble (e.g., a first bubble 122a and a second bubble 122b) and the pumping area (e.g., the electrode and porous media). In some embodiments, for an array of flexible EO actuators 100 coupled with a wrist-wearable device 800, the array or electroosmotic actuators 100 has a pumping area of 18 mm×6 mm, such that the response time is <50 ms for a 3 mm diameter bubble and <75 ms for a 4 mm diameter bubble.

Additionally, in accordance with a determination than an array of flexible EO actuators 100 is coupled to a wearable glove, the response time is about 150-300 ms including displacement values of about 0.514 mm if the pumping area is limited to the bubble area. Furthermore, with a pumping area of 20 mm$^2$, the response time is <35 ms. FIG. 2 describes two methods to increase the pumping area for improved response times including using multiple pumps, using a larger pump underneath the bubble, or using microchannels to transport fluid across a plane from the reservoir to the actuator location. One method includes multiple pumps, which are used to improve response times. Another method includes a larger pump underneath the bubble, which is used to improve the response time. An additional method includes how using microchannels to transport fluid across the plane from the reservoir to the bubble can improve response time. Additionally, the response time can be improved by reducing channel resistance by increasing the channel sizes in the porous media, reducing fluid viscosity, tortuosity, porous media thickness, or increasing voltage, porosity, pore size, zeta potential, or fluid permittivity. Furthermore, the effective voltage and flow resistance can be optimized by improving the electrode perforation design (e.g., size and density).

Figures 1, 3A:
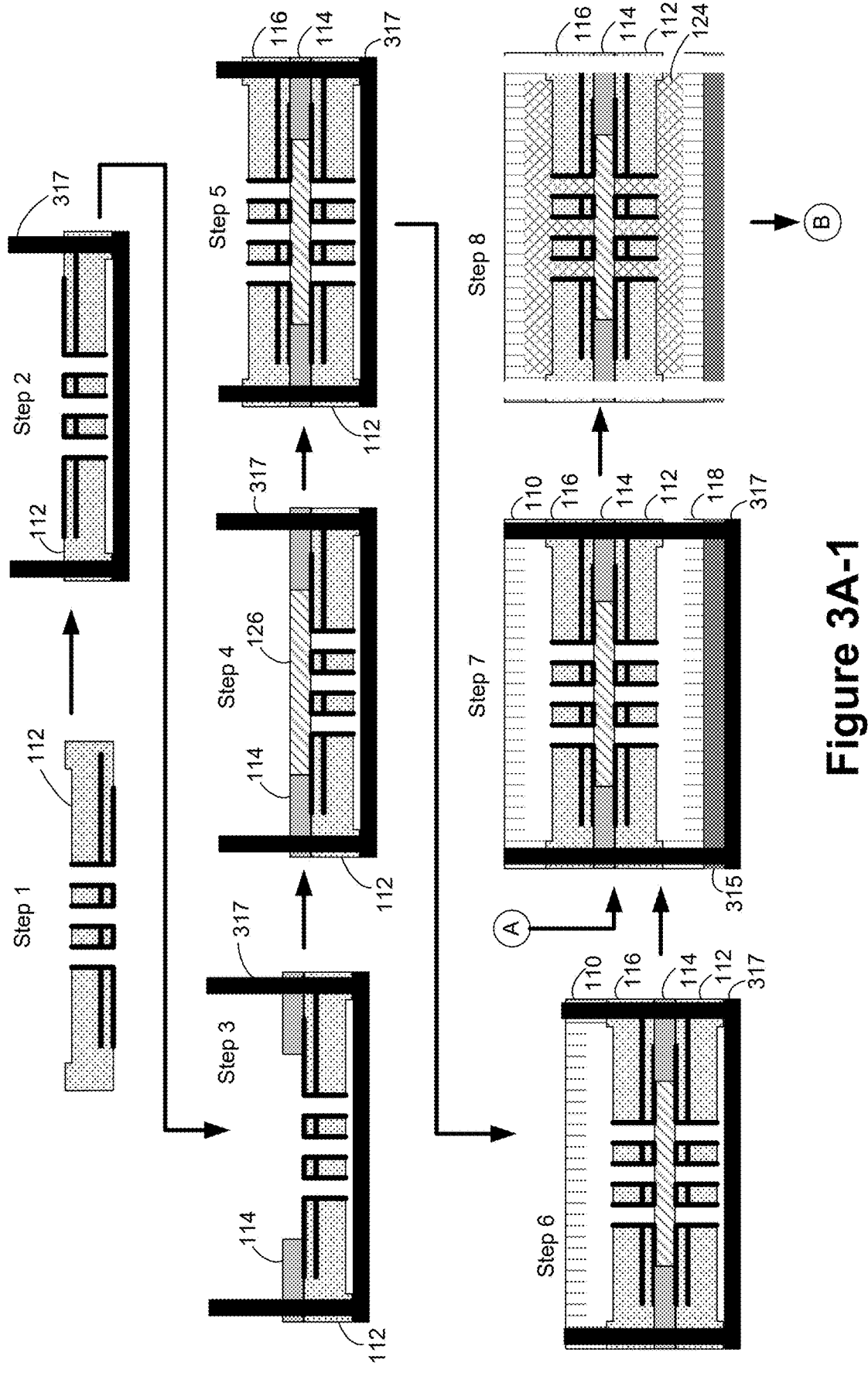
FIGS. 3A-1-3D illustrates a method of manufacturing a respective EO actuator, in accordance with some embodiments.
Figures 2, 3A:
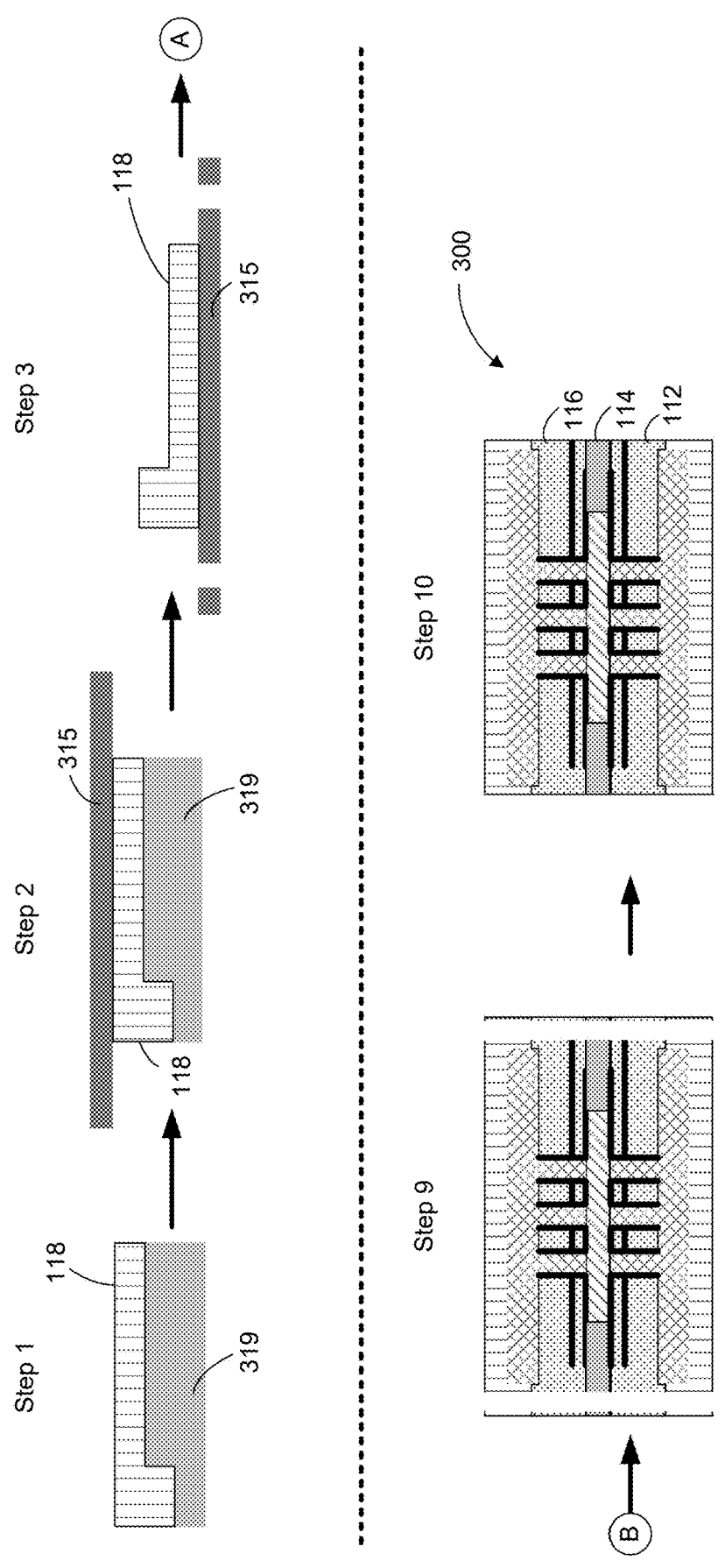
Figures 3B, 3C:
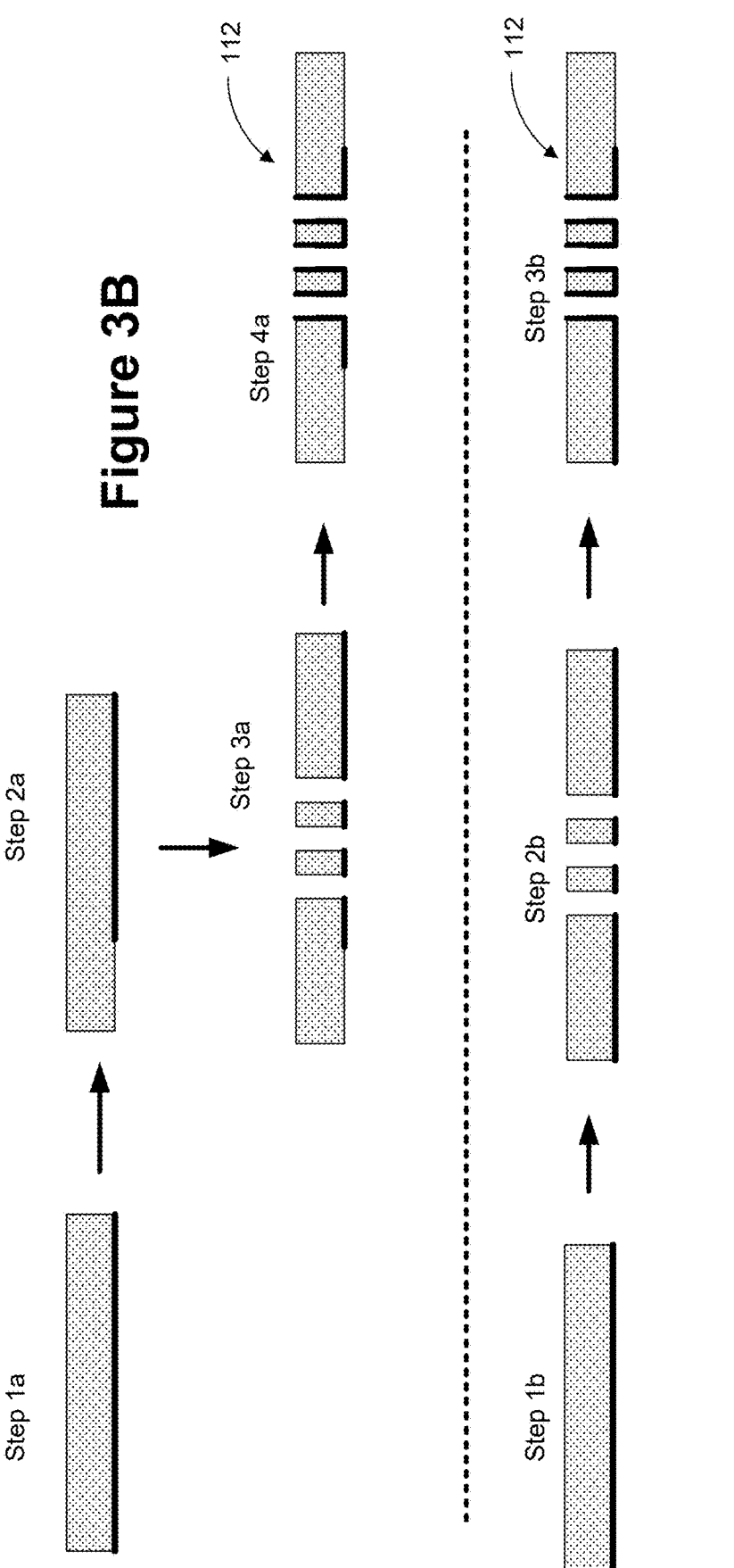
Figure 3D:
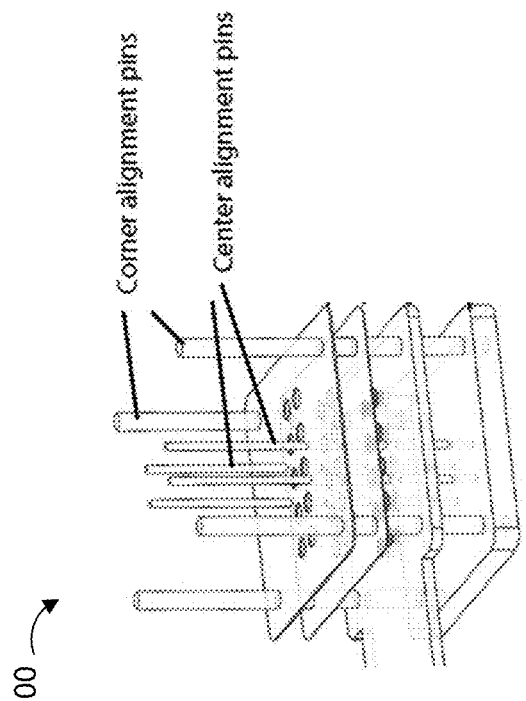

FIGS. 3A-1-3D illustrates a method of manufacturing a respective EO actuator, in accordance with some embodiments. The fabrication processes include at least two main processes: individual layer fabrication and bonding with alignment. Individual layers can be fabricated via patterning methods such as laser and mold patterning. One or more of the layers are coupled using methods that include adhesives and non-adhesives. In some embodiments, the layers are coupled via chemical bonding and/or solder bonding. The first and second FPCB 112 and 116 can include one or more layers. For alignment and bonding processes, the vias need to be aligned to overlap the bubble cavities. In some embodiments, the tolerance in the design is between 300 μm and 400 um for via pitch of 1 mm. This could be released further by changing the via pitch. To maintain the tolerance mentioned, performing mechanical alignment using pins is sufficient. For the alignment of smaller features, other alignment processes with smaller tolerances are used.

FIG. 3A-1 illustrates a set of steps for forming a respective EO actuator 300 of an array of flexible EO actuators 300. The first set of steps shown in FIG. 3A-1 illustrates a cross section of a manufacturing process for forming a respective EO actuator 300. At step 1, a first FPCB 112 is provided. At step 2, the first FPCB 112 is placed on the sample holder 317. At step 3, one or more spacers 114 are disposed on and coupled to the first FPCB 112 via solder bonding. At step 4, a porous material 126 is disposed between the spacers 114 and over a portion of the first FPCB 112, and coupled to, at least, the spacer 114. At step 5, a second FPCB 116 is disposed over and bonded to the spacers 114. At step 5, a bubble layer 110 is bonded to the second FPCB 116 with an adhesive layer, silane bonding, and/or dry film. At step 7, a reservoir layer 118 (which is formed in accordance with the steps shown in FIG. 3A-3) is coupled to the first FPCB 112 (e.g., a surface opposite to the spacers 114). At step 8, the sample holder 317 is removed and a channel in the reservoir layer 118 is filled with fluid 124. Further, as shown steps 9 and 10 (FIG. 3A-3), the reservoir layer 118 is sealed off and the backing 315 is removed, such that excess portions are removed and the respective EO actuator 300 of an array of flexible EO actuators 100 remains.

The additional steps shown in FIG. 3A-2 illustrate a method of manufacturing the reservoir layer 118, in some embodiments. At step 1, the silicone reservoir layer 118 is cast on a mold 319. At step 2, the silicone reservoir 118 layer is transfer casted to the backing 315 film. At step 3, alignment holes are laser drilled into the backing 315 layer. The assembly shown in step 3 is further integrated into step 6 of FIG. 3A-1.

FIGS. 3B and 3C illustrates two customized flexible printed circuit processes with a laser that produces a simplified 1-layer flexible printed circuit. In some embodiments, the first FPCB 112 and the second FPCB 116 are fabricated using one of the following methods. FIG. 3B illustrates a first process that includes pattern routing. At step 1a, copper (Cu) and polyimide layers are provided. At step 2a, a hatch bottom is created with the laser, at step 3a the vias are drilled. At step 4a, electroless nickel immersion gold (ENIG) is performed. ENIG is a metallic surface finish consisting of a thin layer of gold plating over a layer of nickel. An electroless chemical reaction is used to plate a layer nickel onto copper pads. An immersion method is further used to apply gold on top of the nickel layer to cover the pads and traces. FIG. 3C illustrates a second process that excludes pattern routing. At step 1b, Cu and polyimide layers are provided. At step 2b, drilling vias are drilled. At step 3b, ENIG is performed.

FIG. 3D illustrates the assembly of the array of flexible EO actuators 100 utilizing one or more alignment pins (similar to sample holder 317 show in FIGS. 3A-1 and 3A-2), in some embodiments. For example, FIG. 3D further illustrates an example of aligning and bonding with spacers using the small alignment pins close to the center and in the corners to increase alignment accuracy.

FIGS. 4A and 4B illustrate an example of a respective EO actuator coupled to a haptic tactor and the band of a wrist-wearable device, in some embodiments. FIG. 4A illustrates a respective EO actuator 400 at a first point in time t1 while a first voltage (e.g., a positive voltage) is applied to the EO actuator 400 causing the bubble 410a to inflate. FIG. 4B illustrates a respective EO actuator 400 at a second point in time t2 while a second voltage (e.g., a negative voltage) is applied to the EO actuator 400 causing the bubble 410a to deflate. In some embodiments, the respective EO actuator 400 is an instance of the first instance 102a-1 of an EO actuator 182 or the third instance 102b of an EO actuator 182. FIGS. 4A and 4B further illustrates the EO actuator 400 coupled to a wrist-wearable device 412. In some embodiments, the respective EO actuator 400 is positioned between a top layer 412a and a bottom layer 412b of the wrist-wearable device 412, as shown in FIGS. 4A and 4B. The top layer 412a of the wrist-wearable device includes a latching plate 414 that includes magnetic properties. The respective EO actuator 400 includes an individual bubble 410a of the bubble layer 110 coupled to a first end of the haptic tactor 410. The haptic tactor 410 includes a magnetic ring 416 configured to couple to the latching plate 414 at the wrist-wearable device 412 in accordance with a determination that the bubble 410a inflates. In accordance with a determination that a first voltage is applied to the one or more electrodes at the first and/or second FPCB 112 and/or 116, fluid 124 moves from the reservoir 118, through the porous media in the spacer 114, into the bubble layer 110, causing the bubble 410a to inflate. As the bubble 410a inflates, the second end of the haptic tactor 410 (e.g., opposite the end that includes the magnetic ring 416) is configured to move through the top layer 412a of the wrist-wearable device 412 to provide haptic feedback to a user. In some embodiments, in accordance with a determination that the magnetic ring 416 is coupled with the latching plate 414, the voltage can be turned off (e.g., 0 V) to save energy/power while the haptic force remains high. FIG. 4A further illustrates chart 450a showing the voltage at a first point in time t1 such that it starts at 0V and goes to 700 V or less while the bubble 410a is inflated. FIG. 4A is one example of a passive mechanism for energy saving applications for low-frequency and persistent haptics. Furthermore, in some embodiments, the haptic tactor 410 is made bistable to save the energy consumption during holding applications for persistent haptics.

FIG. 4B illustrates a respective EO actuator 400 at a second point in time t2 while a second voltage is applied to the EO actuator 400 causing the bubble 410a to deflate. In accordance with a determination that a second voltage is applied to the one or more electrodes at the first and/or second FPCB 112 and/or 116, fluid 124 moves from the bubble layer 110, through the porous media in the spacer 114 and into reservoir 118, causing the bubble 410a to deflate. As voltage is reversed (e.g., from a positive voltage to a negative voltage is applied), the electroosmotic force pulls the magnetic ring 416 and separates it from the latching plate 414. In other words, when haptic feedback is no longer needed, a reverse voltage can be applied to break the latching/locking, such that the haptic force returns to a minimum. As the bubble 410a deflates, the haptic tactor 410 is configured to move in the direction towards the bottom layer 412b of the wrist-wearable device 412. FIG. 4B further illustrates chart 450b showing the voltage at a second point in time t2 such that the voltage drops from 700V or less at t1 to −700V while the bubble 410a is deflating.

In some embodiments, the power consumed by the array of electroosmotic actuators, scales with pumping area and ranges from 39 mW to 1 W. In some embodiments, the power consumption is improved by reducing dynamic fluid viscosity, increasing fluid permittivity, and/or zeta potential. The power and energy consumption can be further optimized using the coupling method as described with respect to FIGS. 4A and 4B.

Figure 4C:
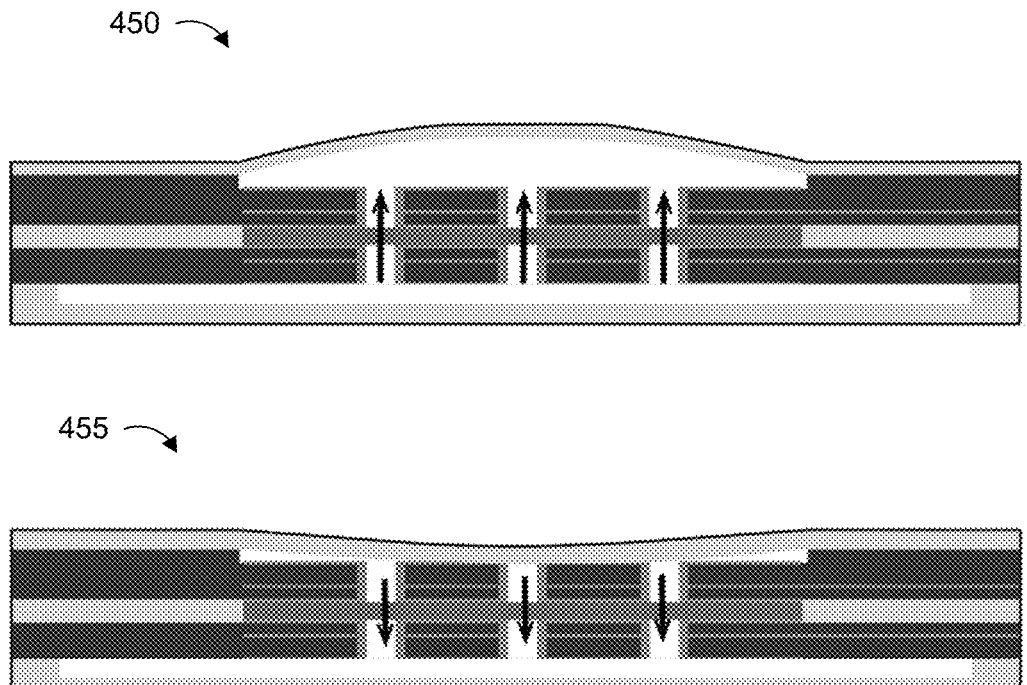
Figure 5:
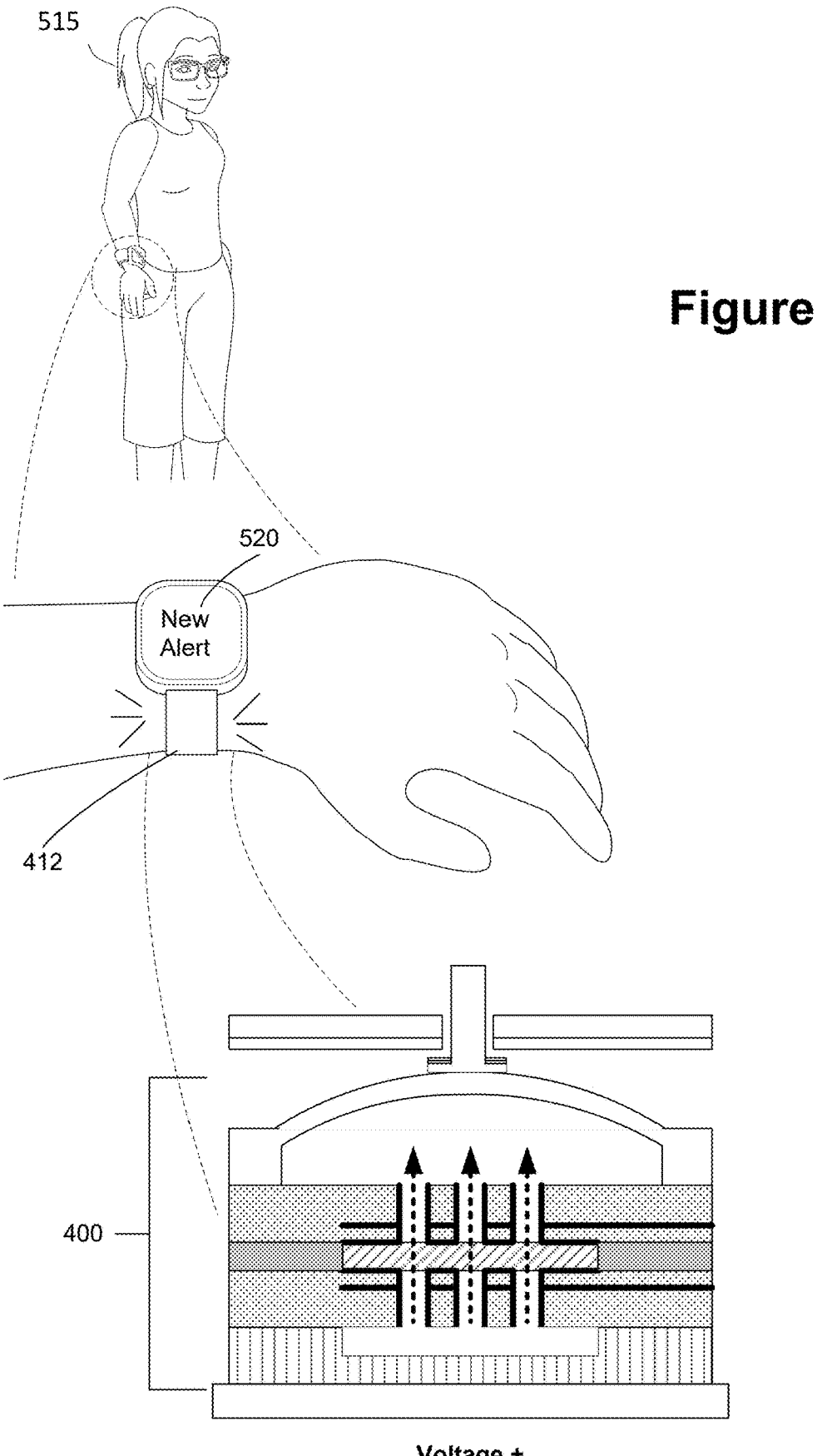
FIG. 5 illustrates an example of a user receiving one or more haptic responses in response to an indication received at a wrist-wearable device, in some embodiments.

FIG. 4C illustrates another example of a passive mechanism to provide haptic responses to a user, in some embodiments. FIG. 4C further illustrates a mechanism for energy saving applications for low-frequency and persistent haptics. In some embodiments, the use of bistable membranes (as illustrated in FIG. 4C) can reduce energy consumption during holding applications to generate persistent haptic feedback. When flow is generated towards the membrane, state 1 450 is activated and the membrane remains in state 1 to produce haptic feedback when flow (voltage) is turned off. When flow (e.g., the voltage is reversed) is generated towards the reservoir, state 2 455 of the membrane is activated and haptic feedback is turned off.

Figure 4D:
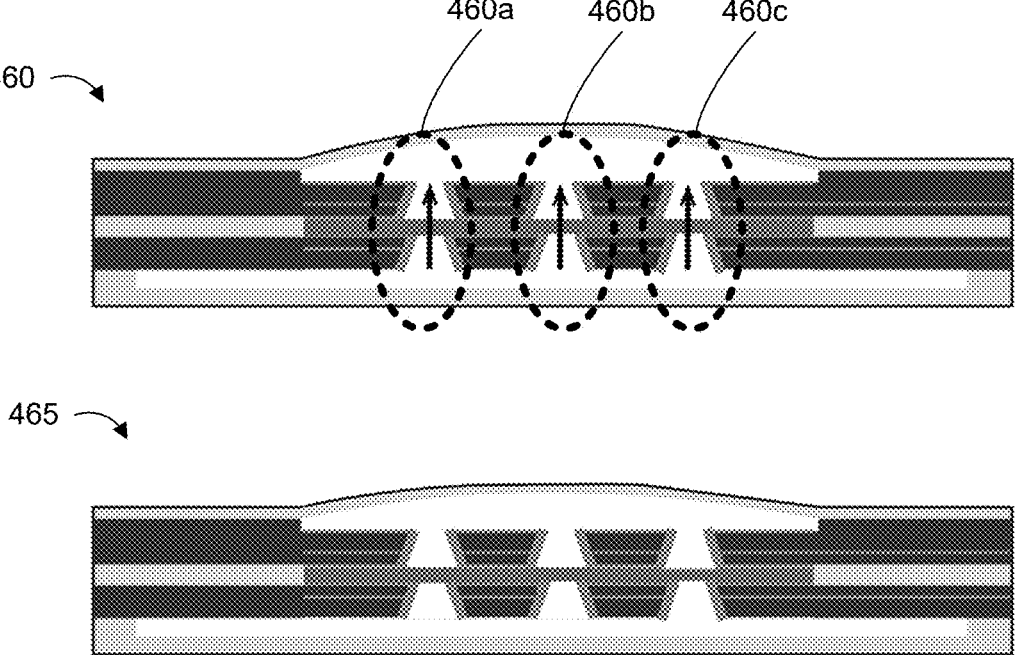

FIG. 4D illustrates another example of a passive mechanism to provide haptic responses to a user, in some embodiments. FIG. 4D further illustrates an additional mechanism for energy saving applications for low-frequency and persistent haptics. FIG. 4D illustrates an instance of modification to the of modified channel structures to modify back flow speed. The modified channel structures create larger resistance to the deflation flow than the inflation flow, thus allowing the bubble to be inflated for longer time without keeping the flow on to save energy consumption for persistent haptics. When the haptic feedback needs to be turned off, active deflation may be applied to accelerate the deflation speed by applying a reverse electric field. A first instance of a modified EO actuator 460 including one or more modified channels 460a-460c. A second instance of a modified EO actuator 465 is at a second point in time and is slightly deflated compared to the first instance of the modified EO actuator 460.

Figure 4E:
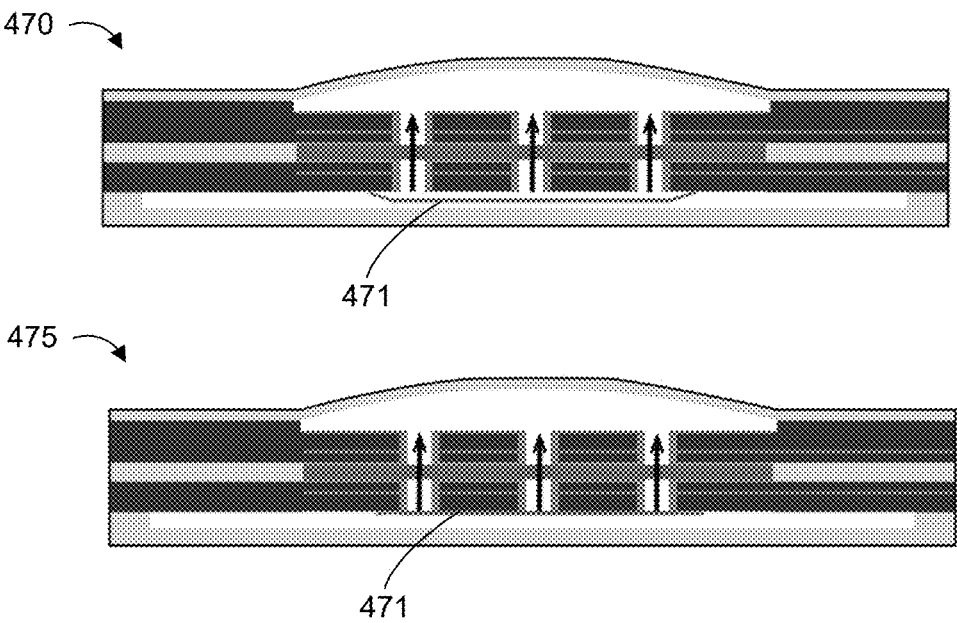

FIG. 4E illustrates an example of an active mechanism for energy saving applications for persistent haptics, in some embodiments. FIG. 4E further illustrates low-power microvalves 471, coupled to the second FPCB 116, configured to control the opening and closing of the fluid channels to save energy consumption during holding applications for low-frequency and persistent haptic feedback. FIG. 4E further illustrates a third instance of a modified EO actuator 470 including one or more microvalves 471 at a third point in time such that the microvalves 471 are in the opened position. A fourth instance of a modified EO actuator 475 is at a fourth point in time and is slightly deflated compared to the third instance of the modified EO actuator 470 and illustrate the microvalves 471 in the closed position.

FIG. 5 illustrates an example of a user receiving one or more haptic responses in response to an indication received at a wrist-wearable device, in some embodiments. FIG. 5 further illustrates a user 515 wearing a wrist-wearable device 412. In some embodiments, the band of the wrist-wearable device 412 is coupled to an array of EO actuators such that each respective actuator of the array of actuators are instances of those illustrated and described in FIGS. 4A and 4B (e.g., respective EO actuator 400). In response to an indication 520 at the wrist-wearable device 412, one or more voltages are provided to the array of EO actuators such that each respective EO actuator is actuated in accordance with the respective notification assigned to the respective indication 520. In some embodiments, the array of EO actuators provide a haptic feedback response that includes varying patterns and pressures recognizable to a user 515 as representing distinct indications 520. For example, if the indication 520 is a text message, one or more respective EO actuators will provide a certain pressure and/or pattern of haptic feedback to the user 515 such that the user 515 is notified they have received a text message. In another example, if the indication 520 is a phone call, the one or more respective EO actuators will provide more pressure and different pattern of haptic feedback to a user that represents the phone call to the user 515. The indication 520 can include phone calls, video calls, text messages, news bulletins etc.

FIG. 6 shows an example of a method flow chart for actuating an electroosmotic actuator, in accordance with some embodiments. Operations (e.g., steps) of the method 600 can be performed by one or more processors (e.g., central processing unit and/or MCU) of the systems and the devices described above in reference to FIGS. 1A-5. At least some of the operations shown in FIG. 6 correspond to instructions stored in a computer memory or computer-readable storage medium (e.g., storage, RAM, and/or memory) of the systems and devices illustrated in FIGS. 1A-5. Operations of the method 600 can be performed by a single device alone or in conjunction with one or more processors and/or hardware components of another communicatively coupled device (e.g., such as the systems shown in FIGS. 1A-5) and/or instructions stored in memory or computer-readable medium of the other device communicatively coupled to the system (e.g., a head-wearable device, wrist-wearable device, and wearable glove). In some embodiments, the various operations of the methods described herein are interchangeable and/or optional, and respective operations of the methods are performed by any of the aforementioned devices, systems, or combination of devices and/or systems. For convenience, the method operations will be described below as being performed by particular component or device, but should not be construed as limiting the performance of the operation to the particular device in all embodiments.

(A1) The method 600 occurs (602) at a wearable device (e.g., wrist-wearable device 412, wearable glove) coupled to an electroosmotic actuator configured to generate a haptic response. The electroosmotic actuator includes a flexible structure with a non-zero thickness (e.g., less than 2 millimeters (mm)) configured to be worn on a portion of a user's body. The flexible structure includes a flexible printed circuit board having a plurality of electrodes, a fluid-filled reservoir (e.g., reservoir 118), individually-controlled pouches (e.g., first bubble 122a, second bubble 122b) in fluid communication with the fluid-filled reservoir (e.g., reservoir 118), and a respective individually-controlled pouch associated with two electrodes of the plurality of electrodes. The method further includes receiving (604), at the wearable device, instructions (e.g., indication 520) to provide haptic feedback by actuating one or more electroosmotic actuators (e.g., respective EO actuator 182 and/or 400) of the array of electroosmotic actuators. The method further includes responsive (606) to the instructions for actuating one or more electroosmotic actuators, providing a voltage less than 700 V to two electrodes of the plurality of electrodes such that fluid (e.g., fluid 124) from the fluid-filled reservoir moves into the respective individually-controlled pouch of the individually-controlled pouches, thereby causing haptic feedback (e.g., to the portion of the user's body on which the flexible structure is worn).

(A2) In some embodiments of A1, while fluid from the fluid-filled reservoir moves into the respective individually-controlled pouch of the individually-controlled pouches, the fluid travels through at least two channels in the flexible structure from the fluid-filled reservoir to the respective individually-controlled pouch of the individually-controlled pouches. For example, as illustrated in FIG. 1 in the first instance 102a-1 of an EO actuator 182 there are 3 channels that the first fluid 124a travels through to get from the reservoir 118a to the first bubble 122a. Each respective bubble of each respective EO actuator 182 includes at least 2 channels connecting the fluid 124 from the reservoir to the bubble.

(A3) In some embodiments of A2, where the at least two channels include a porous media (e.g., porous material 126), such that when the fluid (e.g., fluid 124) from the fluid-filled reservoir (e.g., reservoir 118) moves into the respective individually-controlled pouch of the individually-controlled pouches, the fluid (e.g., fluid 124) travels through the porous media (e.g., 126). For example, as shown in FIG. 1, in accordance with a determination that a voltage is provided to the flexible structure, the fluid 124 travels through the channels to the bubbles (e.g., first bubble 122a). Although the first and second FPCBs 112 and 116 include drilled holes to pass through, the spacer 114 includes a porous material 126 which the fluid 124 must travel through for the fluid to reach the bubble. (e.g., first bubble 122a).

(A4) In some embodiments of A1, where the flexible structure further includes: the flexible printed circuit board (FPCB) is a first FPCB (e.g., first FPCB 112), a bubble layer (e.g., bubble layer 110), including at least one individually-controlled-pouch of the individually-controlled pouches (e.g., first bubble 122a), coupled to a first portion of the FPCB, one or more spacers coupled a second portion (e.g., spacer 114), distinct from the first portion, of the FPCB, a porous media (e.g., porous material 126) coupled to the one or more spacers, a first portion of a second FPCB (e.g., second FPCB 116) coupled to the one or more spacers, the fluid-filled reservoir (e.g., reservoir 118) configured to hold fluid (e.g., fluid 124) coupled to a second portion of the second FPCB, distinct from the first portion of the FPCB, and, a cap coupled to the fluid-filled reservoir. For example, as illustrated in FIG. 1, each respective EO actuator 182 includes a plurality of layers that make up each respective EO actuator 182. In some embodiments, the fluid 124 in the reservoir 118 is an electrolyte. In some embodiments, the first and second FPCBs 112 and 116 include holes that create channels which are less than 250 μm in diameter.

(A5) In some embodiments of A4, where the porous media (e.g., porous material 126) is a glass material.

(A6) In some embodiments of A1, where causing haptic feedback includes providing pressure to the portion of the user's body on which the flexible structure is worn, wherein the pressure ranges between-50 kPa to 100 kPa. In some embodiments, the pressure provided by an individual bubble 122a of a respective EO actuator 182 ranges from −50 kPa to +100 kPa. In some embodiments, pressure of −50 kPa to +100 kPa has been achieved in with a 2 mm diameter bubble 122a, which is higher than the pressure required for wearable glove fine tactile pressure.

(A7) In some embodiments of A1, the voltage less than 700 V provided to the two electrodes is a non-zero voltage less than 700 V. In some embodiments, the voltage provided ranges between 1V and 700 V.

(A8) In some embodiments of A1, where the flexible structure includes one or more circuits that consumes 39 milliwatts (mW) to 1 W of power. In some embodiments, the power consumption range is 39 mW to 1 W while still maintaining active EO actuator 182 actuations.

(A9) In some embodiments of A1, where the fluid-filled reservoir (e.g., reservoir 118) has a non-zero thickness between 0.3 millimeters (mm) and 1 mm. In the embodiments, the thickness of reservoir 118 is modified to provide a thinner overall EO actuator 182 as described in FIG. 1. As described with respect to FIG. 1, the first reservoir 118a of first instance 102a-1 of an EO actuator 182 has a thickness of 0.8 and third instance 102b of an EO actuator 182 has a reservoir thickness of 0.4 which increases the reservoir capacity while making the design as a whole thinner.

(A10) In some embodiments of A1, where the respective individually-controlled pouch of the individually-controlled pouches has a non-zero thickness between 0.05 millimeters (mm) and 0.7 mm. In some embodiments, height of the reservoir where fluid is filled is 200 micrometers and the height of the bubble where the fluid is filled is also 200 micrometers. After the EO actuator 182 is actuated causing the bubble to fill with the fluid 124, the filled bubble is a little under 400 micrometers.

(A11) In some embodiments of A1, the flexible structure with a non-zero thickness less than 2 millimeters (mm) is a range between 0.5 mm and 1.9 mm. In some embodiments, as described with respect to FIG. 1, the thickness of the first instance 102*a*-1 of an EO actuator 182 is less than 2 mm and the third instance 102*b* of an EO actuator 182 is less than 1.5 mm.

(A12) In some embodiments of A1, the electroosmotic actuator is a first electroosmotic actuator (e.g., respective EO actuator 182) of an array of electroosmotic actuators (e.g., array of flexible EO actuators 100) and the array of electroosmotic actuators is coupled to a wearable device (e.g., wrist-wearable device 412). The respective individually-controlled pouch (e.g., first bubble 122*a*) of the individually-controlled pouches is coupled to a first end of a haptic tactor (e.g., haptic tactor 410), a second end of the haptic tactor is configured move through a first portion (e.g., a top layer 412*a* of the wrist-wearable device 412) of the wearable device, and the first end of the haptic tactor includes a first magnetic component (e.g., a magnetic ring 416) configured to couple to the first portion of the wearable device in accordance with a determination that the non-zero voltage (V) less than 700 V provided to the two electrodes is a positive value. As described and illustrated in FIGS. 4A and 4B, when a positive voltage is applied to the EO actuator 400, the bubble 410*a* inflates which moves the haptic tactor 410 towards the top layer 412*a* of the wrist-wearable device 412 and the magnetic ring 416 on the haptic tactor 410 couples to the latching plate 414 coupled with the wrist-wearable device 412.

(A13) In some embodiments of A12, in accordance with a determination that a second non-zero voltage (V) less than 700 V is provided to the two electrodes and is a negative value, fluid (e.g., fluid 124) from the respective individually-controlled pouch (e.g., bubble 410*a*) of the individually-controlled pouches moves into the fluid-filled reservoir (e.g., reservoir 118), thereby causing the magnetic component (e.g., the magnetic ring 416) at the first end of the haptic tactor (e.g., haptic tactor 410) to separate from the first portion of the wearable device (e.g., top layer 412*a* of the wrist-wearable device 412). As described in FIG. 4B, when a negative voltage is applied to the EO actuator 400, the bubble 410*a* deflates the haptic tactor moves toward the bottom layer 412*b* of the wrist-wearable device 412.

(B1) In accordance with some embodiments, a system comprises an array of electroosmotic actuators and a wearable device. The system further includes each electroosmotic actuator (e.g., respective EO actuator 182) of the array of electroosmotic actuators (e.g., array of flexible EO actuators 100) comprises at least one flexible printed circuit (e.g., first FPCB 112 and/or second FPCB 116) board having a plurality of electrodes, a fluid-filled reservoir (e.g., reservoir 118), and individually-controlled pouches (e.g., first bubble 122*a*) in fluid communication with the fluid-filled reservoir, a respective individually-controlled pouch associated with two electrodes of the plurality of electrodes. The system further includes the array of electroosmotic actuators is coupled to a portion of the wearable device (e.g., wrist-wearable device 412), such that when the wearable device and the array of electroosmotic actuators are worn on a portion of a user's body, the system is configured to, in response to receiving, at the wearable device, instructions to provide haptic feedback to the user via a respective electroosmotic actuator of the array of electroosmotic actuators, causing, the respective electroosmotic actuator to generate a haptic response, wherein causing, the electroosmotic actuator to generate the haptic response includes providing a voltage less than 700 V to the two electrodes of the plurality of electrodes such that fluid from the fluid-filled reservoir moves into the respective individually-controlled pouch of the individually-controlled pouches, thereby causing haptic feedback to the portion of the user's body on which the wearable device and the electroosmotic actuator are worn.

(B2) In some embodiments of B1, wherein the wearable device is at least one of: a wrist-wearable device (e.g., wrist-wearable device 412) or a wearable glove (e.g., smart textile-based garment 1100). In some embodiments, the wearable device can be worn on any part of the user's body (e.g., arm, leg, head, feet, etc.).

(B3) In some embodiments of any of B1-B2, wherein the array of electroosmotic actuators is configured in accordance with and/or configured to perform the operations of any of A1-A13.

(C1) In accordance with some embodiments, a method of manufacturing an electroosmotic actuator is disclosed. The method includes providing a first flexible printed circuit board (e.g., first FPCB 112 and/or second FPCB 116) including one or more channels, coupling a bubble layer (e.g., bubble layer 110) to a first portion of the FPCB, coupling one or more spacers to a second portion, distinct from the first portion, of the FPCB, coupling a porous media (e.g., porous material 126) to the one or more spacers (e.g., spacer 114), coupling a first portion of a second FPCB to the one or more spacers, coupling a reservoir (e.g., reservoir 118) configured to hold fluid (e.g., fluid 124) to a second portion of the second FPCB, filling the reservoir with fluid, and capping the fluid filling channel.

(C2) In some embodiments of C1, wherein the electroosmotic actuator is configured in accordance with and/or configured to perform the operations of any of A1-A13.

(D1) In accordance with some embodiments, a non-transitory computer-readable storage medium storing executable instructions is disclosed. When the executable instructions are executed by one or more processors of a wearable device (e.g., wrist-wearable device 800, smart textile-based garment 1100), they cause the wearable device to, in response to receiving instructions to provide haptic feedback to a user via an electroosmotic actuator (e.g., respective EO actuator 182) of an array of individually controlled electroosmotic actuators (e.g., array of flexible EO actuators 100) coupled to a portion of the wearable device, cause, the electroosmotic actuator to generate a haptic response. Causing the electroosmotic actuator to generate the haptic response includes providing a non-zero voltage less than 700 V to a portion of a flexible structure of the electroosmotic actuator, such that fluid from a fluid-filled reservoir coupled to the flexible structure moves into a respective individually-controlled pouch of the flexible structure, thereby causing haptic feedback to be provided to the user.

(D2) In some embodiments of D1, wherein the electroosmotic actuator is configured in accordance with any of A1-A13 and the executable instructions, when executed by the one or more processors of the wearable device, cause the electroosmotic actuator to perform the operations of any of A1-A13.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 800, a head-wearable device, an HIPD 1000, a smart textile-based garment 1100, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of bio-potential-signal sensors include: (i) electroencephalography (EEG) sensors configured to measure electrical activity in the brain to diagnose neurological disorders; (ii) electrocar-diogramar EKG) sensors configured to measure electrical activity of the heart to diagnose heart problems; (iii) elec-tromyography (EMG) sensors configured to measure the electrical activity of muscles and diagnose neuromuscular disorders; (iv) electrooculography (EOG) sensors config-ured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunc-tion with data and/or one or more components of a device or communicatively coupled devices to perform one or more operations and/or functions.

As described herein, communication interface modules can include hardware and/or software capable of data com-munications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired proto-cols (e.g., Ethernet or HomePlug), and/or any other suitable communication protocol, including communication proto-cols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application program-ming interfaces (APIs) and protocols such as HTTP and TCP/IP).

As described herein, a graphics module is a component or software module that is designed to handle graphical opera-tions and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems 7A-7D-2

Figure 7A:
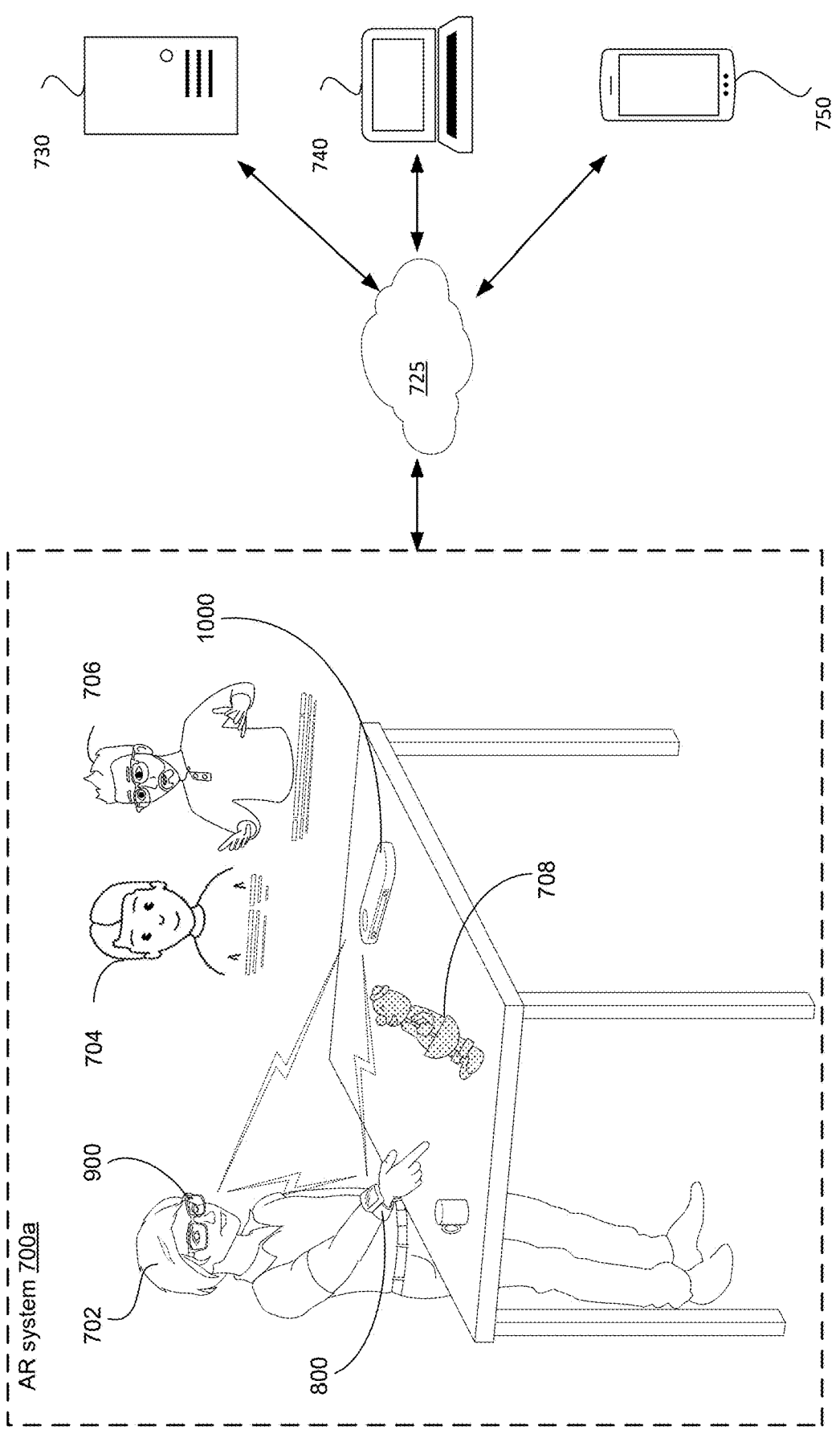
Figure 7B:
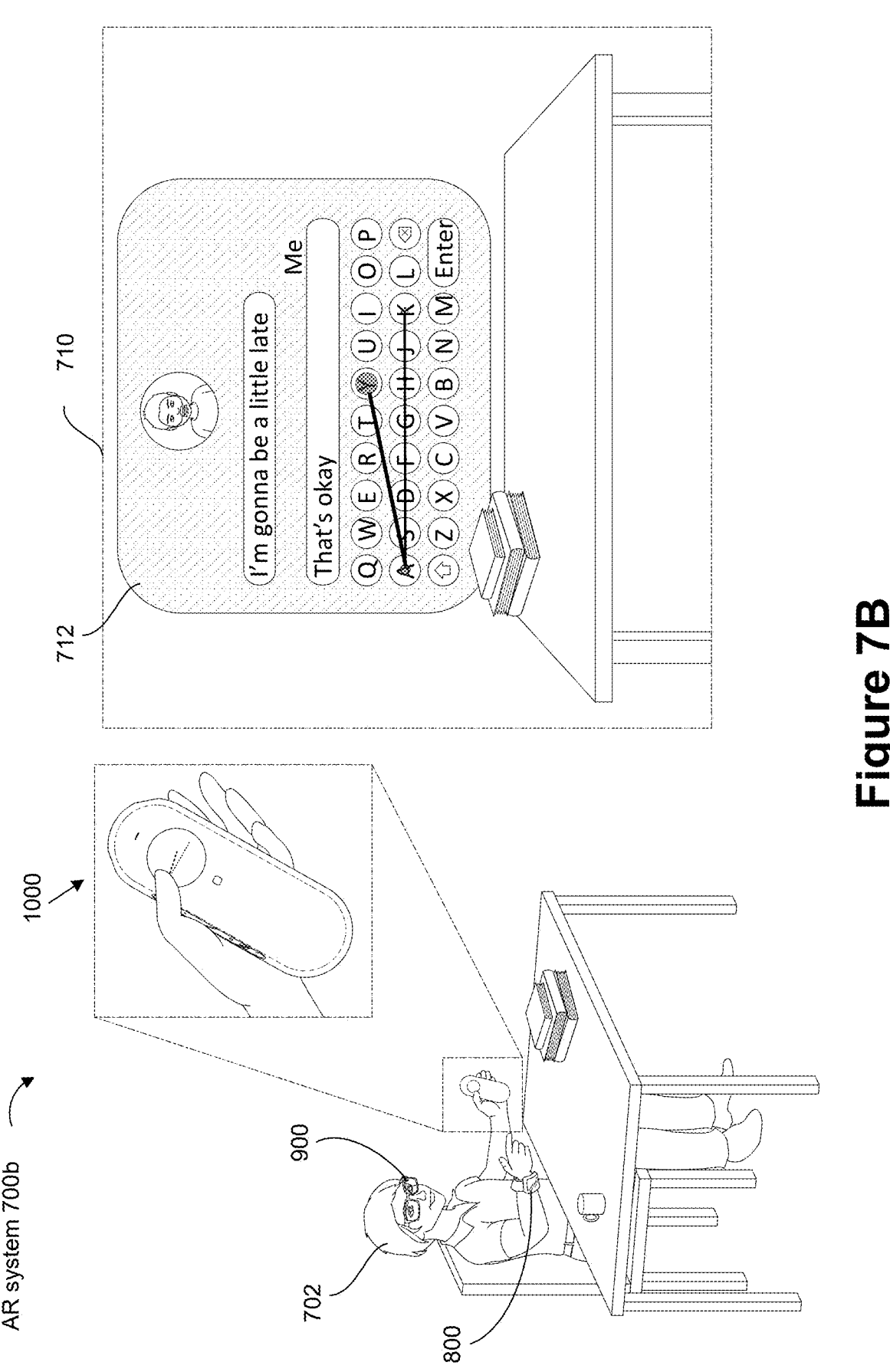
Figures 1, 7C:
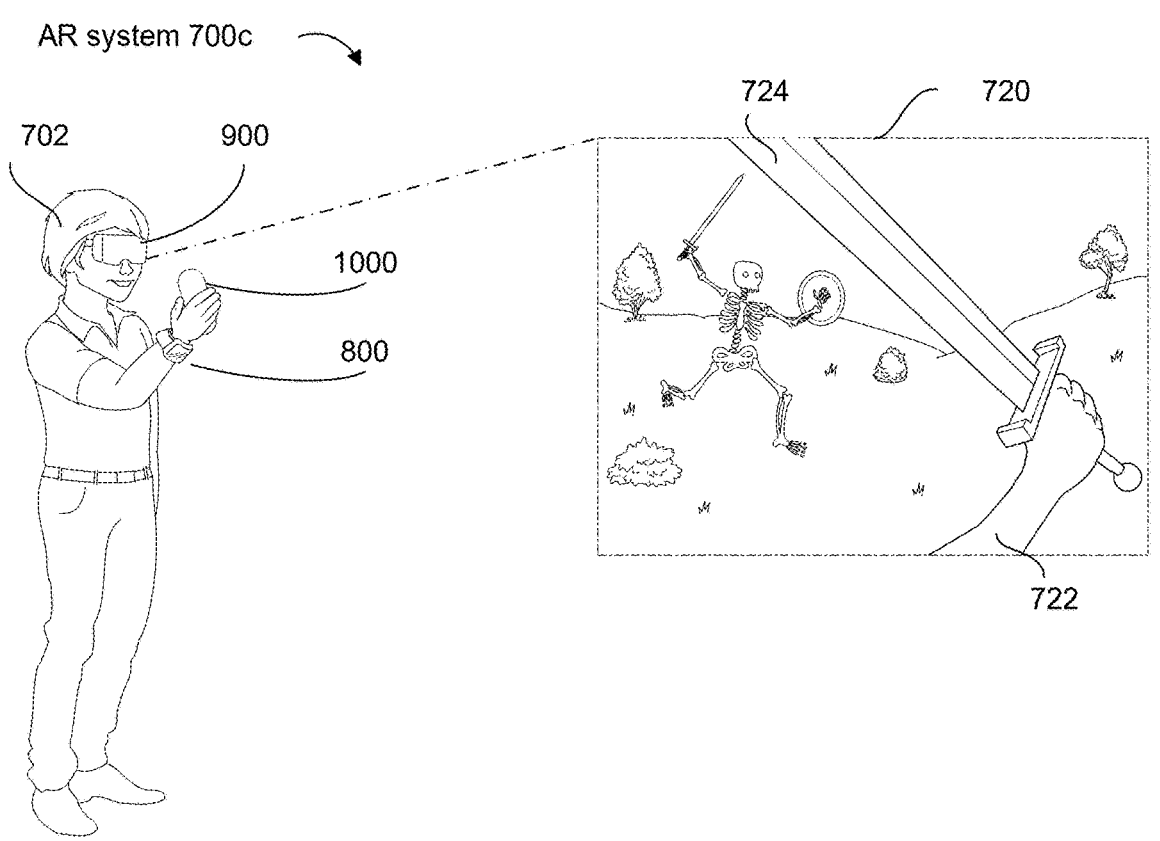
Figures 2, 7C:
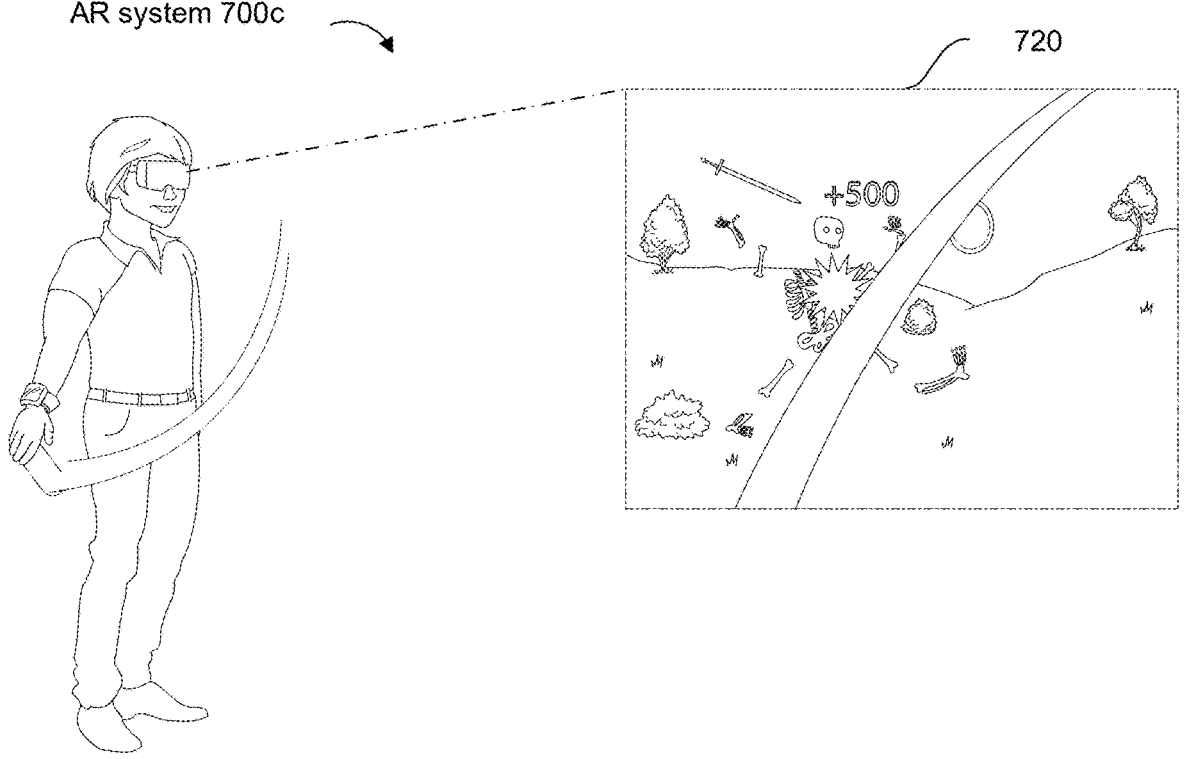

FIGS. 7A, 7B, 7C-1, 7C-2, 7D-1, and 7D-2 illustrate example AR systems, in accordance with some embodi-ments. FIG. 7A shows a first AR system 700a and first example user interactions using a wrist-wearable device 800, a head-wearable device (e.g., AR device 900), and/or a handheld intermediary processing device (HIPD) 1000. FIG. 7B shows a second AR system 700b and second example user interactions using a wrist-wearable device 800, AR device 900, and/or an HIPD 1000. FIGS. 7C-1 and 7C-2 show a third AR system 700c and third example user

Figures 1, 7D:
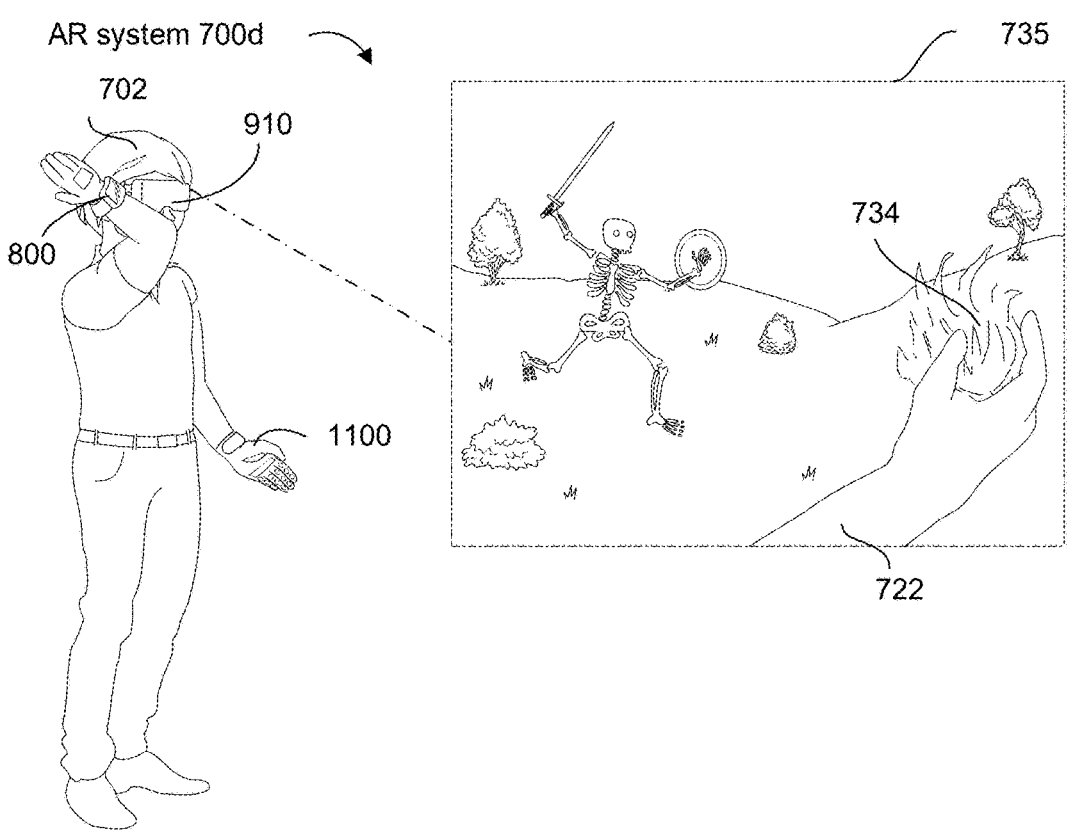
Figures 2, 7D:
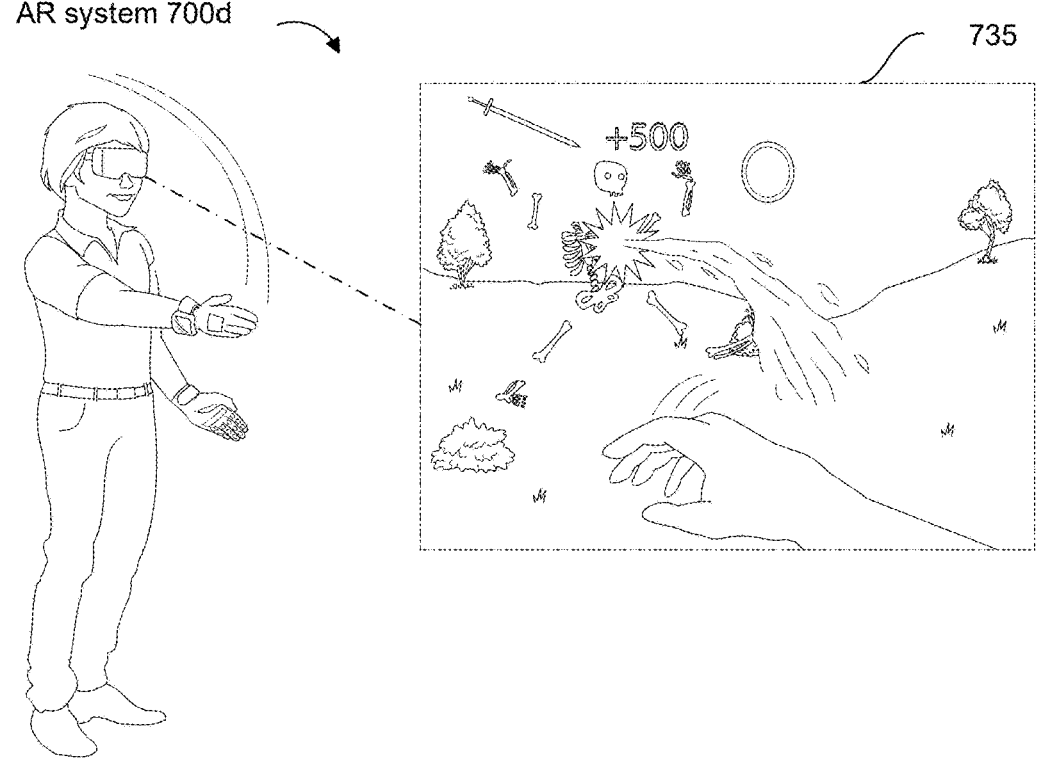

20 interactions using a wrist-wearable device 800, a head-wearable device (e.g., virtual-reality (VR) device 910), and/or an HIPD 1000. FIGS. 7D-1 and 7D-2 show a fourth AR system 700d and fourth example user interactions using a wrist-wearable device 800, VR device 910, and/or a smart textile-based garment 1100 (e.g., wearable gloves, haptic gloves). As the skilled artisan will appreciate upon reading the descriptions provided herein, the above-example AR systems (described in detail below) can perform various functions and/or operations described above with reference to FIGS. 1A-5.

The wrist-wearable device 800 and its constituent com-ponents are described below in reference to FIGS. 8A-8B, the head-wearable devices and their constituent components are described below in reference to FIGS. 9A-9D, and the HIPD 1000 and its constituent components are described below in reference to FIGS. 10A-10B. The smart textile-based garment 1100 and its one or more components are described below in reference to FIGS. 11A-11C. The wrist-wearable device 800, the head-wearable devices, and/or the HIPD 1000 can communicatively couple via a network 725 (e.g., cellular, near field, Wi-Fi, personal area network, or wireless LAN). Additionally, the wrist-wearable device 800, the head-wearable devices, and/or the HIPD 1000 can also communicatively couple with one or more servers 730, computers 740 (e.g., laptops or computers), mobile devices 750 (e.g., smartphones or tablets), and/or other electronic devices via the network 725 (e.g., cellular, near field, Wi-Fi, personal area network, or wireless LAN). Similarly, the smart textile-based garment 1100, when used, can also communicatively couple with the wrist-wearable device 800, the head-wearable devices, the HIPD 1000, the one or more servers 730, the computers 740, the mobile devices 750, and/or other electronic devices via the network 725.

Turning to FIG. 7A, a user 702 is shown wearing the wrist-wearable device 800 and the AR device 900, and having the HIPD 1000 on their desk. The wrist-wearable device 800, the AR device 900, and the HIPD 1000 facilitate user interaction with an AR environment. In particular, as shown by the first AR system 700a, the wrist-wearable device 800, the AR device 900, and/or the HIPD 1000 cause presentation of one or more avatars 704, digital representa-tions of contacts 706, and virtual objects 708. As discussed below, the user 702 can interact with the one or more avatars 704, digital representations of the contacts 706, and virtual objects 708 via the wrist-wearable device 800, the AR device 900, and/or the HIPD 1000.

The user 702 can use any of the wrist-wearable device 800, the AR device 900, and/or the HIPD 1000 to provide user inputs. For example, the user 702 can perform one or more hand gestures that are detected by the wrist-wearable device 800 (e.g., using one or more EMG sensors and/or IMUs, described below in reference to FIGS. 8A-8B) and/or AR device 900 (e.g., using one or more image sensors or cameras, described below in reference to FIGS. 9A-9B) to provide a user input. Alternatively, or additionally, the user 702 can provide a user input via one or more touch surfaces of the wrist-wearable device 800, the AR device 900, and/or the HIPD 1000, and/or voice commands captured by a microphone of the wrist-wearable device 800, the AR device 900, and/or the HIPD 1000. In some embodiments, the wrist-wearable device 800, the AR device 900, and/or the HIPD 1000 include a digital assistant to help the user in providing a user input (e.g., completing a sequence of operations, suggesting different operations or commands, providing reminders, or confirming a command). In some embodiments, the user 702 can provide a user input via one or more facial gestures and/or facial expressions. For example, cameras of the wrist-wearable device 800, the AR device 900, and/or the HIPD 1000 can track the user 702's eyes for navigating a user interface.

The wrist-wearable device 800, the AR device 900, and/or the HIPD 1000 can operate alone or in conjunction to allow the user 702 to interact with the AR environment. In some embodiments, the HIPD 1000 is configured to operate as a central hub or control center for the wrist-wearable device 800, the AR device 900, and/or another communicatively coupled device. For example, the user 702 can provide an input to interact with the AR environment at any of the wrist-wearable device 800, the AR device 900, and/or the HIPD 1000, and the HIPD 1000 can identify one or more back-end and front-end tasks to cause the performance of the requested interaction and distribute instructions to cause the performance of the one or more back-end and front-end tasks at the wrist-wearable device 800, the AR device 900, and/or the HIPD 1000. In some embodiments, a back-end task is a background-processing task that is not perceptible by the user (e.g., rendering content, decompression, or compression), and a front-end task is a user-facing task that is perceptible to the user (e.g., presenting information to the user or providing feedback to the user). As described below in reference to FIGS. 10A-10B, the HIPD 1000 can perform the back-end tasks and provide the wrist-wearable device 800 and/or the AR device 900 operational data corresponding to the performed back-end tasks such that the wrist-wearable device 800 and/or the AR device 900 can perform the front-end tasks. In this way, the HIPD 1000, which has more computational resources and greater thermal headroom than the wrist-wearable device 800 and/or the AR device 900, performs computationally intensive tasks and reduces the computer resource utilization and/or power usage of the wrist-wearable device 800 and/or the AR device 900.

In the example shown by the first AR system 700a, the HIPD 1000 identifies one or more back-end tasks and front-end tasks associated with a user request to initiate an AR video call with one or more other users (represented by the avatar 704 and the digital representation of the contact 706) and distributes instructions to cause the performance of the one or more back-end tasks and front-end tasks. In particular, the HIPD 1000 performs back-end tasks for processing and/or rendering image data (and other data) associated with the AR video call and provides operational data associated with the performed back-end tasks to the AR device 900 such that the AR device 900 performs front-end tasks for presenting the AR video call (e.g., presenting the avatar 704 and the digital representation of the contact 706).

In some embodiments, the HIPD 1000 can operate as a focal or anchor point for causing the presentation of information. This allows the user 702 to be generally aware of where information is presented. For example, as shown in the first AR system 700a, the avatar 704 and the digital representation of the contact 706 are presented above the HIPD 1000. In particular, the HIPD 1000 and the AR device 900 operate in conjunction to determine a location for presenting the avatar 704 and the digital representation of the contact 706. In some embodiments, information can be presented within a predetermined distance from the HIPD 1000 (e.g., within five meters). For example, as shown in the first AR system 700a, virtual object 708 is presented on the desk some distance from the HIPD 1000. Similar to the above example, the HIPD 1000 and the AR device 900 can operate in conjunction to determine a location for presenting the virtual object 708. Alternatively, in some embodiments, presentation of information is not bound by the HIPD 1000. More specifically, the avatar 704, the digital representation of the contact 706, and the virtual object 708 do not have to be presented within a predetermined distance of the HIPD 1000.

User inputs provided at the wrist-wearable device 800, the AR device 900, and/or the HIPD 1000 are coordinated such that the user can use any device to initiate, continue, and/or complete an operation. For example, the user 702 can provide a user input to the AR device 900 to cause the AR device 900 to present the virtual object 708 and, while the virtual object 708 is presented by the AR device 900, the user 702 can provide one or more hand gestures via the wrist-wearable device 800 to interact and/or manipulate the virtual object 708.

FIG. 7B shows the user 702 wearing the wrist-wearable device 800 and the AR device 900, and holding the HIPD 1000. In the second AR system 700b, the wrist-wearable device 800, the AR device 900, and/or the HIPD 1000 are used to receive and/or provide one or more messages to a contact of the user 702. In particular, the wrist-wearable device 800, the AR device 900, and/or the HIPD 1000 detect and coordinate one or more user inputs to initiate a messaging application and prepare a response to a received message via the messaging application.

In some embodiments, the user 702 initiates, via a user input, an application on the wrist-wearable device 800, the AR device 900, and/or the HIPD 1000 that causes the application to initiate on at least one device. For example, in the second AR system 700b, the user 702 performs a hand gesture associated with a command for initiating a messaging application (represented by messaging user interface 712), the wrist-wearable device 800 detects the hand gesture, and, based on a determination that the user 702 is wearing AR device 900, causes the AR device 900 to present a messaging user interface 712 of the messaging application. The AR device 900 can present the messaging user interface 712 to the user 702 via its display (e.g., as shown by user 702's field of view 710). In some embodiments, the application is initiated and can be run on the device (e.g., the wrist-wearable device 800, the AR device 900, and/or the HIPD 1000) that detects the user input to initiate the application, and the device provides another device operational data to cause the presentation of the messaging application. For example, the wrist-wearable device 800 can detect the user input to initiate a messaging application, initiate and run the messaging application, and provide operational data to the AR device 900 and/or the HIPD 1000 to cause presentation of the messaging application. Alternatively, the application can be initiated and run at a device other than the device that detected the user input. For example, the wrist-wearable device 800 can detect the hand gesture associated with initiating the messaging application and cause the HIPD 1000 to run the messaging application and coordinate the presentation of the messaging application.

Further, the user 702 can provide a user input provided at the wrist-wearable device 800, the AR device 900, and/or the HIPD 1000 to continue and/or complete an operation initiated at another device. For example, after initiating the messaging application via the wrist-wearable device 800 and while the AR device 900 presents the messaging user interface 712, the user 702 can provide an input at the HIPD 1000 to prepare a response (e.g., shown by the swipe gesture performed on the HIPD 1000). The user 702's gestures performed on the HIPD 1000 can be provided and/or displayed on another device. For example, the user 702's swipe gestures performed on the HIPD 1000 are displayed on a virtual keyboard of the messaging user interface 712 displayed by the AR device 900.

In some embodiments, the wrist-wearable device 800, the AR device 900, the HIPD 1000, and/or other communicatively coupled devices can present one or more notifications to the user 702. The notification can be an indication of a new message, an incoming call, an application update, a status update, etc. The user 702 can select the notification via the wrist-wearable device 800, the AR device 900, or the HIPD 1000 and cause presentation of an application or operation associated with the notification on at least one device. For example, the user 702 can receive a notification that a message was received at the wrist-wearable device 800, the AR device 900, the HIPD 1000, and/or other communicatively coupled device and provide a user input at the wrist-wearable device 800, the AR device 900, and/or the HIPD 1000 to review the notification, and the device detecting the user input can cause an application associated with the notification to be initiated and/or presented at the wrist-wearable device 800, the AR device 900, and/or the HIPD 1000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 900 can present to the user 702 game application data and the HIPD 1000 can use a controller to provide inputs to the game. Similarly, the user 702 can use the wrist-wearable device 800 to initiate a camera of the AR device 900, and the user can use the wrist-wearable device 800, the AR device 900, and/or the HIPD 1000 to manipulate the image capture (e.g., zoom in or out or apply filters) and capture image data.

Turning to FIGS. 7C-1 and 7C-2, the user 702 is shown wearing the wrist-wearable device 800 and a VR device 910, and holding the HIPD 1000. In the third AR system 700*c*, the wrist-wearable device 800, the VR device 910, and/or the HIPD 1000 are used to interact within an AR environment, such as a VR game or other AR application. While the VR device 910 presents a representation of a VR game (e.g., first AR game environment 720) to the user 702, the wrist-wearable device 800, the VR device 910, and/or the HIPD 1000 detect and coordinate one or more user inputs to allow the user 702 to interact with the VR game.

In some embodiments, the user 702 can provide a user input via the wrist-wearable device 800, the VR device 910, and/or the HIPD 1000 that causes an action in a corresponding AR environment. For example, the user 702 in the third AR system 700*c* (shown in FIG. 7C-1) raises the HIPD 1000 to prepare for a swing in the first AR game environment 720. The VR device 910, responsive to the user 702 raising the HIPD 1000, causes the AR representation of the user 722 to perform a similar action (e.g., raise a virtual object, such as a virtual sword 724). In some embodiments, each device uses respective sensor data and/or image data to detect the user input and provide an accurate representation of the user 702's motion. For example, imaging sensors 1054 (e.g., SLAM cameras or other cameras discussed below in FIGS. 10A and 10B) of the HIPD 1000 can be used to detect a position of the 1000 relative to the user 702's body such that the virtual object can be positioned appropriately within the first AR game environment 720; sensor data from the wrist-wearable device 800 can be used to detect a velocity at which the user 702 raises the HIPD 1000 such that the AR representation of the user 722 and the virtual sword 724 are synchronized with the user 702's movements; and image sensors 926 (FIGS. 9A-9C) of the VR device 910 can be used to represent the user 702's body, boundary conditions, or real-world objects within the first AR game environment 720.

In FIG. 7C-2, the user 702 performs a downward swing while holding the HIPD 1000. The user 702's downward swing is detected by the wrist-wearable device 800, the VR device 910, and/or the HIPD 1000 and a corresponding action is performed in the first AR game environment 720. In some embodiments, the data captured by each device is used to improve the user's experience within the AR environment. For example, sensor data of the wrist-wearable device 800 can be used to determine a speed and/or force at which the downward swing is performed and image sensors of the HIPD 1000 and/or the VR device 910 can be used to determine a location of the swing and how it should be represented in the first AR game environment 720, which, in turn, can be used as inputs for the AR environment (e.g., game mechanics, which can use detected speed, force, locations, and/or aspects of the user 702's actions to classify a user's inputs (e.g., user performs a light strike, hard strike, critical strike, glancing strike, miss) or calculate an output (e.g., amount of damage)).

While the wrist-wearable device 800, the VR device 910, and/or the HIPD 1000 are described as detecting user inputs, in some embodiments, user inputs are detected at a single device (with the single device being responsible for distributing signals to the other devices for performing the user input). For example, the HIPD 1000 can operate an application for generating the first AR game environment 720 and provide the VR device 910 with corresponding data for causing the presentation of the first AR game environment 720, as well as detect the 702's movements (while holding the HIPD 1000) to cause the performance of corresponding actions within the first AR game environment 720. Additionally or alternatively, in some embodiments, operational data (e.g., sensor data, image data, application data, device data, and/or other data) of one or more devices is provide to a single device (e.g., the HIPD 1000) to process the operational data and cause respective devices to perform an action associated with processed operational data.

In FIGS. 7D-1 and 7D-2, the user 702 is shown wearing the wrist-wearable device 800, the VR device 910, and smart textile-based garments 1100. In the fourth AR system 700*d*, the wrist-wearable device 800, the VR device 910, and/or the smart textile-based garments 1100 are used to interact within an AR environment (e.g., any AR system described above in reference to FIGS. 7A-7C-2, as well as 1A-5). While the VR device 910 presents a representation of a VR game (e.g., second AR game environment 735) to the user 702, the wrist-wearable device 800, the VR device 910, and/or the smart textile-based garments 1100 detect and coordinate one or more user inputs to allow the user 702 to interact with the AR environment.

In some embodiments, the user 702 can provide a user input via the wrist-wearable device 800, the VR device 910, and/or the smart textile-based garments 1100 that causes an action in a corresponding AR environment. For example, the user 702 in the fourth AR system 700*d* (shown in FIG. 7D-1) raises a hand wearing the smart textile-based garments 1100 to prepare to cast a spell or throw an object within the second AR game environment 735. The VR device 910, responsive to the user 702 holding up their hand (wearing smart textile-based garments 1100), causes the AR representation of the user 722 to perform a similar action (e.g., hold a virtual object or throw a fireball 734). In some embodiments, each device uses respective sensor data and/or image data to detect the user input and provides an accurate representation of the user 702's motion.

In FIG. 7D-2, the user 702 performs a throwing motion while wearing the smart textile-based garment 1100. The user 702's throwing motion is detected by the wrist-wearable device 800, the VR device 910, and/or the smart textile-based garments 1100, and a corresponding action is performed in the second AR game environment 735. As described above, the data captured by each device is used to improve the user's experience within the AR environment. Although not shown, the smart textile-based garments 1100 can be used in conjunction with an AR device 910 and/or an HIPD 1000.

Having discussed example AR systems, devices for interacting with such AR systems, and other computing systems more generally, devices and components will now be discussed in greater detail below. Some definitions of devices and components that can be included in some or all of the example devices discussed below are defined here for ease of reference. A skilled artisan will appreciate that certain types of the components described below may be more suitable for a particular set of devices and less suitable for a different set of devices. But subsequent references to the components defined here should be considered to be encompassed by the definitions provided.

In some embodiments discussed below, example devices and systems, including electronic devices and systems, will be discussed. Such example devices and systems are not intended to be limiting, and one of skill in the art will understand that alternative devices and systems to the example devices and systems described herein may be used to perform the operations and construct the systems and devices that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices and/or a subset of components of one or more electronic devices, which facilitates communication, and/or data processing, and/or data transfer between the respective electronic devices and/or electronic components.

Example Wrist-Wearable Devices

FIGS. 8A and 8B illustrate an example wrist-wearable device 800, in accordance with some embodiments. The wrist-wearable device 800 is an instance of the wearable device 412 described in reference to FIGS. 1A-5 herein, such that the wrist-wearable device 412 should be understood to have the features of the wrist-wearable device 800 and vice versa. FIG. 8A illustrates components of the wrist-wearable device 800, which can be used individually or in combination, including combinations that include other electronic devices and/or electronic components.

FIG. 8A shows a wearable band 810 and a watch body 820 (or capsule) being coupled, as discussed below, to form the wrist-wearable device 800. The wrist-wearable device 800 can perform various functions and/or operations associated with navigating through user interfaces and selectively opening applications, as well as the functions and/or operations described above with reference to FIGS. 1A-5.

As will be described in more detail below, operations executed by the wrist-wearable device 800 can include (i) presenting content to a user (e.g., displaying visual content via a display 805); (ii) detecting (e.g., sensing) user input (e.g., sensing a touch on peripheral button 823 and/or at a touch screen of the display 805, a hand gesture detected by sensors (e.g., biopotential sensors)); (iii) sensing biometric data via one or more sensors 813 (e.g., neuromuscular signals, heart rate, temperature, or sleep); messaging (e.g., text, speech, or video); image capture via one or more imaging devices or cameras 825; wireless communications (e.g., cellular, near field, Wi-Fi, or personal area network); location determination; financial transactions; providing haptic feedback; alarms; notifications; biometric authentication; health monitoring; and/or sleep monitoring.

The above-example functions can be executed independently in the watch body 820, independently in the wearable band 810, and/or via an electronic communication between the watch body 820 and the wearable band 810. In some embodiments, functions can be executed on the wrist-wearable device 800 while an AR environment is being presented (e.g., via one of the AR systems 700a to 700d). As the skilled artisan will appreciate upon reading the descriptions provided herein, the novel wearable devices described herein can be used with other types of AR environments.

The wearable band 810 can be configured to be worn by a user such that an inner (or inside) surface of the wearable structure 811 of the wearable band 810 is in contact with the user's skin. When worn by a user, sensors 813 contact the user's skin. The sensors 813 can sense biometric data such as a user's heart rate, saturated oxygen level, temperature, sweat level, neuromuscular-signal sensors, or a combination thereof. The sensors 813 can also sense data about a user's environment, including a user's motion, altitude, location, orientation, gait, acceleration, position, or a combination thereof. In some embodiments, the sensors 813 are configured to track a position and/or motion of the wearable band 810. The one or more sensors 813 can include any of the sensors defined above and/or discussed below with respect to FIG. 8B.

The one or more sensors 813 can be distributed on an inside and/or an outside surface of the wearable band 810. In some embodiments, the one or more sensors 813 are uniformly spaced along the wearable band 810. Alternatively, in some embodiments, the one or more sensors 813 are positioned at distinct points along the wearable band 810. As shown in FIG. 8A, the one or more sensors 813 can be the same or distinct. For example, in some embodiments, the one or more sensors 813 can be shaped as a pill (e.g., sensor 813a), an oval, a circle a square, an oblong (e.g., sensor 813c), and/or any other shape that maintains contact with the user's skin (e.g., such that neuromuscular signal and/or other biometric data can be accurately measured at the user's skin). In some embodiments, the one or more sensors 813 are aligned to form pairs of sensors (e.g., for sensing neuromuscular signals based on differential sensing within each respective sensor). For example, sensor 813b is aligned with an adjacent sensor to form sensor pair 814a, and sensor 813d is aligned with an adjacent sensor to form sensor pair 814b. In some embodiments, the wearable band 810 does not have a sensor pair. Alternatively, in some embodiments, the wearable band 810 has a predetermined number of sensor pairs (one pair of sensors, three pairs of sensors, four pairs of sensors, six pairs of sensors, or sixteen pairs of sensors).

The wearable band 810 can include any suitable number of sensors 813. In some embodiments, the amount and arrangements of sensors 813 depend on the particular application for which the wearable band 810 is used. For instance, a wearable band 810 configured as an armband, wristband, or chest-band may include a plurality of sensors 813 with a different number of sensors 813 and different arrangement for each use case, such as medical use cases, compared to gaming or general day-to-day use cases.

In accordance with some embodiments, the wearable band 810 further includes an electrical ground electrode and a shielding electrode. The electrical ground and shielding electrodes, like the sensors 813, can be distributed on the inside surface of the wearable band 810 such that they contact a portion of the user's skin. For example, the electrical ground and shielding electrodes can be at an inside surface of coupling mechanism 816 or an inside surface of a wearable structure 811. The electrical ground and shielding electrodes can be formed and/or use the same components as the sensors 813. In some embodiments, the wearable band 810 includes more than one electrical ground electrode and more than one shielding electrode.

The sensors 813 can be formed as part of the wearable structure 811 of the wearable band 810. In some embodiments, the sensors 813 are flush or substantially flush with the wearable structure 811 such that they do not extend beyond the surface of the wearable structure 811. While flush with the wearable structure 811, the sensors 813 are still configured to contact the user's skin (e.g., via a skin-contacting surface). Alternatively, in some embodiments, the sensors 813 extend beyond the wearable structure 811 a predetermined distance (e.g., 0.1 mm to 2 mm) to make contact and depress into the user's skin. In some embodiments, the sensors 813 are coupled to an actuator (not shown) configured to adjust an extension height (e.g., a distance from the surface of the wearable structure 811) of the sensors 813 such that the sensors 813 make contact and depress into the user's skin. In some embodiments, the actuators adjust the extension height between 0.01 mm to 1.2 mm. This allows the user to customize the positioning of the sensors 813 to improve the overall comfort of the wearable band 810 when worn while still allowing the sensors 813 to contact the user's skin. In some embodiments, the sensors 813 are indistinguishable from the wearable structure 811 when worn by the user.

The wearable structure 811 can be formed of an elastic material, elastomers, etc., configured to be stretched and fitted to be worn by the user. In some embodiments, the wearable structure 811 is a textile or woven fabric. As described above, the sensors 813 can be formed as part of a wearable structure 811. For example, the sensors 813 can be molded into the wearable structure 811 or be integrated into a woven fabric (e.g., the sensors 813 can be sewn into the fabric and mimic the pliability of fabric (e.g., the sensors 813 can be constructed from a series of woven strands of fabric)).

The wearable structure 811 can include flexible electronic connectors that interconnect the sensors 813, the electronic circuitry, and/or other electronic components (described below in reference to FIG. 8B) that are enclosed in the wearable band 810. In some embodiments, the flexible electronic connectors are configured to interconnect the sensors 813, the electronic circuitry, and/or other electronic components of the wearable band 810 with respective sensors and/or other electronic components of another electronic device (e.g., watch body 820). The flexible electronic connectors are configured to move with the wearable structure 811 such that the user adjustment to the wearable structure 811 (e.g., resizing, pulling, or folding) does not stress or strain the electrical coupling of components of the wearable band 810.

As described above, the wearable band 810 is configured to be worn by a user. In particular, the wearable band 810 can be shaped or otherwise manipulated to be worn by a user. For example, the wearable band 810 can be shaped to have a substantially circular shape such that it can be configured to be worn on the user's lower arm or wrist. Alternatively, the wearable band 810 can be shaped to be worn on another body part of the user, such as the user's upper arm (e.g., around a bicep), forearm, chest, legs, etc. The wearable band 810 can include a retaining mechanism 812 (e.g., a buckle or a hook and loop fastener) for securing the wearable band 810 to the user's wrist or other body part. While the wearable band 810 is worn by the user, the sensors 813 sense data (referred to as sensor data) from the user's skin. In particular, the sensors 813 of the wearable band 810 obtain (e.g., sense and record) neuromuscular signals.

The sensed data (e.g., sensed neuromuscular signals) can be used to detect and/or determine the user's intention to perform certain motor actions. In particular, the sensors 813 sense and record neuromuscular signals from the user as the user performs muscular activations (e.g., movements or gestures). The detected and/or determined motor action (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 805 of the wrist-wearable device 800 and/or can be transmitted to a device responsible for rendering an AR environment (e.g., a head-mounted display) to perform an action in an associated AR environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 813 can be used to provide a user with an enhanced interaction with a physical object (e.g., devices communicatively coupled with the wearable band 810) and/or a virtual object in an AR application generated by an AR system (e.g., user interface objects presented on the display 805 or another computing device (e.g., a smartphone)).

In some embodiments, the wearable band 810 includes one or more haptic devices 846 (FIG. 8B; e.g., a vibratory haptic actuator) that are configured to provide haptic feedback (e.g., a cutaneous and/or kinesthetic sensation) to the user's skin. The sensors 813 and/or the haptic devices 846 can be configured to operate in conjunction with multiple applications including, without limitation, health monitoring, social media, games, and AR (e.g., the applications associated with AR).

The wearable band 810 can also include a coupling mechanism 816 (e.g., a cradle or a shape of the coupling mechanism can correspond to the shape of the watch body 820 of the wrist-wearable device 800) for detachably coupling a capsule (e.g., a computing unit) or watch body 820 (via a coupling surface of the watch body 820) to the wearable band 810. In particular, the coupling mechanism 816 can be configured to receive a coupling surface proximate to the bottom side of the watch body 820 (e.g., a side opposite to a front side of the watch body 820 where the display 805 is located), such that a user can push the watch body 820 downward into the coupling mechanism 816 to attach the watch body 820 to the coupling mechanism 816. In some embodiments, the coupling mechanism 816 can be configured to receive a top side of the watch body 820 (e.g., a side proximate to the front side of the watch body 820 where the display 805 is located) that is pushed upward into the cradle, as opposed to being pushed downward into the coupling mechanism 816. In some embodiments, the coupling mechanism 816 is an integrated component of the wearable band 810 such that the wearable band 810 and the coupling mechanism 816 are a single unitary structure. In some embodiments, the coupling mechanism 816 is a type of frame or shell that allows the watch body 820 coupling surface to be retained within or on the wearable band 810 coupling mechanism 816 (e.g., a cradle, a tracker band, a support base, or a clasp).

The coupling mechanism 816 can allow for the watch body 820 to be detachably coupled to the wearable band 810 through a friction fit, a magnetic coupling, a rotation-based connector, a shear-pin coupler, a retention spring, one or more magnets, a clip, a pin shaft, a hook-and-loop fastener, or a combination thereof. A user can perform any type of motion to couple the watch body 820 to the wearable band 810 and to decouple the watch body 820 from the wearable band 810. For example, a user can twist, slide, turn, push, pull, or rotate the watch body 820 relative to the wearable band 810, or a combination thereof, to attach the watch body 820 to the wearable band 810 and to detach the watch body 820 from the wearable band 810. Alternatively, as discussed below, in some embodiments, the watch body 820 can be decoupled from the wearable band 810 by actuation of the release mechanism 829.

The wearable band 810 can be coupled with a watch body 820 to increase the functionality of the wearable band 810 (e.g., converting the wearable band 810 into a wrist-wearable device 800, adding an additional computing unit and/or battery to increase computational resources and/or a battery life of the wearable band 810, or adding additional sensors to improve sensed data). As described above, the wearable band 810 (and the coupling mechanism 816) is configured to operate independently (e.g., execute functions independently) from watch body 820. For example, the coupling mechanism 816 can include one or more sensors 813 that contact a user's skin when the wearable band 810 is worn by the user and provide sensor data for determining control commands.

A user can detach the watch body 820 (or capsule) from the wearable band 810 in order to reduce the encumbrance of the wrist-wearable device 800 to the user. For embodiments in which the watch body 820 is removable, the watch body 820 can be referred to as a removable structure, such that in these embodiments the wrist-wearable device 800 includes a wearable portion (e.g., the wearable band 810) and a removable structure (the watch body 820).

Turning to the watch body 820, the watch body 820 can have a substantially rectangular or circular shape. The watch body 820 is configured to be worn by the user on their wrist or on another body part. More specifically, the watch body 820 is sized to be easily carried by the user, attached on a portion of the user's clothing, and/or coupled to the wearable band 810 (forming the wrist-wearable device 800). As described above, the watch body 820 can have a shape corresponding to the coupling mechanism 816 of the wearable band 810. In some embodiments, the watch body 820 includes a single release mechanism 829 or multiple release mechanisms (e.g., two release mechanisms 829 positioned on opposing sides of the watch body 820, such as spring-loaded buttons) for decoupling the watch body 820 and the wearable band 810. The release mechanism 829 can include, without limitation, a button, a knob, a plunger, a handle, a lever, a fastener, a clasp, a dial, a latch, or a combination thereof.

A user can actuate the release mechanism 829 by pushing, turning, lifting, depressing, shifting, or performing other actions on the release mechanism 829. Actuation of the release mechanism 829 can release (e.g., decouple) the watch body 820 from the coupling mechanism 816 of the wearable band 810, allowing the user to use the watch body 820 independently from wearable band 810 and vice versa. For example, decoupling the watch body 820 from the wearable band 810 can allow the user to capture images using rear-facing camera 825*b*. Although the coupling mechanism 816 is shown positioned at a corner of watch body 820, the release mechanism 829 can be positioned anywhere on watch body 820 that is convenient for the user to actuate. In addition, in some embodiments, the wearable band 810 can also include a respective release mechanism for decoupling the watch body 820 from the coupling mechanism 816. In some embodiments, the release mechanism 829 is optional and the watch body 820 can be decoupled from the coupling mechanism 816, as described above (e.g., via twisting or rotating).

The watch body 820 can include one or more peripheral buttons 823 and 827 for performing various operations at the watch body 820. For example, the peripheral buttons 823 and 827 can be used to turn on or wake (e.g., transition from a sleep state to an active state) the display 805, unlock the watch body 820, increase or decrease volume, increase or decrease brightness, interact with one or more applications, interact with one or more user interfaces. Additionally, or alternatively, in some embodiments, the display 805 operates as a touch screen and allows the user to provide one or more inputs for interacting with the watch body 820.

In some embodiments, the watch body 820 includes one or more sensors 821. The sensors 821 of the watch body 820 can be the same or distinct from the sensors 813 of the wearable band 810. The sensors 821 of the watch body 820 can be distributed on an inside and/or an outside surface of the watch body 820. In some embodiments, the sensors 821 are configured to contact a user's skin when the watch body 820 is worn by the user. For example, the sensors 821 can be placed on the bottom side of the watch body 820 and the coupling mechanism 816 can be a cradle with an opening that allows the bottom side of the watch body 820 to directly contact the user's skin. Alternatively, in some embodiments, the watch body 820 does not include sensors that are configured to contact the user's skin (e.g., including sensors internal and/or external to the watch body 820 that are configured to sense data of the watch body 820 and the watch body 820's surrounding environment). In some embodiments, the sensors 813 are configured to track a position and/or motion of the watch body 820.

The watch body 820 and the wearable band 810 can share data using a wired communication method (e.g., a Universal Asynchronous Receiver/Transmitter (UART) or a USB transceiver) and/or a wireless communication method (e.g., near-field communication or Bluetooth). For example, the watch body 820 and the wearable band 810 can share data sensed by the sensors 813 and 821, as well as application- and device-specific information (e.g., active and/or available applications), output devices (e.g., display or speakers), and/or input devices (e.g., touch screens, microphones, or imaging sensors).

In some embodiments, the watch body 820 can include, without limitation, a front-facing camera 825*a* and/or a rear-facing camera 825*b*, sensors 821 (e.g., a biometric sensor, an IMU sensor, a heart rate sensor, a saturated oxygen sensor, a neuromuscular-signal sensor, an altimeter sensor, a temperature sensor, a bioimpedance sensor, a pedometer sensor, an optical sensor (e.g., FIG. 8B; imaging sensor 863), a touch sensor, a sweat sensor). In some embodiments, the watch body 820 can include one or more haptic devices 876 (FIG. 8B; a vibratory haptic actuator) that is configured to provide haptic feedback (e.g., a cutaneous and/or kinesthetic sensation) to the user. The sensors 821 and/or the haptic device 876 can also be configured to operate in conjunction with multiple applications, including, without limitation, health-monitoring applications, social media applications, game applications, and AR applications (e.g., the applications associated with AR).

As described above, the watch body 820 and the wearable band 810, when coupled, can form the wrist-wearable device 800. When coupled, the watch body 820 and wearable band 810 operate as a single device to execute functions (e.g., operations, detections, or communications) described herein. In some embodiments, each device is provided with particular instructions for performing the one or more operations of the wrist-wearable device 800. For example, in accordance with a determination that the watch body 820 does not include neuromuscular-signal sensors, the wearable band 810 can include alternative instructions for performing associated instructions (e.g., providing sensed neuromuscular-signal data to the watch body 820 via a different electronic device). Operations of the wrist-wearable device 800 can be performed by the watch body 820 alone or in conjunction with the wearable band 810 (e.g., via respective processors and/or hardware components) and vice versa. In some embodiments, operations of the wrist-wearable device 800, the watch body 820, and/or the wearable band 810 can be performed in conjunction with one or more processors and/or hardware components of another communicatively coupled device (e.g., FIGS. 10A-10B; the HIPD 1000).

As described below with reference to the block diagram of FIG. 8B, the wearable band 810 and/or the watch body 820 can each include independent resources required to independently execute functions. For example, the wearable band 810 and/or the watch body 820 can each include a power source (e.g., a battery), a memory, data storage, a processor (e.g., a CPU), communications, a light source, and/or input/output devices.

FIG. 8B shows block diagrams of a computing system 830 corresponding to the wearable band 810 and a computing system 860 corresponding to the watch body 820, according to some embodiments. A computing system of the wrist-wearable device 800 includes a combination of components of the wearable band computing system 830 and the watch body computing system 860, in accordance with some embodiments.

The watch body 820 and/or the wearable band 810 can include one or more components shown in watch body computing system 860. In some embodiments, a single integrated circuit includes all or a substantial portion of the components of the watch body computing system 860 that are included in a single integrated circuit. Alternatively, in some embodiments, components of the watch body computing system 860 are included in a plurality of integrated circuits that are communicatively coupled. In some embodiments, the watch body computing system 860 is configured to couple (e.g., via a wired or wireless connection) with the wearable band computing system 830, which allows the computing systems to share components, distribute tasks, and/or perform other operations described herein (individually or as a single device).

The watch body computing system 860 can include one or more processors 879, a controller 877, a peripherals interface 861, a power system 895, and memory (e.g., a memory 880), each of which are defined above and described in more detail below.

The power system 895 can include a charger input 896, a power-management integrated circuit (PMIC) 897, and a battery 898, each of which are defined above. In some embodiments, a watch body 820 and a wearable band 810 can have respective charger inputs (e.g., charger inputs 896 and 857), respective batteries (e.g., batteries 898 and 859), and can share power with each other (e.g., the watch body 820 can power and/or charge the wearable band 810 and vice versa). Although watch body 820 and/or the wearable band 810 can include respective charger inputs, a single charger input can charge both devices when coupled. The watch body 820 and the wearable band 810 can receive a charge using a variety of techniques. In some embodiments, the watch body 820 and the wearable band 810 can use a wired charging assembly (e.g., power cords) to receive the charge. Alternatively, or in addition, the watch body 820 and/or the wearable band 810 can be configured for wireless charging. For example, a portable charging device can be designed to mate with a portion of watch body 820 and/or wearable band 810 and wirelessly deliver usable power to a battery of watch body 820 and/or wearable band 810. The watch body 820 and the wearable band 810 can have independent power systems (e.g., power system 895 and 856) to enable each to operate independently. The watch body 820 and wearable band 810 can also share power (e.g., one can charge the other) via respective PMICs (e.g., PMICs 897 and 858) that can share power over power and ground conductors and/or over wireless charging antennas.

In some embodiments, the peripherals interface 861 can include one or more sensors 821, many of which listed below are defined above. The sensors 821 can include one or more coupling sensors 862 for detecting when the watch body 820 is coupled with another electronic device (e.g., a wearable band 810). The sensors 821 can include imaging sensors 863 (one or more of the cameras 825 and/or separate imaging sensors 863 (e.g., thermal-imaging sensors)). In some embodiments, the sensors 821 include one or more SpO2 sensors 864. In some embodiments, the sensors 821 include one or more biopotential-signal sensors (e.g., EMG sensors 865, which may be disposed on a user-facing portion of the watch body 820 and/or the wearable band 810). In some embodiments, the sensors 821 include one or more capacitive sensors 866. In some embodiments, the sensors 821 include one or more heart rate sensors 867. In some embodiments, the sensors 821 include one or more IMUs 868. In some embodiments, one or more IMUs 868 can be configured to detect movement of a user's hand or other location that the watch body 820 is placed or held.

In some embodiments, the peripherals interface 861 includes an NFC component 869, a GPS component 870, a long-term evolution (LTE) component 871, and/or a Wi-Fi and/or Bluetooth communication component 872. In some embodiments, the peripherals interface 861 includes one or more buttons 873 (e.g., the peripheral buttons 823 and 827 in FIG. 8A), which, when selected by a user, cause operations to be performed at the watch body 820. In some embodiments, the peripherals interface 861 includes one or more indicators, such as a light-emitting diode (LED), to provide a user with visual indicators (e.g., message received, low battery, an active microphone, and/or a camera).

The watch body 820 can include at least one display 805 for displaying visual representations of information or data to the user, including user-interface elements and/or three-dimensional (3D) virtual objects. The display can also include a touch screen for inputting user inputs, such as touch gestures, swipe gestures, and the like. The watch body 820 can include at least one speaker 874 and at least one microphone 875 for providing audio signals to the user and receiving audio input from the user. The user can provide user inputs through the microphone 875 and can also receive audio output from the speaker 874 as part of a haptic event provided by the haptic controller 878. The watch body 820 can include at least one camera 825, including a front-facing camera 825a and a rear-facing camera 825b. The cameras 825 can include ultra-wide-angle cameras, wide-angle cameras, fish-eye cameras, spherical cameras, telephoto cameras, depth-sensing cameras, or other types of cameras.

The watch body computing system 860 can include one or more haptic controllers 878 and associated componentry (e.g., haptic devices 876) for providing haptic events at the watch body 820 (e.g., a vibrating sensation or audio output in response to an event at the watch body 820). The haptic controllers 878 can communicate with one or more haptic devices 876, such as electroacoustic devices, including a speaker of the one or more speakers 874 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 878 can provide haptic events to respective haptic actuators that are capable of being sensed by a user of the watch body 820. In some embodiments, the one or more haptic controllers 878 can receive input signals from an application of the applications 882.

In some embodiments, the computer system 830 and/or the computer system 860 can include memory 880, which can be controlled by a memory controller of the one or more controllers 877 and/or one or more processors 879. In some embodiments, software components stored in the memory 880 include one or more applications 882 configured to perform operations at the watch body 820. In some embodiments, the one or more applications 882 include games, word processors, messaging applications, calling applications, web browsers, social media applications, media streaming applications, financial applications, calendars, clocks, etc. In some embodiments, software components stored in the memory 880 include one or more communication interface modules 883 as defined above. In some embodiments, software components stored in the memory

880 include one or more graphics modules 884 for rendering, encoding, and/or decoding audio and/or visual data; and one or more data management modules 885 for collecting, organizing, and/or providing access to the data 887 stored in memory 880. In some embodiments, software components stored in the memory 880 include a include one or more haptics modules 886A for determining, generating, and provided instructions for causing the performance of a haptic response, such as the haptic responses described above in reference to FIGS. 1A-5. The haptics modules 886A is analogous to the haptics modules 1187 (FIG. 11C) such that features of the haptics modules 1187 described below are included in the haptics modules 886A. In some embodiments, one or more of applications 1182 and/or one or more modules can work in conjunction with one another to perform various operations and tasks at the watch body 1120. In some embodiments, one or more of applications 882 and/or one or more modules can work in conjunction with one another to perform various tasks at the watch body 820.

In some embodiments, software components stored in the memory 880 can include one or more operating systems 881 (e.g., a Linux-based operating system, an Android operating system, etc.). The memory 880 can also include data 887. The data 887 can include profile data 888A, sensor data 889A, media content data 890, application data 891, and haptics data 892A, which stores data related to the performance of the features described above in reference to FIGS. 1A-5. The haptics data 892A is analogous to the haptics data 1194 (FIG. 11C) such that features of the haptics data 1194 described below are included in the haptics data 892A.

It should be appreciated that the watch body computing system 860 is an example of a computing system within the watch body 820, and that the watch body 820 can have more or fewer components than shown in the watch body computing system 860, combine two or more components, and/or have a different configuration and/or arrangement of the components. The various components shown in watch body computing system 860 are implemented in hardware, software, firmware, or a combination thereof, including one or more signal processing and/or application-specific integrated circuits.

Turning to the wearable band computing system 830, one or more components that can be included in the wearable band 810 are shown. The wearable band computing system 830 can include more or fewer components than shown in the watch body computing system 860, combine two or more components, and/or have a different configuration and/or arrangement of some or all of the components. In some embodiments, all, or a substantial portion of the components of the wearable band computing system 830 are included in a single integrated circuit. Alternatively, in some embodiments, components of the wearable band computing system 830 are included in a plurality of integrated circuits that are communicatively coupled. As described above, in some embodiments, the wearable band computing system 830 is configured to couple (e.g., via a wired or wireless connection) with the watch body computing system 860, which allows the computing systems to share components, distribute tasks, and/or perform other operations described herein (individually or as a single device).

The wearable band computing system 830, similar to the watch body computing system 860, can include one or more processors 849, one or more controllers 847 (including one or more haptics controller 848), a peripherals interface 831 that can include one or more sensors 813 and other peripheral devices, power source (e.g., a power system 856), and memory (e.g., a memory 850) that includes an operating system (e.g., an operating system 851), data (e.g., data 854 including profile data 888B, sensor data 889B, haptics data 892B, etc.), and one or more modules (e.g., a communications interface module 852, a data management module 853, a haptics module 886B, etc.).

The one or more sensors 813 can be analogous to sensors 821 of the computer system 860 in light of the definitions above. For example, sensors 813 can include one or more coupling sensors 832, one or more SpO2 sensors 834, one or more EMG sensors 835, one or more capacitive sensors 836, one or more heart rate sensors 837, and one or more IMU sensors 838.

The peripherals interface 831 can also include other components analogous to those included in the peripheral interface 861 of the computer system 860, including an NFC component 839, a GPS component 840, an LTE component 841, a Wi-Fi and/or Bluetooth communication component 842, and/or one or more haptic devices 876 as described above in reference to peripherals interface 861. In some embodiments, the peripherals interface 831 includes one or more buttons 843, a display 833, a speaker 844, a microphone 845, and a camera 855. In some embodiments, the peripherals interface 831 includes one or more indicators, such as an LED.

It should be appreciated that the wearable band computing system 830 is an example of a computing system within the wearable band 810, and that the wearable band 810 can have more or fewer components than shown in the wearable band computing system 830, combine two or more components, and/or have a different configuration and/or arrangement of the components. The various components shown in wearable band computing system 830 can be implemented in one or a combination of hardware, software, and firmware, including one or more signal processing and/or application-specific integrated circuits.

The wrist-wearable device 800 with respect to FIG. 8A is an example of the wearable band 810 and the watch body 820 coupled, so the wrist-wearable device 800 will be understood to include the components shown and described for the wearable band computing system 830 and the watch body computing system 860. In some embodiments, wrist-wearable device 800 has a split architecture (e.g., a split mechanical architecture or a split electrical architecture) between the watch body 820 and the wearable band 810. In other words, all of the components shown in the wearable band computing system 830 and the watch body computing system 860 can be housed or otherwise disposed in a combined watch device 800, or within individual components of the watch body 820, wearable band 810, and/or portions thereof (e.g., a coupling mechanism 816 of the wearable band 810).

The techniques described above can be used with any device for sensing neuromuscular signals, including the arm-wearable devices of FIG. 8A-8B, but could also be used with other types of wearable devices for sensing neuromuscular signals (such as body-wearable or head-wearable devices that might have neuromuscular sensors closer to the brain or spinal column).

In some embodiments, a wrist-wearable device 800 can be used in conjunction with a head-wearable device described below (e.g., AR device 900 and VR device 910) and/or an HIPD 1000, and the wrist-wearable device 800 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 800 can also be used in conjunction with a wearable garment, such as smart textile-based garment 1100 described below in reference to FIGS. 11A-11C. Having thus described example wrist-wearable device, attention will now be turned to example head-wearable devices, such AR device 900 and VR device 910.

Example Head-Wearable Devices

FIGS. 9A, 9B-1, 9B-2, and 9C show example head-wearable devices, in accordance with some embodiments. Head-wearable devices can include, but are not limited to, AR devices 900 (e.g., AR or smart eyewear devices, such as smart glasses, smart monocles, smart contacts, etc.), VR devices 910 (e.g., VR headsets or head-mounted displays (HMDs)), or other ocularly coupled devices. The AR devices 900 and the VR devices 910 are instances of the head-wearable devices as illustrated and described in reference to FIGS. 1A-5 herein, such that the head-wearable device should be understood to have the features of the AR devices 900 and/or the VR devices 910 and vice versa. The AR devices 900 and the VR devices 910 can perform various functions and/or operations associated with navigating through user interfaces and selectively opening applications, as well as the functions and/or operations described above with reference to FIGS. 1A-5.

Figure 9A:
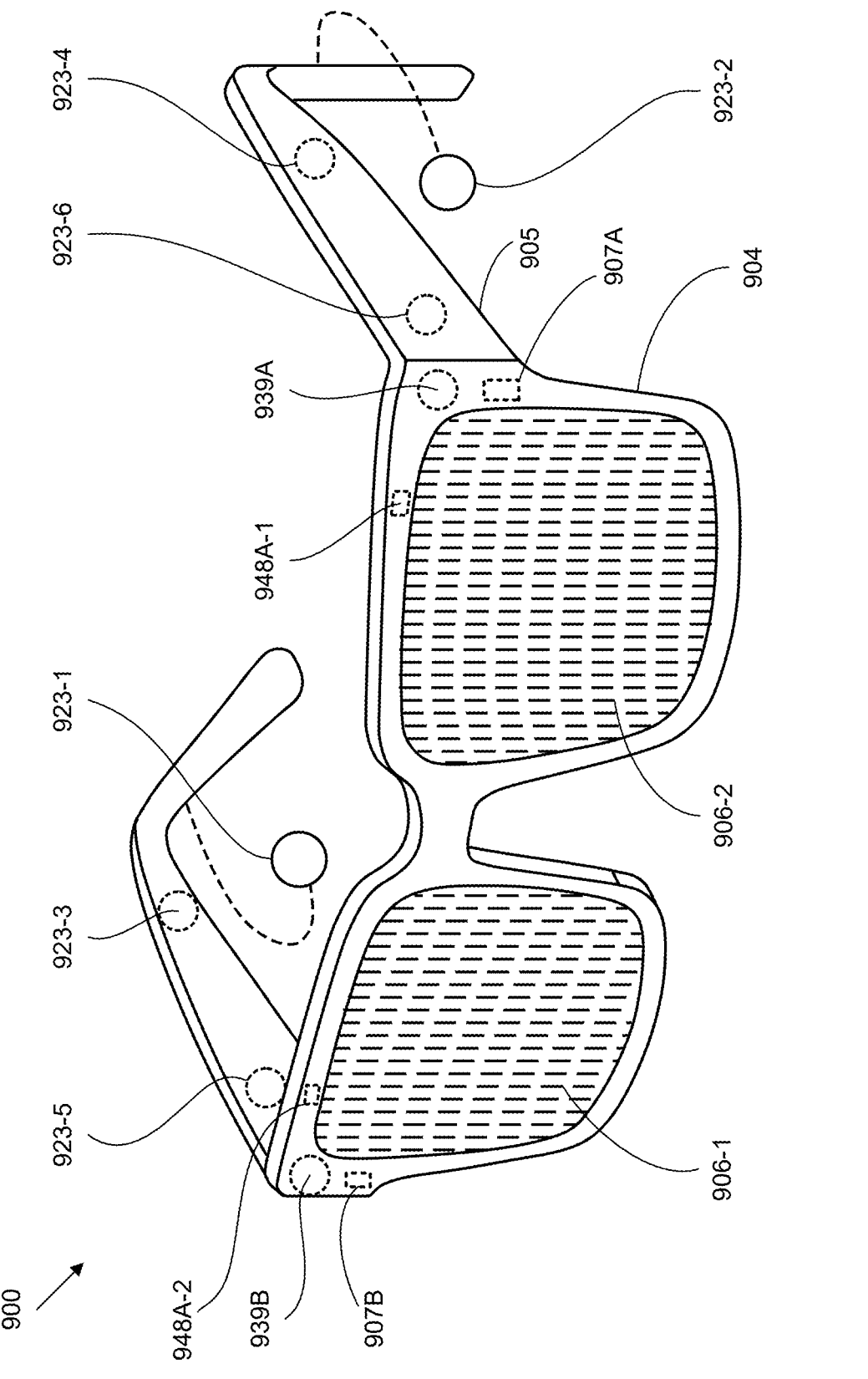
Figures 1, 9B:
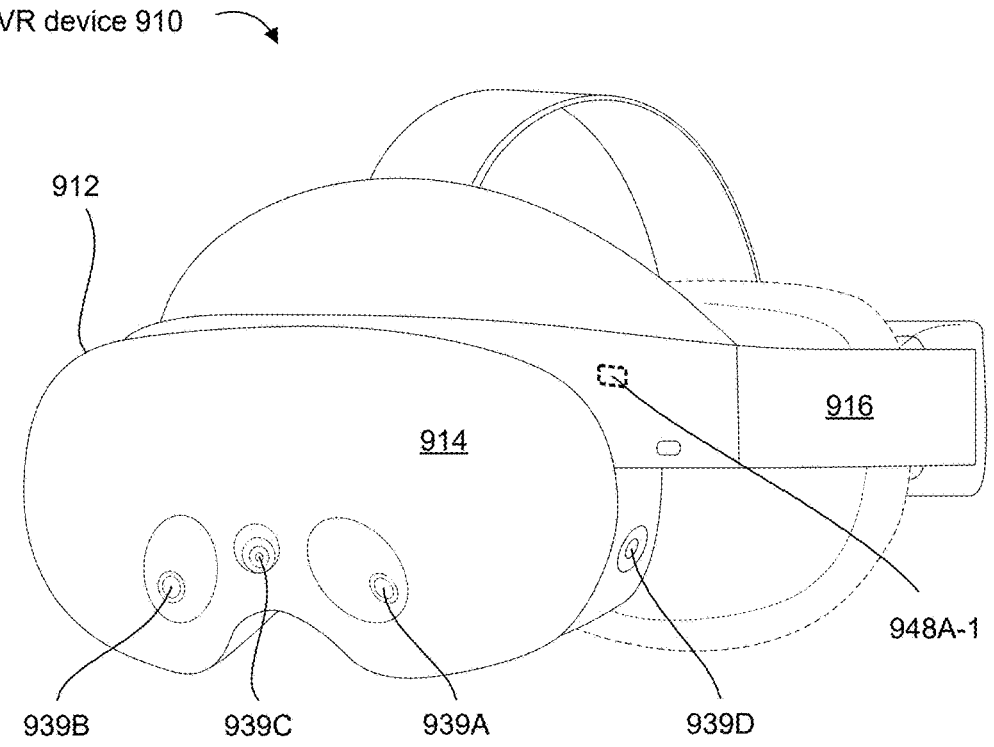
Figures 2, 9B:
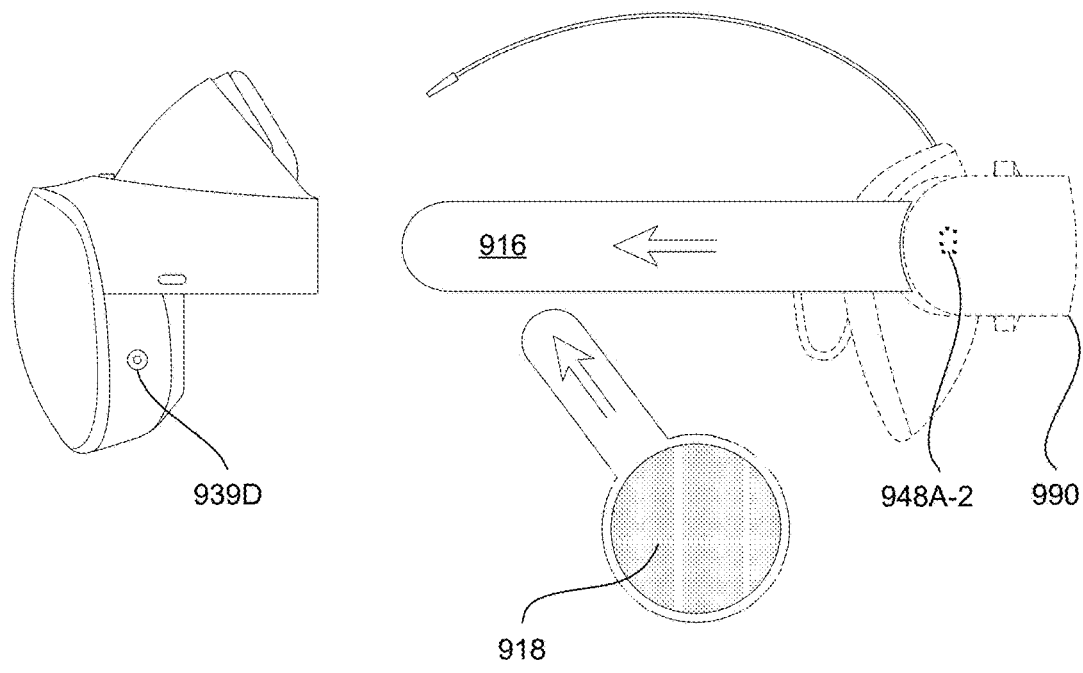

In some embodiments, an AR system (e.g., FIGS. 7A-7D-2; AR systems 700a-700d) includes an AR device 900 (as shown in FIG. 9A) and/or VR device 910 (as shown in FIGS. 9B-1-B-2). In some embodiments, the AR device 900 and the VR device 910 can include one or more analogous components (e.g., components for presenting interactive AR environments, such as processors, memory, and/or presentation devices, including one or more displays and/or one or more waveguides), some of which are described in more detail with respect to FIG. 9C. The head-wearable devices can use display projectors (e.g., display projector assemblies 907A and 907B) and/or waveguides for projecting representations of data to a user. Some embodiments of head-wearable devices do not include displays.

FIG. 9A shows an example visual depiction of the AR device 900 (e.g., which may also be described herein as augmented-reality glasses and/or smart glasses). The AR device 900 can work in conjunction with additional electronic components that are not shown in FIGS. 9A, such as a wearable accessory device and/or an intermediary processing device, in electronic communication or otherwise configured to be used in conjunction with the AR device 900. In some embodiments, the wearable accessory device and/or the intermediary processing device may be configured to couple with the AR device 900 via a coupling mechanism in electronic communication with a coupling sensor 924, where the coupling sensor 924 can detect when an electronic device becomes physically or electronically coupled with the AR device 900. In some embodiments, the AR device 900 can be configured to couple to a housing (e.g., a portion of frame 904 or temple arms 905), which may include one or more additional coupling mechanisms configured to couple with additional accessory devices. The components shown in FIG. 9A can be implemented in hardware, software, firmware, or a combination thereof, including one or more signal-processing components and/or application-specific integrated circuits (ASICs).

The AR device 900 includes mechanical glasses components, including a frame 904 configured to hold one or more lenses (e.g., one or both lenses 906-1 and 906-2). One of ordinary skill in the art will appreciate that the AR device 900 can include additional mechanical components, such as hinges configured to allow portions of the frame 904 of the AR device 900 to be folded and unfolded, a bridge configured to span the gap between the lenses 906-1 and 906-2 and rest on the user's nose, nose pads configured to rest on the bridge of the nose and provide support for the AR device 900, earpieces configured to rest on the user's ears and provide additional support for the AR device 900, temple arms 905 configured to extend from the hinges to the earpieces of the AR device 900, and the like. One of ordinary skill in the art will further appreciate that some examples of the AR device 900 can include none of the mechanical components described herein. For example, smart contact lenses configured to present AR to users may not include any components of the AR device 900.

The lenses 906-1 and 906-2 can be individual displays or display devices (e.g., a waveguide for projected representations). The lenses 906-1 and 906-2 may act together or independently to present an image or series of images to a user. In some embodiments, the lenses 906-1 and 906-2 can operate in conjunction with one or more display projector assemblies 907A and 907B to present image data to a user. While the AR device 900 includes two displays, embodiments of this disclosure may be implemented in AR devices with a single near-eye display (NED) or more than two NEDS.

The AR device 900 includes electronic components, many of which will be described in more detail below with respect to FIG. 9C. Some example electronic components are illustrated in FIG. 9A, including sensors 923-1, 923-2, 923-3, 923-4, 923-5, and 923-6, which can be distributed along a substantial portion of the frame 904 of the AR device 900. The different types of sensors are described below in reference to FIG. 9C. The AR device 900 also includes a left camera 939A and a right camera 939B, which are located on different sides of the frame 904. And the eyewear device includes one or more processors 948A and 948B (e.g., an integral microprocessor, such as an ASIC) that is embedded into a portion of the frame 904.

FIGS. 9B-1 and 9B-2 show an example visual depiction of the VR device 910 (e.g., a head-mounted display (HMD) 912, also referred to herein as an AR headset, a head-wearable device, or a VR headset). The HMD 912 includes a front body 914 and a frame 916 (e.g., a strap or band) shaped to fit around a user's head. In some embodiments, the front body 914 and/or the frame 916 includes one or more electronic elements for facilitating presentation of and/or interactions with an AR and/or VR system (e.g., displays, processors (e.g., processor 948A-1), IMUs, tracking emitters or detectors, or sensors). In some embodiments, the HMD 912 includes output audio transducers (e.g., an audio transducer 918-1), as shown in FIG. 9B-2. In some embodiments, one or more components, such as the output audio transducer(s) 918 and the frame 916, can be configured to attach and detach (e.g., are detachably attachable) to the HMD 912 (e.g., a portion or all of the frame 916 and/or the output audio transducer 918), as shown in FIG. 9B-2. In some embodiments, coupling a detachable component to the HMD 912 causes the detachable component to come into electronic communication with the HMD 912. The VR device 910 includes electronic components, many of which will be described in more detail below with respect to FIG. 9C.

FIGS. 9B-1 and 9B-2 also show that the VR device 910 having one or more cameras, such as the left camera 939A and the right camera 939B, which can be analogous to the left and right cameras on the frame 904 of the AR device 900. In some embodiments, the VR device 910 includes one or more additional cameras (e.g., cameras 939C and 939D), which can be configured to augment image data obtained by the cameras 939A and 939B by providing more information. For example, the camera 939C can be used to supply color information that is not discerned by cameras 939A and 939B. In some embodiments, one or more of the cameras 939A to 939D can include an optional IR (infrared) cut filter configured to remove IR light from being received at the respective camera sensors.

The VR device 910 can include a housing 990 storing one or more components of the VR device 910 and/or additional components of the VR device 910. The housing 990 can be a modular electronic device configured to couple with the VR device 910 (or an AR device 900) and supplement and/or extend the capabilities of the VR device 910 (or an AR device 900). For example, the housing 990 can include additional sensors, cameras, power sources, and processors (e.g., processor 948A-2). to improve and/or increase the functionality of the VR device 910. Examples of the different components included in the housing 990 are described below in reference to FIG. 9C.

Alternatively, or in addition, in some embodiments, the head-wearable device, such as the VR device 910 and/or the AR device 900, includes, or is communicatively coupled to, another external device (e.g., a paired device), such as an HIPD 1000 (discussed below in reference to FIGS. 10A-10B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckbands may also apply to various other paired devices, such as smartwatches, smartphones, wrist bands, other wearable devices, hand-held controllers, tablet computers, or laptop computers.

In some situations, pairing external devices, such as an intermediary processing device (e.g., an HIPD device 1000, an optional neckband, and/or a wearable accessory device) with the head-wearable devices (e.g., an AR device 900 and/or a VR device 910) enables the head-wearable devices to achieve a similar form factor of a pair of glasses while still providing sufficient battery and computational power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable device overall while allowing the head-wearable device to retain its desired functionality. For example, the intermediary processing device (e.g., the HIPD 1000) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computational capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an AR environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, and/or storage) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, such as an HIPD 1000, can process information generated by one or more of its sensors and/or information provided by other communicatively coupled devices. For example, a head-wearable device can include an IMU, and the intermediary processing device (a neckband and/or an HIPD 1000) can compute all inertial and spatial calculations from the IMUs located on the head-wearable device. Additional examples of processing performed by a communicatively coupled device, such as the HIPD 1000, are provided below in reference to FIGS. 10A and 10B.

AR systems may include a variety of types of visual feedback mechanisms. For example, display devices in the AR devices 900 and/or the VR devices 910 may include one or more liquid-crystal displays (LCDs), light emitting diode (LED) displays, organic LED (OLED) displays, and/or any other suitable type of display screen. AR systems may include a single display screen for both eyes or may provide a display screen for each eye, which may allow for additional flexibility for varifocal adjustments or for correcting a refractive error associated with the user's vision. Some AR systems also include optical subsystems having one or more lenses (e.g., conventional concave or convex lenses, Fresnel lenses, or adjustable liquid lenses) through which a user may view a display screen. In addition to or instead of using display screens, some AR systems include one or more projection systems. For example, display devices in the AR device 900 and/or the VR device 910 may include micro-LED projectors that project light (e.g., using a waveguide) into display devices, such as clear combiner lenses that allow ambient light to pass through. The display devices may refract the projected light toward a user's pupil and may enable a user to simultaneously view both AR content and the real world. AR systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 900 and the VR device 910, either or both of the example head-wearable devices described herein can be configured to present fully immersive VR scenes presented in substantially all of a user's field of view, additionally or alternatively to, subtler augmented-reality scenes that are presented within a portion, less than all, of the user's field of view.

In some embodiments, the AR device 900 and/or the VR device 910 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other AR devices, within other AR devices, and/or in conjunction with other AR devices (e.g., wrist-wearable devices that may be incorporated into headwear, gloves, body suits, handheld controllers, environmental devices (e.g., chairs or floormats), and/or any other type of device or system, such as a wrist-wearable device 800, an HIPD 1000, smart textile-based garment 1100), and/or other devices described herein.

Figure 9C:
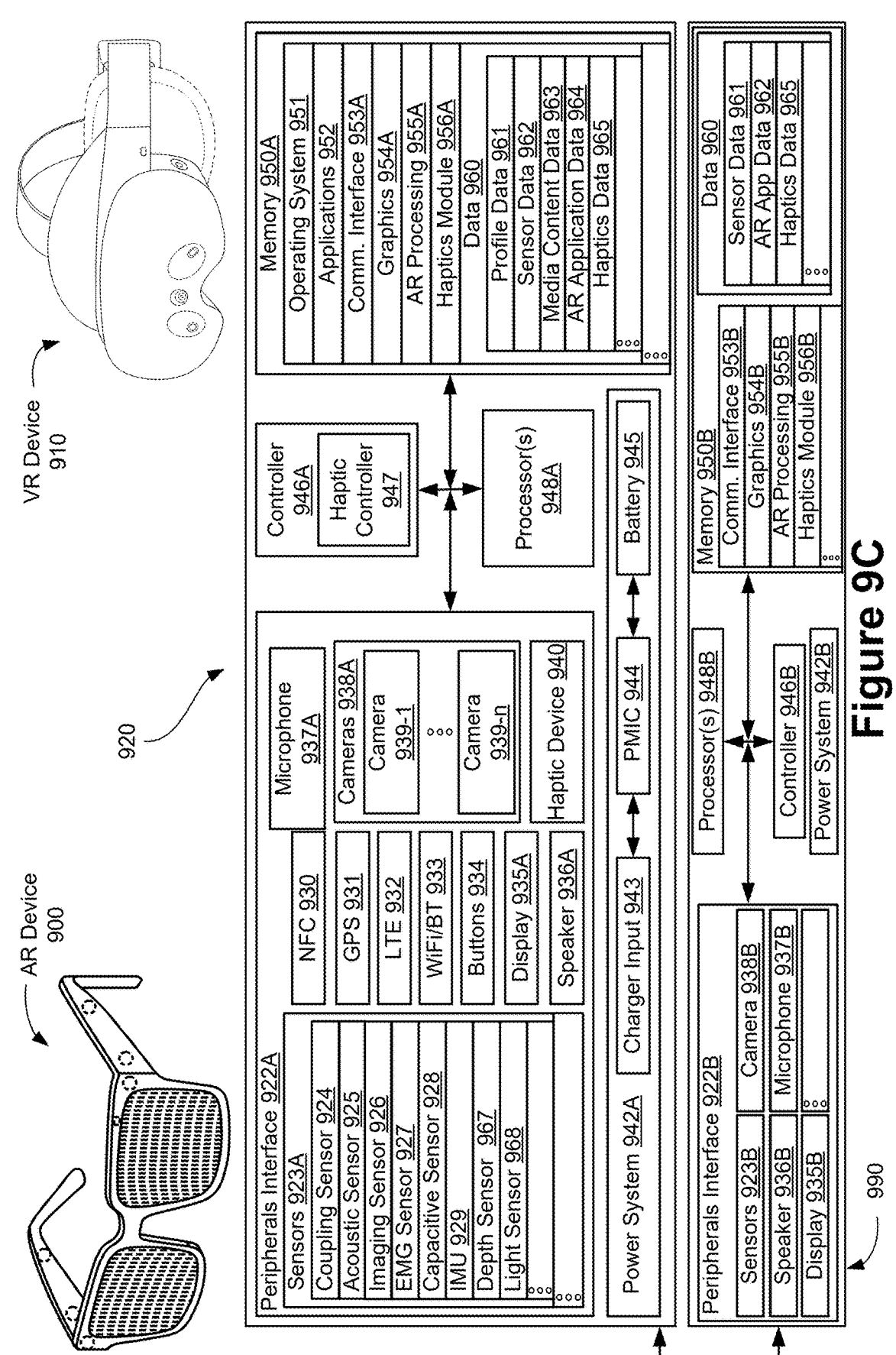

FIG. 9C illustrates a computing system 920 and an optional housing 990, each of which shows components that can be included in a head-wearable device (e.g., the AR device 900 and/or the VR device 910). In some embodiments, more or fewer components can be included in the optional housing 990 depending on practical restraints of the respective head-wearable device being described. Additionally or alternatively, the optional housing 990 can include additional components to expand and/or augment the functionality of a head-wearable device.

In some embodiments, the computing system 920 and/or the optional housing 990 can include one or more peripheral interfaces 922A and 922B, one or more power systems 942A and 942B (including charger input 943, PMIC 944, and battery 945), one or more controllers 946A and 946B (including one or more haptic controllers 947), one or more processors 948A and 948B (as defined above, including any of the examples provided), and memory 950A and 950B, which can all be in electronic communication with each other. For example, the one or more processors 948A and/or 948B can be configured to execute instructions stored in the memory 950A and/or 950B, which can cause a controller of the one or more controllers 946A and/or 946B to cause operations to be performed at one or more peripheral devices of the peripherals interfaces 922A and/or 922B. In some embodiments, each operation described can occur based on electrical power provided by the power system 942A and/or 942B.

In some embodiments, the peripherals interface 922A can include one or more devices configured to be part of the computing system 920, many of which have been defined above and/or described with respect to wrist-wearable devices shown in FIGS. 8A and 8B. For example, the peripherals interface can include one or more sensors 923A. Some example sensors include one or more coupling sensors 924, one or more acoustic sensors 925, one or more imaging sensors 926, one or more EMG sensors 927, one or more capacitive sensors 928, and/or one or more IMUs 929. In some embodiments, the sensors 923A further include depth sensors 967, light sensors 968, and/or any other types of sensors defined above or described with respect to any other embodiments discussed herein.

In some embodiments, the peripherals interface can include one or more additional peripheral devices, including one or more NFC devices 930, one or more GPS devices 931, one or more LTE devices 932, one or more Wi-Fi and/or Bluetooth devices 933, one or more buttons 934 (e.g., including buttons that are slidable or otherwise adjustable), one or more displays 935A, one or more speakers 936A, one or more microphones 937A, one or more cameras 938A (e.g., including the first camera 939-1 through nth camera 939-*n*, which are analogous to the left camera 939A and/or the right camera 939B), one or more haptic devices 940**, and/or any other types of peripheral devices defined above or described with respect to any other embodiments discussed herein.

The head-wearable devices can include a variety of types of visual feedback mechanisms (e.g., presentation devices). For example, display devices in the AR device 900 and/or the VR device 910 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes) and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 935A can be coupled to each of the lenses 906-1 and 906-2 of the AR device 900. The displays 935A coupled to each of the lenses 906-1 and 906-2 can act together or independently to present an image or series of images to a user. In some embodiments, the AR device 900 and/or the VR device 910 includes a single display 935A (e.g., a near-eye display) or more than two displays 935A.

In some embodiments, a first set of one or more displays 935A can be used to present an augmented-reality environment, and a second set of one or more display devices 935A can be used to present a VR environment. In some embodiments, one or more waveguides are used in conjunction with presenting AR content to the user of the AR device 900 and/or the VR device 910 (e.g., as a means of delivering light from a display projector assembly and/or one or more displays 935A to the user's eyes). In some embodiments, one or more waveguides are fully or partially integrated into the AR device 900 and/or the VR device 910. Additionally, or alternatively, to display screens, some AR systems include one or more projection systems. For example, display devices in the AR device 900 and/or the VR device 910 can include micro-LED projectors that project light (e.g., using a waveguide) into display devices, such as clear combiner lenses that allow ambient light to pass through. The display devices can refract the projected light toward a user's pupil and can enable a user to simultaneously view both AR content and the real world. The head-wearable devices can also be configured with any other suitable type or form of image projection system. In some embodiments, one or more waveguides are provided, additionally or alternatively, to the one or more display(s) 935A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion, less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15%-50% of the ambient light and/or the real-world live view) can be passed through the user interface element, such that the user can distinguish at least a portion of the physical environment over which the user interface element is being displayed.

The head-wearable devices can include one or more external displays 935A for presenting information to users. For example, an external display 935A can be used to show a current battery level, network activity (e.g., connected, disconnected), current activity (e.g., playing a game, in a call, in a meeting, or watching a movie), and/or other relevant information. In some embodiments, the external displays 935A can be used to communicate with others. For example, a user of the head-wearable device can cause the external displays 935A to present a "do not disturb" notification. The external displays 935A can also be used by the user to share any information captured by the one or more components of the peripherals interface 922A and/or generated by the head-wearable device (e.g., during operation and/or performance of one or more applications).

The memory 950A can include instructions and/or data executable by one or more processors 948A (and/or processors 948B of the housing 990) and/or a memory controller of the one or more controllers 946A (and/or controller 946B of the housing 990). The memory 950A can include one or more operating systems 951, one or more applications 952, one or more communication interface modules 953A, one or more graphics modules 954A, one or more AR processing modules 955A, one or more haptics modules 956A for determining, generating, and provided instructions for causing the performance of a haptic response, such as the haptic responses described above in reference to FIGS. 1A-5, and/or any other types of modules or components defined above or described with respect to any other embodiments discussed herein. The haptics modules 956A is analogous to the haptics modules 1187 (FIG. 11C) such that features of the haptics modules 1187 described below are included in the haptics modules 956A.

The data 960 stored in memory 950A can be used in conjunction with one or more of the applications and/or programs discussed above. The data 960 can include profile data 961, sensor data 962, media content data 963, AR application data 964, haptics data 965 for storing data related to the performance of the features described above in reference to FIGS. 1A-5; and/or any other types of data defined above or described with respect to any other embodiments discussed herein. The haptics data 965 is analogous to the haptics data 1194 (FIG. 11C) such that features of the haptics data 1194 described below are included in the haptics data 965.

In some embodiments, the controller 946A of the head-wearable devices processes information generated by the sensors 923A on the head-wearable devices and/or another component of the head-wearable devices and/or communicatively coupled with the head-wearable devices (e.g., components of the housing 990, such as components of peripherals interface 922B). For example, the controller 946A can process information from the acoustic sensors 925 and/or image sensors 926. For each detected sound, the controller 946A can perform a direction of arrival (DOA) estimation to estimate a direction from which the detected sound arrived at a head-wearable device. As one or more of the acoustic sensors 925 detect sounds, the controller 946A can populate an audio data set with the information (e.g., represented by sensor data 962).

In some embodiments, a physical electronic connector can convey information between the head-wearable devices and another electronic device, and/or between one or more processors 948A of the head-wearable devices and the controller 946A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 1000) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 900 and/or the VR device 910 can include one or more optical sensors such as two-dimensional (2D) or three-dimensional (3D) cameras, ToF depth sensors, single-beam or sweeping laser rangefinders, 3D LiDAR sensors, and/or any other suitable type or form of optical sensor. A head-wearable device can process data from one or more of these sensors to identify a location of a user and/or aspects of the user's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with an AR environment), among a variety of other functions. For example, FIGS. 9B-1 and 9B-2 show the VR device 910 having cameras 939A-939D, which can be used to provide depth information for creating a voxel field and a 2D mesh to provide object information to the user to avoid collisions.

The optional housing 990 can include analogous components to those describe above with respect to the computing system 920. For example, the optional housing 990 can include a respective peripheral interface 922B, including more or fewer components to those described above with respect to the peripherals interface 922A. As described above, the components of the optional housing 990 can be used to augment and/or expand on the functionality of the head-wearable devices. For example, the optional housing 990 can include respective sensors 923B, speakers 936B, displays 935B, microphones 937B, cameras 938B, and/or other components to capture and/or present data. Similarly, the optional housing 990 can include one or more processors 948B, controllers 946B, and/or memory 950B (including respective communication interface modules 953B, one or more graphics modules 954B, one or more AR processing modules 955B) that can be used individually and/or in conjunction with the components of the computing system 920.

The techniques described above in FIGS. 9A-9C can be used with different head-wearable devices. In some embodiments, the head-wearable devices (e.g., the AR device 900 and/or the VR device 910) can be used in conjunction with one or more wearable devices such as a wrist-wearable device 800 (or components thereof) and/or a smart textile-based garment 1100 (FIGS. 11A-11C), as well as an HIPD 1000. Having thus described example the head-wearable devices, attention will now be turned to example handheld intermediary processing devices, such as HIPD 1000.

Example Handheld Intermediary Processing Devices

Figure 10B:
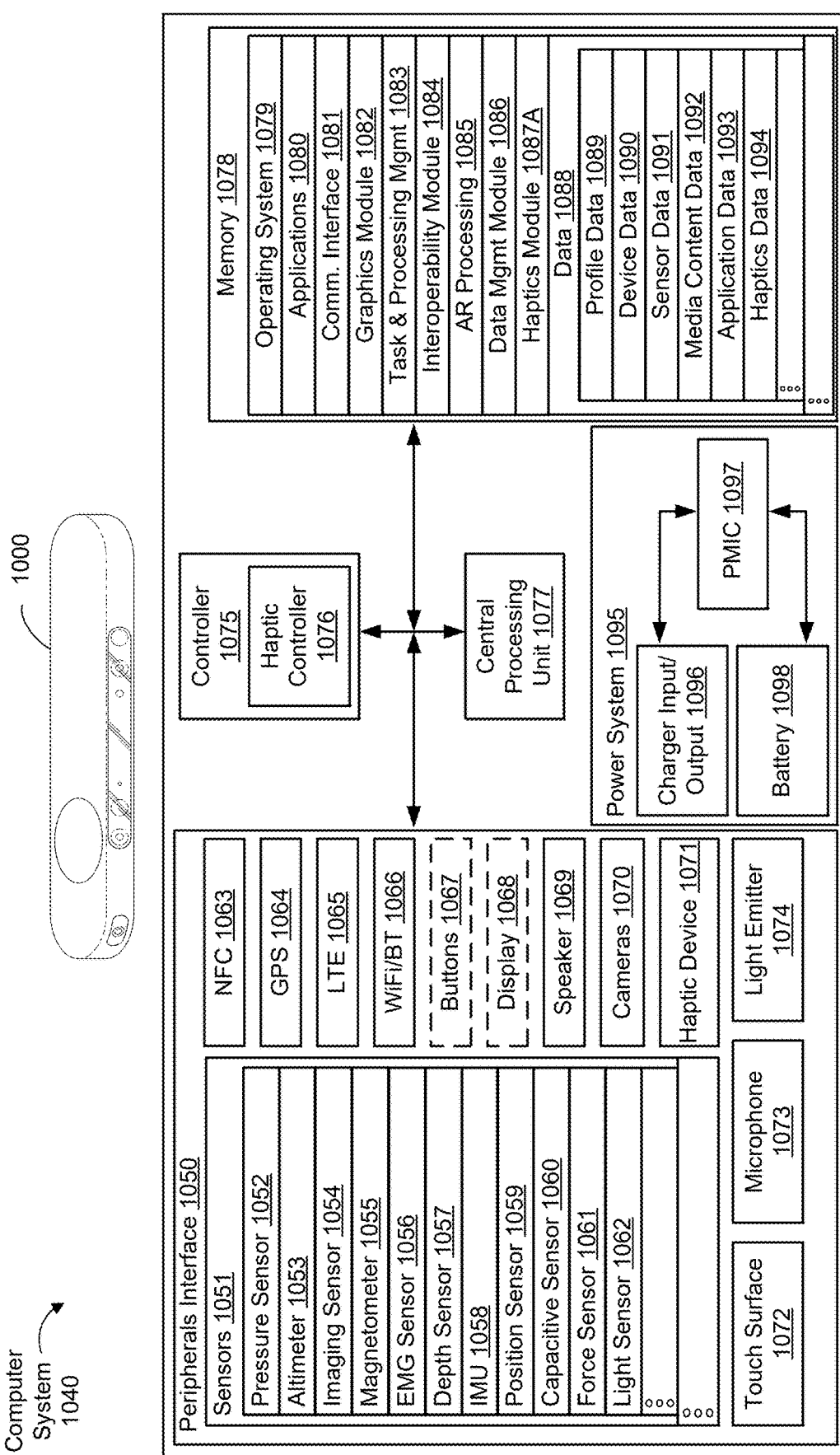

FIGS. 10A and 10B illustrate an example handheld intermediary processing device (HIPD) 1000, in accordance with some embodiments. The HIPD 1000 is an instance of the intermediary device described in reference to FIG. 1A-1D herein, such that the HIPD 1000 should be understood to have the features described with respect to any intermediary device defined above or otherwise described herein, and vice versa. The HIPD 1000 can perform various functions and/or operations associated with navigating through user interfaces and selectively opening applications, as well as the functions and/or operations described above with reference to FIGS. 1A-5.

FIG. 10A shows a top view 1005 and a side view 1025 of the HIPD 1000. The HIPD 1000 is configured to communicatively couple with one or more wearable devices (or other electronic devices) associated with a user. For example, the HIPD 1000 is configured to communicatively couple with a user's wrist-wearable device 800 (or components thereof, such as the watch body 820 and the wearable band 810), AR device 900, and/or VR device 910. The HIPD 1000 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 1000 can successfully be communicatively coupled with an electronic device, such as a wearable device).

The HIPD 1000 can perform various functions independently and/or in conjunction with one or more wearable devices (e.g., wrist-wearable device 800, AR device 900, and/or VR device 910). The HIPD 1000 is configured to increase and/or improve the functionality of communicatively coupled devices, such as the wearable devices. The HIPD 1000 is configured to perform one or more functions or operations associated with interacting with user interfaces and applications of communicatively coupled devices, interacting with an AR environment, interacting with a VR environment, and/or operating as a human-machine interface controller, as well as functions and/or operations described above with reference to FIGS. 1A-5. Additionally, as will be described in more detail below, functionality and/or operations of the HIPD 1000 can include, without limitation, task offloading and/or handoffs, thermals offloading and/or handoffs, 6 degrees of freedom (6DoF) raycasting and/or gaming (e.g., using imaging devices or cameras 1014A and 1014B, which can be used for simultaneous localization and mapping (SLAM), and/or with other image processing techniques), portable charging; messaging, image capturing via one or more imaging devices or cameras (e.g., cameras 1022A and 1022B), sensing user input (e.g., sensing a touch on a multitouch input surface 1002), wireless communications and/or interlining (e.g., cellular, near field, Wi-Fi, or personal area network), location determination, financial transactions, providing haptic feedback, alarms, notifications, biometric authentication, health monitoring, sleep monitoring. The above-example functions can be executed independently in the HIPD 1000 and/or in communication between the HIPD 1000 and another wearable device described herein. In some embodiments, functions can be executed on the HIPD 1000 in conjunction with an AR environment. As the skilled artisan will appreciate upon reading the descriptions provided herein, the novel HIPD 1000 described herein can be used with any type of suitable AR environment.

While the HIPD 1000 is communicatively coupled with a wearable device and/or other electronic device, the HIPD 1000 is configured to perform one or more operations initiated at the wearable device and/or the other electronic device. In particular, one or more operations of the wearable device and/or the other electronic device can be offloaded to the HIPD 1000 to be performed. The HIPD 1000 performs one or more operations of the wearable device and/or the other electronic device and provides data corresponding to the completed operations to the wearable device and/or the other electronic device. For example, a user can initiate a video stream using the AR device 900 and back-end tasks associated with performing the video stream (e.g., video rendering) can be offloaded to the HIPD 1000, which the HIPD 1000 performs and provides corresponding data to the AR device 900 to perform remaining front-end tasks associated with the video stream (e.g., presenting the rendered video data via a display of the AR device 900). In this way, the HIPD 1000, which has more computational resources and greater thermal headroom than a wearable device can perform computationally intensive tasks for the wearable device, improving performance of an operation performed by the wearable device.

The HIPD 1000 includes a multi-touch input surface 1002 on a first side (e.g., a front surface) that is configured to detect one or more user inputs. In particular, the multi-touch input surface 1002 can detect single-tap inputs, multi-tap inputs, swipe gestures and/or inputs, force-based and/or pressure-based touch inputs, held taps, and the like. The multi-touch input surface 1002 is configured to detect capacitive touch inputs and/or force (and/or pressure) touch inputs. The multi-touch input surface 1002 includes a first touch-input surface 1004 defined by a surface depression, and a second touch-input surface 1006 defined by a substantially planar portion. The first touch-input surface 1004 can be disposed adjacent to the second touch-input surface 1006. In some embodiments, the first touch-input surface 1004 and the second touch-input surface 1006 can be different dimensions, shapes, and/or cover different portions of the multi-touch input surface 1002. For example, the first touch-input surface 1004 can be substantially circular and the second touch-input surface 1006 is substantially rectangular. In some embodiments, the surface depression of the multi-touch input surface 1002 is configured to guide user handling of the HIPD 1000. In particular, the surface depression is configured such that the user holds the HIPD 1000 upright when held in a single hand (e.g., such that the using imaging devices or cameras 1014A and 1014B are pointed toward a ceiling or the sky). Additionally, the surface depression is configured such that the user's thumb rests within the first touch-input surface 1004.

In some embodiments, the different touch-input surfaces include a plurality of touch-input zones. For example, the second touch-input surface 1006 includes at least a first touch-input zone 1008 within a second touch-input zone 1006 and a third touch-input zone 1010 within the first touch-input zone 1008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1008 causes the HIPD 1000 to perform a first command and a user input detected within the second touch-input zone 1006 causes the HIPD 1000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1008 can be configured to detect force touch inputs (e.g., a magnitude at which the user presses down) and capacitive touch inputs, and the second touch-input zone 1006 can be configured to detect capacitive touch inputs.

The HIPD 1000 includes one or more sensors 1051 for sensing data used in the performance of one or more operations and/or functions. For example, the HIPD 1000 can include an IMU that is used in conjunction with cameras 1014 for 3-dimensional object manipulation (e.g., enlarging, moving, destroying, etc. an object) in an AR or VR environment. Non-limiting examples of the sensors 1051 included in the HIPD 1000 include a light sensor, a magnetometer, a depth sensor, a pressure sensor, and a force sensor. Additional examples of the sensors 1051 are provided below in reference to FIG. 10B.

The HIPD 1000 can include one or more light indicators 1012 to provide one or more notifications to the user. In some embodiments, the light indicators are LEDs or other types of illumination devices. The light indicators 1012 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1004. The light indicators can be illuminated in different colors and/or patterns to provide the user with one or more notifications and/or information about the device. For example, a light indicator positioned around the first touch-input surface 1004 can flash when the user receives a notification (e.g., a message), change red when the HIPD 1000 is out of power, operate as a progress bar (e.g., a light ring that is closed when a task is completed (e.g., 0% to 100%)), operates as a volume indicator, etc.).

In some embodiments, the HIPD 1000 includes one or more additional sensors on another surface. For example, as shown FIG. 10A, HIPD 1000 includes a set of one or more sensors (e.g., sensor set 1020) on an edge of the HIPD 1000. The sensor set 1020, when positioned on an edge of the of the HIPD 1000, can be pe positioned at a predetermined tilt angle (e.g., 26 degrees), which allows the sensor set 1020 to be angled toward the user when placed on a desk or other flat surface. Alternatively, in some embodiments, the sensor set 1020 is positioned on a surface opposite the multi-touch input surface 1002 (e.g., a back surface). The one or more sensors of the sensor set 1020 are discussed in detail below.

The side view 1025 of the of the HIPD 1000 shows the sensor set 1020 and camera 1014B. The sensor set 1020 includes one or more cameras 1022A and 1022B, a depth projector 1024, an ambient light sensor 1028, and a depth receiver 1030. In some embodiments, the sensor set 1020 includes a light indicator 1026. The light indicator 1026 can operate as a privacy indicator to let the user and/or those around them know that a camera and/or microphone is active. The sensor set 1020 is configured to capture a user's facial expression such that the user can puppet a custom avatar (e.g., showing emotions, such as smiles, laughter, etc., on the avatar or a digital representation of the user). The sensor set 1020 can be configured as a side stereo red-green-blue (RGB) system, a rear indirect time-of-flight (iToF) system, or a rear stereo RGB system. As the skilled artisan will appreciate upon reading the descriptions provided herein, the novel HIPD 1000 described herein can use different sensor set 1020 configurations and/or sensor set 1020 placement.

In some embodiments, the HIPD 1000 includes one or more haptic devices 1071 (FIG. 10B; e.g., a vibratory haptic actuator) that are configured to provide haptic feedback (e.g., kinesthetic sensation). The sensors 1051, and/or the haptic devices 1071 can be configured to operate in conjunction with multiple applications and/or communicatively coupled devices including, without limitation, a wearable device, health monitoring applications, social media applications, game applications, and artificial reality applications (e.g., the applications associated with artificial reality).

The HIPD 1000 is configured to operate without a display. However, in optional embodiments, the HIPD 1000 can include a display 1068 (FIG. 10B). The HIPD 1000 can also income one or more optional peripheral buttons 1067 (FIG. 10B). For example, the peripheral buttons 1067 can be used to turn on or turn off the HIPD 1000. Further, the HIPD 1000 housing can be formed of polymers and/or elastomer elastomers. The HIPD 1000 can be configured to have a non-slip surface to allow the HIPD 1000 to be placed on a surface without requiring a user to watch over the HIPD 1000. In other words, the HIPD 1000 is designed such that it would not easily slide off a surface. In some embodiments, the HIPD 1000 include one or magnets to couple the HIPD 1000 to another surface. This allows the user to mount the HIPD 1000 to different surfaces and provide the user with greater flexibility in use of the HIPD 1000.

As described above, the HIPD 1000 can distribute and/or provide instructions for performing the one or more tasks at the HIPD 1000 and/or a communicatively coupled device. For example, the HIPD 1000 can identify one or more back-end tasks to be performed by the HIPD 1000 and one or more front-end tasks to be performed by a communicatively coupled device. While the HIPD 1000 is configured to offload and/or handoff tasks of a communicatively coupled device, the HIPD 1000 can perform both back-end and front-end tasks (e.g., via one or more processors, such as CPU 1077; FIG. 10B). The HIPD 1000 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 1000 can perform the above operations alone or in conjunction with a wearable device (or other communicatively coupled electronic device).

FIG. 10B shows block diagrams of a computing system 1040 of the HIPD 1000, in accordance with some embodiments. The HIPD 1000, described in detail above, can include one or more components shown in HIPD computing system 1040. The HIPD 1000 will be understood to include the components shown and described below for the HIPD computing system 1040. In some embodiments, all, or a substantial portion of the components of the HIPD computing system 1040 are included in a single integrated circuit. Alternatively, in some embodiments, components of the HIPD computing system 1040 are included in a plurality of integrated circuits that are communicatively coupled.

The HIPD computing system 1040 can include a processor (e.g., a CPU 1077, a GPU, and/or a CPU with integrated graphics), a controller 1075, a peripherals interface 1050 that includes one or more sensors 1051 and other peripheral devices, a power source (e.g., a power system 1095), and memory (e.g., a memory 1078) that includes an operating system (e.g., an operating system 1079), data (e.g., data 1088), one or more applications (e.g., applications 1080), and one or more modules (e.g., a communications interface module 1081, a graphics module 1082, a task and processing management module 1083, an interoperability module 1084, an AR processing module 1085, a data management module 1086, a haptics module 1087, etc.). The HIPD computing system 1040 further includes a power system 1095 that includes a charger input and output 1096, a PMIC 1097, and a battery 1098, all of which are defined above.

In some embodiments, the peripherals interface 1050 can include one or more sensors 1051. The sensors 1051 can include analogous sensors to those described above in reference to FIG. 8B. For example, the sensors 1051 can include imaging sensors 1054, (optional) EMG sensors 1056, IMUs 1058, and capacitive sensors 1060. In some embodiments, the sensors 1051 can include one or more pressure sensor 1052 for sensing pressure data, an altimeter 1053 for sensing an altitude of the HIPD 1000, a magnetometer 1055 for sensing a magnetic field, a depth sensor 1057 (or a time-of flight sensor) for determining a difference between the camera and the subject of an image, a position sensor 1059 (e.g., a flexible position sensor) for sensing a relative displacement or position change of a portion of the HIPD 1000, a force sensor 1061 for sensing a force applied to a portion of the HIPD 1000, and a light sensor 1062 (e.g., an ambient light sensor) for detecting an amount of lighting. The sensors 1051 can include one or more sensors not shown in FIG. 10B.

Analogous to the peripherals described above in reference to FIGS. 8B, the peripherals interface 1050 can also include an NFC component 1063, a GPS component 1064, an LTE component 1065, a Wi-Fi and/or Bluetooth communication component 1066, a speaker 1069, a haptic device 1071, and a microphone 1073. As described above in reference to FIG. 10A, the HIPD 1000 can optionally include a display 1068 and/or one or more buttons 1067. The peripherals interface 1050 can further include one or more cameras 1070, touch surfaces 1072, and/or one or more light emitters 1074. The multi-touch input surface 1002 described above in reference to FIG. 10A is an example of touch surface 1072. The light emitters 1074 can be one or more LEDs, lasers, etc. and can be used to project or present information to a user. For example, the light emitters 1074 can include light indicators 1012 and 1026 described above in reference to FIG. 10A. The cameras 1070 (e.g., cameras 1014A, 1014B, and 1022 described above in FIG. 10A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1070 can be used for SLAM; 6 DoF ray casting, gaming, object manipulation, and/or other rendering; facial recognition and facial expression recognition, etc.

Similar to the watch body computing system 860 and the watch band computing system 830 described above in reference to FIG. 8B, the HIPD computing system 1040 can include one or more haptic controllers 1076 and associated componentry (e.g., haptic devices 1071) for providing haptic events at the HIPD 1000.

Memory 1078 can include high-speed random-access memory and/or non-volatile memory, such as one or more magnetic disk storage devices, flash memory devices, or other non-volatile solid-state memory devices. Access to the memory 1078 by other components of the HIPD 1000, such as the one or more processors and the peripherals interface 1050, can be controlled by a memory controller of the controllers 1075.

In some embodiments, software components stored in the memory 1078 include one or more operating systems 1079, one or more applications 1080, one or more communication interface modules 1081, one or more graphics modules 1082, one or more data management modules 1085, which are analogous to the software components described above in reference to FIG. 8B. The software components stored in the memory 1078 can also include a haptics module 1087, which is configured to perform the features described above in reference to FIGS. 1A-9C.

In some embodiments, software components stored in the memory 1078 include a task and processing management module 1083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1083 uses data 1088 (e.g., device data 1090) to distribute the one or more front-end and/or back-end tasks based on communicatively coupled devices' computing resources, available power, thermal headroom, ongoing operations, and/or other factors. For example, the task and processing management module 1083 can cause the performance of one or more back-end tasks (of an operation performed at communicatively coupled AR device 900) at the HIPD 1000 in accordance with a determination that the operation is utilizing a predetermined amount (e.g., at least 70%) of computing resources available at the AR device 900.

In some embodiments, software components stored in the memory 1078 include an interoperability module 1084 for exchanging and utilizing information received and/or provided to distinct communicatively coupled devices. The interoperability module 1084 allows for different systems, devices, and/or applications to connect and communicate in a coordinated way without user input. In some embodiments, software components stored in the memory 1078 include an AR module 1085 that is configured to process signals based at least on sensor data for use in an AR and/or VR environment. For example, the AR processing module 1085 can be used for 3D object manipulation, gesture recognition, facial and facial expression, recognition, etc.

The memory 1078 can also include data 1088, including structured data. In some embodiments, the data 1088 can include profile data 1089, device data 1089 (including device data of one or more devices communicatively coupled with the HIPD 1000, such as device type, hardware, software, configurations, etc.), sensor data 1091, media content data 1092, application data 1093, and haptics data DATA 1094, which stores data related to the performance of the features described above in reference to FIGS. 1A-9C.

It should be appreciated that the HIPD computing system 1040 is an example of a computing system within the HIPD 1000, and that the HIPD 1000 can have more or fewer components than shown in the HIPD computing system 1040, combine two or more components, and/or have a different configuration and/or arrangement of the components. The various components shown in HIPD computing system 1040 are implemented in hardware, software, firmware, or a combination thereof, including one or more signal processing and/or application-specific integrated circuits.

The techniques described above in FIG. 10A-10B can be used with any device used as a human-machine interface controller. In some embodiments, an HIPD 1000 can be used in conjunction with one or more wearable device such as a head-wearable device (e.g., AR device 900 and VR device 910) and/or a wrist-wearable device 800 (or components thereof). In some embodiments, an HIPD 1000 can also be used in conjunction with a wearable garment, such as smart textile-based garment 1100 (FIGS. 11A-11C). Having thus described example HIPD 1000, attention will now be turned to example feedback devices, such as smart textile-based garment 1100.

Example System for Smart Textile-Based Garments

FIGS. 11A and 11B illustrate an example smart textile-based garment, in accordance with some embodiments. The smart textile-based garment 1100 (e.g., wearable gloves, a shirt, a headband, a wristband, socks, etc.) is configured to communicatively couple with one or more electronic devices, such as a wrist-wearable device 800, a head-wearable device, an HIPD 1000, a laptop, tablet, and/or other computing devices. The smart textile-based garment 1100 is an instance of the smart textile-based garment (e.g., the wearable glove) described in reference to FIGS. 1A-5 herein, such that the smart textile-based garment 1100 should be understood to have the features described with respect to any smart textile-based garment defined above or otherwise described herein, and vice versa. The smart textile-based garment 1100 can perform various functions and/or operations associated with navigating through user interfaces and selectively opening applications, as well as the functions and/or operations described above with reference to FIGS. 1A-5.

The smart textile-based garment 1100 can be part of an AR system, such as AR system 700d described above in reference to FIGS. 7D-1 and 7D-2. The smart textile-based garment 1100 is also configured to provide feedback (e.g., tactile or other haptic feedback) to a user based on the user's interactions with a computing system (e.g., navigation of a user interface, operation of an application (e.g., game vibrations, media responsive haptics), device notifications, etc.)), and/or the user's interactions within an AR environment. In some embodiments, the smart textile-based garment 1100 receives instructions from a communicatively coupled device (e.g., the wrist-wearable device 800, a head-wearable device, and HIPD 1000, etc.) for causing the performance of a feedback response. Alternatively, or in addition, in some embodiments, the smart textile-based garment 1100 determines one or more feedback responses to provide a user. The smart textile-based garment 1100 can determine the one or more feedback responses based on sensor data captured by one or more of its sensors (e.g., sensors 1151; FIG. 11C) or communicatively coupled sensors (e.g., sensors of a wrist-wearable device 800, a head-wearable device, an HIPD 1000, and/or other computing device).

Non-limiting examples of the feedback determined by the smart textile-based garment 1100 and/or a communicatively coupled device include visual feedback, audio feedback, haptic (e.g., tactile, kinesthetic, etc.) feedback, thermal or temperature feedback, and/or other sensory perceptible feedback. The smart textile-based garment 1100 can include respective feedback devices (e.g., a haptic device or assembly 1162 or other feedback devices or assemblies) to provide the feedback responses to the user. Similarly, the smart textile-based garment 1100 can communicatively couple with another device (and/or the other device's feedback devices) to coordinate the feedback provided to the user. For example, a VR device 910 can present an AR environment to a user and as the user interacts with objects within the AR environment, such as a virtual cup, the smart textile-based garment 1100 provides respective response to the user. In particular, the smart textile-based garment 1100 can provide haptic feedback to prevent (or, at a minimum, hinder/resist movement of) one or more of the user's fingers from bending past a certain point to simulate the sensation of touching a solid cup and/or thermal feedback to simulate the sensation of a cold or warm beverage.

Additionally or alternatively, in some embodiments, the smart textile-based garment 1100 is configured to operate as a controller configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 10A-10B.

FIG. 11A shows one or more haptic assemblies 1162 (e.g., first through fourth haptic assemblies 1162-1 through 1162-4) on a portion of the smart textile-based garment 1100 adjacent to a palmar side of the user's hand and FIG. 11B shows additional haptic assemblies (e.g., a fifth haptic assembly 1162-5) on a portion of the smart textile-based garment 1100 adjacent to a dorsal side of the user's hand. In some embodiments, the haptic assemblies 1162 include a mechanism that, at a minimum, provide resistance when a respective haptic assembly 1162 is transitioned from a first state (e.g., a first pressurized state (e.g., at atmospheric pressure or deflated)) to a second state (e.g., a second pressurized state (e.g., inflated to a threshold pressure)). In other words, the haptic assemblies 1162 described can transition between a first pressurized state and a second pressurized state to provide haptic feedback to the user. Structures of haptic assemblies 1162 can be integrated into various devices configured to be in contact or proximity to a user's skin, including, but not limited to devices such as glove worn devices, body worn clothing device, headset devices. Each of the haptic assemblies 1162 can be included in or physically coupled to a garment component 1104 of the smart textile-based garment 1100. For example, each of the haptic assemblies 1162-1, 1162-2, 1162-3, . . . 1162-N are physically coupled to the garment 1104 are configured to contact respective phalanges of a user's thumb and fingers.

Due to the ever-changing nature of artificial-reality, the haptic assemblies 1162 may be required to transition between the multiple states hundreds, or perhaps thousands of times, during a single use. Thus, the haptic assemblies 1162 described herein are durable and designed to quickly transition from state to state. To provide some context, in a first pressurized state, the haptic assemblies 1162 do not impede free movement of a portion of the wearer's body. For example, one or more haptic assemblies 1162 incorporated into a glove are made from flexible materials that do not impede free movement of the wearer's hand and fingers (e.g., an electrostatic-zipping actuator). The haptic assemblies 1162 are configured to conform to a shape of the portion of the wearer's body when in the first pressurized state. However, once in a second pressurized state, the haptic assemblies 1162 can be configured to restrict and/or impede free movement of the portion of the wearer's body (e.g., appendages of the user's hand). For example, the respective haptic assembly 1162 (or multiple respective haptic assemblies) can restrict movement of a wearer's finger (e.g., prevent the finger from curling or extending) when the haptic assembly 1162 is in the second pressurized state. Moreover, once in the second pressurized state, the haptic assemblies 1162 may take different shapes, with some haptic assemblies 1162 configured to take a planar, rigid shape (e.g., flat and rigid), while some other haptic assemblies 1162 are configured to curve or bend, at least partially.

The smart textile-based garment 1100 can be one of a plurality of devices in an AR system (e.g., AR systems of FIGS. 7A-7D-2). For example, a user can wear a pair of gloves (e.g., a first type of smart textile-based garment 1100), wear a haptics component of a wrist-wearable device 800 (FIGS. 8A-8B), wear a headband (e.g., a second type of smart textile-based garment 1100), hold an HIPD 1000, etc. As explained above, the haptic assemblies 1162 are configured to provide haptic simulations to a wearer of the smart textile-based garments 1100. The garment 1104 of each smart textile-based garment 1100 can be one of various articles of clothing (e.g., gloves, socks, shirts, pants, etc.). Thus, a user may wear multiple smart textile-based garments 1100 that are each configured to provide haptic stimulations to respective parts of the body where the smart textile-based garments 1100 are being worn. Although the smart textile-based garment 1100 are described as an individual device, in some embodiments, the smart textile-based garment 1100 can be combined with other wearable devices described herein. For example, the smart textile-based garment 1100 can form part of a VR device 910 (e.g., a headband portion).

FIG. 11C shows block diagrams of a computing system 1140 of the haptic assemblies 1162, in accordance with some embodiments. The computing system 1140 can include one or more peripheral interfaces 1150, one or more power systems 1195 (including charger input 1196, PMIC 1197, and battery 1198), one or more controllers 1175 (including one or more haptic controllers 1176), one or more processors 1177 (as defined above, including any of the examples provided), and memory 1178, which can all be in electronic communication with each other. For example, the one or more processors 1177 can be configured to execute instructions stored in the memory 1178, which can cause a controller of the one or more controllers 1175 to cause operations to be performed at one or more peripheral devices of the peripherals interface 1150. In some embodiments, each operation described can occur based on electrical power provided by the power system 1195.

In some embodiments, the peripherals interface 1150 can include one or more devices configured to be part of the computing system 1140, many of which have been defined above and/or described with respect to wrist-wearable devices shown in FIGS. 8A-10B. For example, the peripherals interface 1150 can include one or more sensors 1151, such as one or more pressure sensors 1152, one or more EMG sensors 1156, one or more IMUs 1158, one or more position sensors 1159, one or more capacitive sensors 1160, one or more force sensors 1161; and/or any other types of sensors defined above or described with respect to any other embodiments discussed herein. In some embodiments, the peripherals interface can include one or more additional peripheral devices, including one or more Wi-Fi and/or Bluetooth devices 1168, an LTE component 1169, a GPS component 1170, a microphone 1171, one or more haptic assemblies 1162, one or more support structures 1163 which can include one or more bladders 1164, one or more manifolds 1165, one or more pressure-changing devices 1167, one or more displays 1172, one or more buttons 1173, one or more speakers 1174, and/or any other types of peripheral devices defined above or described with respect to any other embodiments discussed herein. In some embodiments, computing system 1140 includes more or fewer components than those shown in FIG. 11C.

In some embodiments, each haptic assembly 1162 includes a support structure 1163 and at least one bladder 1164. The bladder 1164 (e.g., a membrane) is a sealed, inflatable pocket made from a durable and puncture-resistant material, such as thermoplastic polyurethane (TPU), a flexible polymer, or the like. The bladder 1164 contains a medium (e.g., a fluid such as air, inert gas, or even a liquid) that can be added to or removed from the bladder 1164 to change pressure (e.g., fluid pressure) inside the bladder 1164. The support structure 1163 is made from a material that is stronger and stiffer than the material of the bladder 1164. A respective support structure 1163 coupled to a respective bladder 1164 is configured to reinforce the respective bladder 1164 as the respective bladder changes shape and size due to changes in pressure (e.g., fluid pressure) inside the bladder. The above example haptic assembly 1162 is non-limiting. The haptic assembly 1162 can include eccentric rotating mass (ERM), linear resonant actuators (LRA), voice coil motor (VCM), piezo haptic actuator, thermoelectric devices, solenoid actuators, ultrasonic transducers, thermo-resistive heaters, Peltier devices, and/or other devices configured to generate a perceptible response.

The smart textile-based garment 1100 also includes a haptic controller 1176 and a pressure-changing device 1167. Alternatively, in some embodiments, the computing system 1140 is communicatively coupled with a haptic controller 1176 and/or pressure-changing device 1167 (e.g., in electronic communication with one or more processors 1177 of the computing system 1140). The haptic controller 1176 is configured to control operation of the pressure-changing device 1167, and in turn operation of the smart textile-based garments 1100. For example, the haptic controller 1176 sends one or more signals to the pressure-changing device 1167 to activate the pressure-changing device 1167 (e.g., turn it on and off). The one or more signals can specify a desired pressure (e.g., pounds per square inch) to be output by the pressure-changing device 1167. Generation of the one or more signals, and in turn the pressure output by the pressure-changing device 1167, can be based on information collected by sensors 1151 of the smart textile-based garment 1100 and/or other communicatively coupled device. For example, the haptic controller 1176 can provide one or more signals, based on collected sensor data, to cause the pressure-changing device 1167 to increase the pressure (e.g., fluid pressure) inside a first haptic assembly 1162 at a first time, and provide one or more additional signals, based on additional sensor data, to the pressure-changing device 1167, to cause the pressure-changing device 1167 to further increase the pressure inside a second haptic assembly 1162 at a second time after the first time. Further, the haptic controller 1176 can provide one or more signals to cause the pressure-changing device 1167 to inflate one or more bladders 1164 in a first portion of a smart textile-based garment 1100 (e.g., a first finger), while one or more bladders 1164 in a second portion of the smart textile-based garment 1100 (e.g., a second finger) remain unchanged. Additionally, the haptic controller 1176 can provide one or more signals to cause the pressure-changing device 1167 to inflate one or more bladders 1164 in a first smart textile-based garment 1100 to a first pressure and inflate one or more other bladders 1164 in the first smart textile-based garment 1100 to a second pressure different from the first pressure. Depending on the number of smart textile-based garments 1100 serviced by the pressure-changing device 1167, and the number of bladders therein, many different inflation configurations can be achieved through the one or more signals, and the examples above are not meant to be limiting.

The smart textile-based garment 1100 may include an optional manifold 1165 between the pressure-changing device 1167, the haptic assemblies 1162, and/or other portions of the smart textile-based garment 1100. The manifold 1165 may include one or more valves (not shown) that pneumatically couple each of the haptic assemblies 1162 with the pressure-changing device 1167 via tubing. In some embodiments, the manifold 1165 is in communication with the controller 1175, and the controller 1175 controls the one or more valves of the manifold 1165 (e.g., the controller generates one or more control signals). The manifold 1165 is configured to switchably couple the pressure-changing device 1167 with one or more haptic assemblies 1162 of the smart textile-based garment 1100. In some embodiments, one or more smart textile-based garments 1100 or other haptic devices can be coupled in a network of haptic devices, and the manifold 1165 can distribute the fluid between the coupled smart textile-based garments 1100.

In some embodiments, instead of using the manifold 1165 to pneumatically couple the pressure-changing device 1167 with the haptic assemblies 1162, the smart textile-based garment 1100 may include multiple pressure-changing devices 1167, where each pressure-changing device 1167 is pneumatically coupled directly with a single (or multiple) haptic assembly 1162. In some embodiments, the pressure-changing device 1167 and the optional manifold 1165 can be configured as part of one or more of the smart textile-based garments 1100 (not illustrated) while, in other embodiments, the pressure-changing device 1167 and the optional manifold 1165 can be configured as external to the smart textile-based garments 1100. In some embodiments, a single pressure-changing device 1167 can be shared by multiple smart textile-based garments 1100 or other haptic devices. In some embodiments, the pressure-changing device 1167 is a pneumatic device, hydraulic device, a pneudraulic device, or some other device capable of adding and removing a medium (e.g., fluid, liquid, or gas) from the one or more haptic assemblies 1162.

The memory 1178 includes instructions and data, some or all of which may be stored as non-transitory computer-readable storage media within the memory 1178. For example, the memory 1178 can include one or more operating systems 1179, one or more communication interface applications 1181, one or more interoperability modules 1184, one or more AR processing applications 1185, one or more data-management modules 1186, and/or one or more haptics modules 1187 for determining, generating, and provided instructions for causing the performance of a haptic response, and/or any other types of data defined above or described with respect to FIGS. 8A-10B. The haptics modules 1187 is configured to cause the performance of the different haptic responses shown and described above in reference to FIG. 1A-5.

The memory 1178 also includes data 1188, which can be used in conjunction with one or more of the applications discussed above. The data 1188 can include device data 1190, sensor data 1191, haptics data 1194; and/or any other types of data defined above or described with respect to FIGS. 8A-10B. The haptics data 1194 can include one or more stored haptic feedback responses, functions or models for generating a haptic feedback, machine learning systems for generating a haptic feedback, user preferences in haptic feedback (e.g., no vibration, vibration only, etc.). The haptics data 1194 can also store data related to the performance of the features described above in reference to FIGS. 1A-5.

The different components of the computing system 1140 (and the smart textile-based garment 1100) shown in FIGS. 11A-11C can be coupled via a wired connection (e.g., via busing). Alternatively, one or more of the devices shown in FIGS. 11A-11C may be wirelessly connected (e.g., via short-range communication signals).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt in or opt out of any data collection at any time. Further, users are given the option to request the removal of any collected data.

It will be understood that, although the terms "first," "second," etc., may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. An electroosmotic actuator for generating a haptic response, the electroosmotic actuator comprising:
   a flexible printed circuit board having a plurality of electrodes;
   a fluid-filled reservoir; and
   individually-controlled pouches in fluid communication with the fluid-filled reservoir, a respective individually-controlled pouch associated with two electrodes of the plurality of electrodes,
   wherein the flexible printed circuit board, the fluid-filled reservoir, and the individually-controlled pouches are disposed in a plurality of layers to form a flexible structure with a non-zero thickness of less than 2 millimeters (mm) and configured to be worn on a portion of a user's body,
   wherein fluid from the fluid-filled reservoir moves into the respective individually-controlled pouch of the individually-controlled pouches when a non-zero voltage (V) less than 700 V is provided to the two electrodes of the plurality of electrodes by a power source coupled to the flexible printed circuit board, thereby causing haptic feedback to be provided to the portion of the user's body on which the flexible structure is worn.

2. The electroosmotic actuator of claim 1, wherein:
   the flexible structure defines at least two channels from the fluid-filled reservoir to the respective individually-controlled pouch of the individually-controlled pouches.

3. The electroosmotic actuator of claim 2, wherein the at least two channels include a porous media, such that when the fluid from the fluid-filled reservoir moves into the respective individually-controlled pouch of the individually-controlled pouches, the fluid travels through the porous media.

4. The electroosmotic actuator of claim 1, wherein the flexible printed circuit board (FPCB) is a first FPCB and the electroosmotic actuator further comprising:
   a bubble layer, including at least one individually controlled-pouch of the individually-controlled pouches, coupled to a first portion of the FPCB;
   one or more spacers coupled a second portion of the FPCB, wherein the second portion is distinct from the first portion of the FPCB;
   a porous media coupled to the one or more spacers;
   a second FPCB, wherein a first portion of the second FPCB is coupled to the one or more spacers; and
   a cap coupled to the fluid-filled reservoir, wherein the fluid-filled reservoir is configured to hold fluid coupled to a second portion of the second FPCB, distinct from the first portion of the FPCB.

5. The electroosmotic actuator of claim 4, wherein the porous media is a glass material.

6. The electroosmotic actuator of claim 1, wherein causing haptic feedback includes providing pressure to the portion of the user's body on which the flexible structure is worn, wherein the pressure ranges between-50 kPa to 100 kPa.

7. The electroosmotic actuator of claim 1, wherein the non-zero voltage provided to the two electrodes is a non-zero voltage less than 700 V.

8. The electroosmotic actuator of claim 1, further comprising one or more circuits that consumes 39 milliwatts (mW) to 1 W of power.

9. The electroosmotic actuator of claim 1, wherein the fluid-filled reservoir has a non-zero thickness between 0.3 millimeters (mm) and 1.5 mm.

10. The electroosmotic actuator of claim 1, wherein the respective individually-controlled pouch of the individually-controlled pouches has a non-zero thickness between 0.05 millimeters (mm) and 0.7 mm.

11. The electroosmotic actuator of claim 1, wherein the flexible structure with the non-zero thickness less than 2 millimeters (mm) is a range between 0.5 mm and 2 mm.

12. The electroosmotic actuator of claim 1, wherein:
the electroosmotic actuator is a first electroosmotic actuator of an array of electroosmotic actuators and the array of electroosmotic actuators is coupled to a wearable device;
the respective individually-controlled pouch of the individually-controlled pouches is coupled to a first end of a haptic tactor;
a second end of the haptic tactor is configured move through a first portion of the wearable device; and
the first end of the haptic tactor includes a first magnetic component configured to couple to the first portion of the wearable device in accordance with a determination that the non-zero voltage (V) less than 700 V provided to the two electrodes is a positive value.

13. The electroosmotic actuator of claim 12, wherein:
in accordance with a determination that a second non-zero voltage (V) less than 700 Vis provided to the two electrodes and is a negative value, fluid from the respective individually-controlled pouch of the individually-controlled pouches moves into the fluid-filled reservoir, thereby causing the first magnetic component at the first end of the haptic tactor to separate from the first portion of the wearable device.

14. A system comprising:
a wearable device; and
an array of electroosmotic actuators,
wherein each electroosmotic actuator of the array of electroosmotic actuators comprises:
at least one flexible printed circuit board having a plurality of electrodes;
a fluid-filled reservoir; and
individually-controlled pouches in fluid communication with the fluid-filled reservoir, a respective individually-controlled pouch associated with two electrodes of the plurality of electrodes,
wherein the at least one flexible printed circuit board, the fluid-filled reservoir, and the individually-controlled pouches are disposed in a plurality of layers to form a flexible structure with a non-zero thickness of less than 2 millimeters (mm), and the array of electroosmotic actuators is coupled to a portion of the wearable device, such that when the wearable device and the array of electroosmotic actuators are worn on a portion of a user's body, the system is configured to:
in response to receiving, at the wearable device, instructions to provide haptic feedback to the user via a respective electroosmotic actuator of the array of electroosmotic actuators, causing, the respective electroosmotic actuator to generate a haptic response,
wherein causing, the electroosmotic actuator to generate the haptic response includes:

providing a voltage less than 700 V to the two electrodes of the plurality of electrodes such that fluid from the fluid-filled reservoir moves into the respective individually-controlled pouch of the individually-controlled pouches, thereby causing haptic feedback to the portion of the user's body on which the wearable device and the electroosmotic actuator are worn.

15. The system of claim 14, wherein the wearable device is at least one of: a wrist-wearable device or a wearable glove.

16. A non-transitory computer-readable storage medium storing executable instructions that, when executed by one or more processors of a wearable device, cause the wearable device to:
in response to receiving instructions to provide haptic feedback to a user via an electroosmotic actuator of an array of individually controlled electroosmotic actuators coupled to a portion of the wearable device, cause, the electroosmotic actuator to generate a haptic response,
wherein causing, the electroosmotic actuator to generate the haptic response includes:
providing a non-zero voltage less than 700 V to a portion of a flexible structure of the electroosmotic actuator, such that:
fluid from a fluid-filled reservoir coupled to the flexible structure moves into a respective individually-controlled pouch of the flexible structure, thereby causing haptic feedback to be provided to the user, wherein the respective individually-controlled pouch of the individually-controlled pouches has a non-zero thickness between 0.05 millimeters (mm) and 0.7 mm.

17. The non-transitory computer-readable storage medium of claim 16, wherein:
while fluid from the fluid-filled reservoir moves into the respective individually-controlled pouch of the individually-controlled pouches, the fluid travels through at least two channels in the flexible structure from the fluid-filled reservoir to the respective individually-controlled pouch of the individually-controlled pouches.

18. The non-transitory computer-readable storage medium of claim 17, wherein the at least two channels include a porous media, such that when the fluid from the fluid-filled reservoir moves into the respective individually-controlled pouch of the individually-controlled pouches, the fluid travels through the porous media.

19. The non-transitory computer-readable storage medium of claim 16, wherein the flexible structure further includes:
a flexible printed circuit board (FPCB) having a plurality of electrodes, wherein the FPCB is a first FPCB;
a bubble layer, including at least one individually controlled-pouch of the individually-controlled pouches, coupled to a first portion of the FPCB;
one or more spacers coupled a second portion of the FPCB, wherein the second portion is distinct from the first portion, of the FPCB;
a porous media coupled to the one or more spacers;
a second FPCB, wherein a first portion of the second FPCB is coupled to the one or more spacers;
the fluid-filled reservoir configured to hold fluid coupled to a second portion of the second FPCB, distinct from the first portion of the FPCB; and
a cap coupled to the fluid-filled reservoir.

20. The non-transitory computer-readable storage medium of claim 18, wherein the porous media is a glass material.

* * * * *